(12) United States Patent
Nakamura et al.

(10) Patent No.: US 11,031,040 B2
(45) Date of Patent: Jun. 8, 2021

(54) OPTICAL DISK RECORDING METHOD, OPTICAL DISK DEVICE, AND INTEGRATED CIRCUIT

(71) Applicant: Panasonic Intellectual Property Management Co., Ltd., Osaka (JP)

(72) Inventors: Atsushi Nakamura, Okayama (JP); Takeshi Kokura, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/977,216

(22) PCT Filed: Feb. 8, 2019

(86) PCT No.: PCT/JP2019/004695
§ 371 (c)(1),
(2) Date: Sep. 1, 2020

(87) PCT Pub. No.: WO2019/171881
PCT Pub. Date: Sep. 12, 2019

(65) Prior Publication Data
US 2021/0012802 A1 Jan. 14, 2021

(30) Foreign Application Priority Data
Mar. 9, 2018 (JP) .............................. JP2018-043235

(51) Int. Cl.
*G11B 20/10* (2006.01)
*G11B 27/24* (2006.01)
(Continued)

(52) U.S. Cl.
CPC ...... *G11B 20/10277* (2013.01); *G11B 7/0037* (2013.01); *G11B 7/013* (2013.01);
(Continued)

(58) Field of Classification Search
CPC . G11B 7/007; G11B 2007/0133; G11B 19/04; G11B 20/10009; G11B 27/24;
(Continued)

(56) References Cited

U.S. PATENT DOCUMENTS 8,289,829 B2 * 10/2012 Kobayashi ........... G11B 7/0062
369/59.11
2010/0322057 A1 12/2010 Nakamura et al.
(Continued)

FOREIGN PATENT DOCUMENTS

JP 2011-150748 8/2011
WO 2010/041404 4/2010
(Continued)

OTHER PUBLICATIONS

International Search Report dated Mar. 19, 2019 in International (PCT) Application No. PCT/JP2019/004695.

*Primary Examiner* — Nabil Z Hindi
(74) *Attorney, Agent, or Firm* — Wenderoth, Lind & Ponack, L.L.P.

(57) ABSTRACT

A mark corresponding to recording data is formed on an optical disk by: encoding the recording data in accordance with a modulation code and generating encoded data; classifying the encoded data by a combination of at least two of a mark length of a mark, a space length of a preceding space, the mark length of a preceding mark, and the space length of a succeeding space; setting a correction amount for adjusting the position of the start edge and the end edge of a recording pulse based on an evaluation index of a decoding result, which is a result of decoding a reproduction signal of the encoded data, for each of the classification; and generating the recording pulse corresponding to the encoded data by using the correction amount corresponding to the classification of the run length of the encoded data.

17 Claims, 24 Drawing Sheets

(51) Int. Cl.
  *G11B 7/0037* (2006.01)
  *G11B 7/013* (2006.01)
  *G11B 20/12* (2006.01)
  *G11B 20/18* (2006.01)
  *G11B 7/007* (2006.01)

(52) U.S. Cl.
  CPC .. *G11B 20/10324* (2013.01); *G11B 20/10453* (2013.01); *G11B 20/10462* (2013.01); *G11B 20/1217* (2013.01); *G11B 20/18* (2013.01); *G11B 2007/00709* (2013.01); *G11B 2007/0133* (2013.01)

(58) Field of Classification Search
  CPC .......... G11B 27/3027; G11B 20/10092; G11B 20/10111; G11B 20/1012; G11B 20/10138; G11B 20/10148; G11B 20/10157; G11B 20/10156
  USPC ......... 369/59.22, 275.1, 275.2, 275.3, 275.4, 369/59.1, 59.12
  See application file for complete search history.

(56) References Cited

U.S. PATENT DOCUMENTS

| | | |
|---|---|---|
| 2011/0044143 A1 | 2/2011 | Nakamura et al. |
| 2012/0188863 A1 | 7/2012 | Nakamura et al. |
| 2012/0250480 A1 | 10/2012 | Kurokawa et al. |
| 2013/0242714 A1 | 9/2013 | Kurokawa et al. |
| 2018/0315448 A1 | 11/2018 | Nishi et al. |
| 2018/0330752 A1 | 11/2018 | Fujiki |

FOREIGN PATENT DOCUMENTS

| | | |
|---|---|---|
| WO | 2011/089735 | 7/2011 |
| WO | 2016/208104 | 12/2016 |
| WO | 2017/126330 | 7/2017 |

\* cited by examiner

FIG. 12A

| Pattern Number | Detection Pattern | | | | DBA Number | Detection Bit Pattern | | | | | | | | | | | | | | | | | | | | | | |
|---|---|---|---|---|---|---|---|---|---|---|---|---|---|---|---|---|---|---|---|---|---|---|---|---|---|---|---|---|
| | Preceding Mark Length | Preceding Space Length | Target Mark Length | Succeeding Space Length | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| START EDGE | 3 OR MORE | 2 | 2 | 2 | | X | X | X | X | X | X | X | 0 | 1 | 1 | 0 | 0 | 1 | 1 | 0 | 0 | 1 | X | X | X | X | X | X | X | X |
| 1 | 2 | 3 | 2 | 2 | 3 | X | X | X | X | X | X | 0 | 1 | 1 | 0 | 0 | 1 | 1 | 0 | 0 | 1 | X | X | X | X | X | X | X | X |
| 2 | 3 OR MORE | 3 | 2 | 2 | 3 | X | X | X | X | X | X | 1 | 1 | 1 | 0 | 0 | 1 | 1 | 0 | 0 | 1 | X | X | X | X | X | X | X | X |
| 3 | – | 4 | 2 | 2 | 3 | X | X | X | X | X | X | 1 | 1 | 0 | 0 | 0 | 1 | 1 | 0 | 0 | 1 | X | X | X | X | X | X | X | X |
| 4 | – | 5 | 2 | 2 | 3 | X | X | X | X | X | 1 | 0 | 0 | 0 | 0 | 0 | 1 | 1 | 0 | 0 | 1 | X | X | X | X | X | X | X | X |
| 5 | – | 6 | 2 | 2 | 3 | X | X | X | X | X | 1 | 0 | 0 | 0 | 0 | 0 | 1 | 1 | 0 | 0 | 1 | X | X | X | X | X | X | X | X |
| 6 | – | 7 | 2 | 2 | 3 | X | X | X | X | 1 | 0 | 0 | 0 | 0 | 0 | 0 | 1 | 1 | 0 | 0 | 1 | X | X | X | X | X | X | X | X |
| 7 | – | 8 | 2 | 2 | 3 | X | X | X | X | 1 | 0 | 0 | 0 | 0 | 0 | 0 | 1 | 1 | 0 | 0 | 1 | X | X | X | X | X | X | X | X |
| 8 | – | 9 | 2 | 2 | 3 | X | X | X | 1 | 0 | 0 | 0 | 0 | 0 | 0 | 0 | 1 | 1 | 0 | 0 | 1 | X | X | X | X | X | X | X | X |
| 9 | – | 10 | 2 | 2 | 3 | X | X | 1 | 0 | 0 | 0 | 0 | 0 | 0 | 0 | 0 | 1 | 1 | 0 | 0 | 1 | X | X | X | X | X | X | X | X |
| 10 | – | 11 OR MORE | 2 | 2 | 3 | X | X | 0 | 0 | 0 | 0 | 0 | 0 | 0 | 0 | 0 | 1 | 1 | 0 | 0 | 1 | X | X | X | X | X | X | X | X |
| | 2 | 2 | 2 | 3 OR MORE | | X | X | X | X | X | X | X | 0 | 1 | 1 | 0 | 0 | 1 | 1 | 0 | 0 | 0 | X | X | X | X | X | X | X | X |
| 11 | 3 OR MORE | 2 | 2 | 3 OR MORE | 7 | X | X | X | X | X | X | X | 1 | 1 | 1 | 0 | 0 | 1 | 1 | 0 | 0 | 0 | X | X | X | X | X | X | X | X |
| 12 | 2 | 3 | 2 | 3 OR MORE | 3 | X | X | X | X | X | X | 0 | 1 | 1 | 0 | 0 | 1 | 1 | 0 | 0 | 0 | X | X | X | X | X | X | X | X |
| 13 | 3 OR MORE | 3 | 2 | 3 OR MORE | 3 | X | X | X | X | X | X | 1 | 1 | 1 | 0 | 0 | 1 | 1 | 0 | 0 | 0 | X | X | X | X | X | X | X | X |
| 14 | – | 4 | 2 | 3 OR MORE | 3 | X | X | X | X | X | X | 1 | 1 | 0 | 0 | 0 | 1 | 1 | 0 | 0 | 0 | X | X | X | X | X | X | X | X |
| 15 | – | 5 | 2 | 3 OR MORE | 3 | X | X | X | X | X | 1 | 0 | 0 | 0 | 0 | 0 | 1 | 1 | 0 | 0 | 0 | X | X | X | X | X | X | X | X |
| 16 | – | 6 | 2 | 3 OR MORE | 3 | X | X | X | X | X | 1 | 0 | 0 | 0 | 0 | 0 | 1 | 1 | 0 | 0 | 0 | X | X | X | X | X | X | X | X |
| 17 | – | 7 | 2 | 3 OR MORE | 3 | X | X | X | X | 1 | 0 | 0 | 0 | 0 | 0 | 0 | 1 | 1 | 0 | 0 | 0 | X | X | X | X | X | X | X | X |
| 18 | – | 8 | 2 | 3 OR MORE | 3 | X | X | X | X | 1 | 0 | 0 | 0 | 0 | 0 | 0 | 1 | 1 | 0 | 0 | 0 | X | X | X | X | X | X | X | X |
| 19 | – | 9 | 2 | 3 OR MORE | 3 | X | X | X | 1 | 0 | 0 | 0 | 0 | 0 | 0 | 0 | 1 | 1 | 0 | 0 | 0 | X | X | X | X | X | X | X | X |
| 20 | – | 10 | 2 | 3 OR MORE | 3 | X | X | 1 | 0 | 0 | 0 | 0 | 0 | 0 | 0 | 0 | 1 | 1 | 0 | 0 | 0 | X | X | X | X | X | X | X | X |
| 21 | – | 11 OR MORE | 2 | 3 OR MORE | 3 | X | X | 0 | 0 | 0 | 0 | 0 | 0 | 0 | 0 | 0 | 1 | 1 | 0 | 0 | 0 | X | X | X | X | X | X | X | X |
| 22 | 2 | 2 | 3 | 2 | 5 | X | X | X | X | X | X | X | 0 | 1 | 1 | 0 | 0 | 1 | 1 | 0 | 0 | 1 | X | X | X | X | X | X | X |
| 23 | 3 OR MORE | 2 | 3 | 2 | 5 | X | X | X | X | X | X | X | 1 | 1 | 1 | 0 | 0 | 1 | 1 | 0 | 0 | 1 | X | X | X | X | X | X | X |
| 24 | 2 | 3 | 3 | 2 | 1 | X | X | X | X | X | X | 0 | 1 | 1 | 0 | 0 | 1 | 1 | 0 | 0 | 1 | X | X | X | X | X | X | X | X |
| 25 | 3 OR MORE | 3 | 3 | 2 | 1 | X | X | X | X | X | X | 1 | 1 | 1 | 0 | 0 | 1 | 1 | 0 | 0 | 1 | X | X | X | X | X | X | X | X |
| 26 | – | 4 | 3 | 2 | 1 | X | X | X | X | X | X | 1 | 1 | 0 | 0 | 0 | 1 | 1 | 0 | 0 | 1 | X | X | X | X | X | X | X | X |
| 27 | – | 5 | 3 | 2 | 1 | X | X | X | X | X | 1 | 0 | 0 | 0 | 0 | 0 | 1 | 1 | 0 | 0 | 1 | X | X | X | X | X | X | X | X |
| 28 | – | 6 | 3 | 2 | 1 | X | X | X | X | X | 1 | 0 | 0 | 0 | 0 | 0 | 1 | 1 | 0 | 0 | 1 | X | X | X | X | X | X | X | X |
| 29 | – | 7 | 3 | 2 | 1 | X | X | X | X | 1 | 0 | 0 | 0 | 0 | 0 | 0 | 1 | 1 | 0 | 0 | 1 | X | X | X | X | X | X | X | X |
| 30 | – | 8 | 3 | 2 | 1 | X | X | X | X | 1 | 0 | 0 | 0 | 0 | 0 | 0 | 1 | 1 | 0 | 0 | 1 | X | X | X | X | X | X | X | X |
| 31 | – | 9 | 3 | 2 | 1 | X | X | X | 1 | 0 | 0 | 0 | 0 | 0 | 0 | 0 | 1 | 1 | 0 | 0 | 1 | X | X | X | X | X | X | X | X |
| 32 | – | 10 | 3 | 2 | 1 | X | X | 1 | 0 | 0 | 0 | 0 | 0 | 0 | 0 | 0 | 1 | 1 | 0 | 0 | 1 | X | X | X | X | X | X | X | X |
| 33 | – | 11 OR MORE | 3 | 2 | 1 | X | X | 0 | 0 | 0 | 0 | 0 | 0 | 0 | 0 | 0 | 1 | 1 | 0 | 0 | 1 | X | X | X | X | X | X | X | X |
| 34 | 2 | 2 | 3 | 3 OR MORE | 5 | X | X | X | X | X | X | X | 0 | 1 | 1 | 0 | 0 | 1 | 1 | 0 | 0 | 0 | X | X | X | X | X | X | X |
| 35 | 3 OR MORE | 2 | 3 | 3 OR MORE | 5 | X | X | X | X | X | X | X | 1 | 1 | 1 | 0 | 0 | 1 | 1 | 0 | 0 | 0 | X | X | X | X | X | X | X |
| 36 | 2 | 3 | 3 | 3 OR MORE | 1 | X | X | X | X | X | X | 0 | 1 | 1 | 0 | 0 | 1 | 1 | 0 | 0 | 0 | X | X | X | X | X | X | X | X |
| 37 | 3 OR MORE | 3 | 3 | 3 OR MORE | 1 | X | X | X | X | X | X | 1 | 1 | 1 | 0 | 0 | 1 | 1 | 0 | 0 | 0 | X | X | X | X | X | X | X | X |
| 38 | – | 4 | 3 | 3 OR MORE | 1 | X | X | X | X | X | X | 1 | 1 | 0 | 0 | 0 | 1 | 1 | 0 | 0 | 0 | X | X | X | X | X | X | X | X |
| 39 | – | 5 | 3 | 3 OR MORE | 1 | X | X | X | X | X | 1 | 0 | 0 | 0 | 0 | 0 | 1 | 1 | 0 | 0 | 0 | X | X | X | X | X | X | X | X |
| 40 | – | 6 | 3 | 3 OR MORE | 1 | X | X | X | X | X | 1 | 0 | 0 | 0 | 0 | 0 | 1 | 1 | 0 | 0 | 0 | X | X | X | X | X | X | X | X |
| 41 | – | 7 | 3 | 3 OR MORE | 1 | X | X | X | X | 1 | 0 | 0 | 0 | 0 | 0 | 0 | 1 | 1 | 0 | 0 | 0 | X | X | X | X | X | X | X | X |
| 42 | – | 8 | 3 | 3 OR MORE | 1 | X | X | X | X | 1 | 0 | 0 | 0 | 0 | 0 | 0 | 1 | 1 | 0 | 0 | 0 | X | X | X | X | X | X | X | X |
| 43 | – | 9 | 3 | 3 OR MORE | 1 | X | X | X | 1 | 0 | 0 | 0 | 0 | 0 | 0 | 0 | 1 | 1 | 0 | 0 | 0 | X | X | X | X | X | X | X | X |
| 44 | – | 10 | 3 | 3 OR MORE | 1 | X | X | 1 | 0 | 0 | 0 | 0 | 0 | 0 | 0 | 0 | 1 | 1 | 0 | 0 | 0 | X | X | X | X | X | X | X | X |
| 45 | – | 11 OR MORE | 3 | 3 OR MORE | 1 | X | X | 0 | 0 | 0 | 0 | 0 | 0 | 0 | 0 | 0 | 1 | 1 | 0 | 0 | 0 | X | X | X | X | X | X | X | X |
| 46 | 2 | 2 | 4 | – | 5 | X | X | X | X | X | X | X | 0 | 1 | 1 | 0 | 0 | 1 | 1 | 1 | 0 | X | X | X | X | X | X | X | X |
| 47 | 3 OR MORE | 2 | 4 | – | 5 | X | X | X | X | X | X | X | 1 | 1 | 1 | 0 | 0 | 1 | 1 | 1 | 0 | X | X | X | X | X | X | X | X |
| 48 | 2 | 3 | 4 | – | 1 | X | X | X | X | X | X | 0 | 1 | 1 | 0 | 0 | 1 | 1 | 1 | 0 | X | X | X | X | X | X | X | X | X |
| 49 | 3 OR MORE | 3 | 4 | – | 1 | X | X | X | X | X | X | 1 | 1 | 1 | 0 | 0 | 1 | 1 | 1 | 0 | X | X | X | X | X | X | X | X | X |
| 50 | – | 4 | 4 | – | 1 | X | X | X | X | X | X | 1 | 1 | 0 | 0 | 0 | 1 | 1 | 1 | 0 | X | X | X | X | X | X | X | X | X |
| 51 | – | 5 | 4 | – | 1 | X | X | X | X | X | 1 | 0 | 0 | 0 | 0 | 0 | 1 | 1 | 1 | 0 | X | X | X | X | X | X | X | X | X |
| 52 | – | 6 | 4 | – | 1 | X | X | X | X | X | 1 | 0 | 0 | 0 | 0 | 0 | 1 | 1 | 1 | 0 | X | X | X | X | X | X | X | X | X |
| 53 | – | 7 | 4 | – | 1 | X | X | X | X | 1 | 0 | 0 | 0 | 0 | 0 | 0 | 1 | 1 | 1 | 0 | X | X | X | X | X | X | X | X | X |
| 54 | – | 8 | 4 | – | 1 | X | X | X | X | 1 | 0 | 0 | 0 | 0 | 0 | 0 | 1 | 1 | 1 | 0 | X | X | X | X | X | X | X | X | X |
| 55 | – | 9 | 4 | – | 1 | X | X | X | 1 | 0 | 0 | 0 | 0 | 0 | 0 | 0 | 1 | 1 | 1 | 0 | X | X | X | X | X | X | X | X | X |
| 56 | – | 10 | 4 | – | 1 | X | X | 1 | 0 | 0 | 0 | 0 | 0 | 0 | 0 | 0 | 1 | 1 | 1 | 0 | X | X | X | X | X | X | X | X | X |
| 57 | – | 11 OR MORE | 4 | – | 1 | X | X | 0 | 0 | 0 | 0 | 0 | 0 | 0 | 0 | 0 | 1 | 1 | 1 | 0 | X | X | X | X | X | X | X | X | X |
| 58 | 2 | 2 | 5 | – | 5 | X | X | X | X | X | X | X | 0 | 1 | 1 | 0 | 0 | 1 | 1 | 1 | 1 | 0 | X | X | X | X | X | X | X |
| 59 | 3 OR MORE | 2 | 5 | – | 5 | X | X | X | X | X | X | X | 1 | 1 | 1 | 0 | 0 | 1 | 1 | 1 | 1 | 0 | X | X | X | X | X | X | X |
| 60 | 2 | 3 | 5 | – | 1 | X | X | X | X | X | X | 0 | 1 | 1 | 0 | 0 | 1 | 1 | 1 | 1 | 0 | X | X | X | X | X | X | X | X |
| 61 | 3 OR MORE | 3 | 5 | – | 1 | X | X | X | X | X | X | 1 | 1 | 1 | 0 | 0 | 1 | 1 | 1 | 1 | 0 | X | X | X | X | X | X | X | X |
| 62 | – | 4 | 5 | – | 1 | X | X | X | X | X | X | 1 | 1 | 0 | 0 | 0 | 1 | 1 | 1 | 1 | 0 | X | X | X | X | X | X | X | X |
| 63 | – | 5 | 5 | – | 1 | X | X | X | X | X | 1 | 0 | 0 | 0 | 0 | 0 | 1 | 1 | 1 | 1 | 0 | X | X | X | X | X | X | X | X |
| 64 | – | 6 | 5 | – | 1 | X | X | X | X | X | 1 | 0 | 0 | 0 | 0 | 0 | 1 | 1 | 1 | 1 | 0 | X | X | X | X | X | X | X | X |
| 65 | – | 7 | 5 | – | 1 | X | X | X | X | 1 | 0 | 0 | 0 | 0 | 0 | 0 | 1 | 1 | 1 | 1 | 0 | X | X | X | X | X | X | X | X |
| 66 | – | 8 | 5 | – | 1 | X | X | X | X | 1 | 0 | 0 | 0 | 0 | 0 | 0 | 1 | 1 | 1 | 1 | 0 | X | X | X | X | X | X | X | X |
| 67 | – | 9 | 5 | – | 1 | X | X | X | 1 | 0 | 0 | 0 | 0 | 0 | 0 | 0 | 1 | 1 | 1 | 1 | 0 | X | X | X | X | X | X | X | X |
| 68 | – | 10 | 5 | – | 1 | X | X | 1 | 0 | 0 | 0 | 0 | 0 | 0 | 0 | 0 | 1 | 1 | 1 | 1 | 0 | X | X | X | X | X | X | X | X |
| 69 | – | 11 OR MORE | 5 | – | 1 | X | X | 0 | 0 | 0 | 0 | 0 | 0 | 0 | 0 | 0 | 1 | 1 | 1 | 1 | 0 | X | X | X | X | X | X | X | X |

PATTERN NUMBER

| # | DETECTION PATTERN | | | DBA NUMBER | DETECTION BIT PATTERN | | | | | | | | | | | | | | | | | | | | | | | |
|---|---|---|---|---|---|---|---|---|---|---|---|---|---|---|---|---|---|---|---|---|---|---|---|---|---|---|---|---|
| | PRECEDING SPACE LENGTH | TARGET MARK LENGTH | SUCCEEDING SPACE LENGTH | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| START EDGE | 2 | 2 | 2 | | X | X | X | X | X | X | X | X | X | 1 | 0 | 0 | 1 | 1 | 0 | 0 | 1 | X | X | X | X | X | X | X | X |
| 1 | 3 | 2 | 2 | 3 | X | X | X | X | X | X | X | X | 1 | 0 | 0 | 0 | 1 | 1 | 0 | 0 | 1 | X | X | X | X | X | X | X | X |
| 2 | 4 | 2 | 2 | 3 | X | X | X | X | X | X | X | 1 | 0 | 0 | 0 | 0 | 1 | 1 | 0 | 0 | 1 | X | X | X | X | X | X | X | X |
| 3 | 5 | 2 | 2 | 3 | X | X | X | X | X | X | 1 | 0 | 0 | 0 | 0 | 0 | 1 | 1 | 0 | 0 | 1 | X | X | X | X | X | X | X | X |
| 4 | 6 OR MORE | 2 | 2 | 3 | X | X | X | X | X | X | 0 | 0 | 0 | 0 | 0 | 0 | 1 | 1 | 0 | 0 | 1 | X | X | X | X | X | X | X | X |
| 5 | 2 | 2 | 3 | 7 | X | X | X | X | X | X | X | X | X | 1 | 0 | 0 | 1 | 1 | 0 | 0 | 0 | 1 | X | X | X | X | X | X | X |
| 6 | 3 | 2 | 3 | 3 | X | X | X | X | X | X | X | X | 1 | 0 | 0 | 0 | 1 | 1 | 0 | 0 | 0 | 1 | X | X | X | X | X | X | X |
| 7 | 4 | 2 | 3 | 3 | X | X | X | X | X | X | X | 1 | 0 | 0 | 0 | 0 | 1 | 1 | 0 | 0 | 0 | 1 | X | X | X | X | X | X | X |
| 8 | 5 | 2 | 3 | 3 | X | X | X | X | X | X | 1 | 0 | 0 | 0 | 0 | 0 | 1 | 1 | 0 | 0 | 0 | 1 | X | X | X | X | X | X | X |
| 9 | 6 OR MORE | 2 | 3 | 3 | X | X | X | X | X | X | 0 | 0 | 0 | 0 | 0 | 0 | 1 | 1 | 0 | 0 | 0 | 1 | X | X | X | X | X | X | X |
| 10 | 2 | 2 | 4 | 7 | X | X | X | X | X | X | X | X | X | 1 | 0 | 0 | 1 | 1 | 0 | 0 | 0 | 0 | 1 | X | X | X | X | X | X |
| 11 | 3 | 2 | 4 | 3 | X | X | X | X | X | X | X | X | 1 | 0 | 0 | 0 | 1 | 1 | 0 | 0 | 0 | 0 | 1 | X | X | X | X | X | X |
| 12 | 4 | 2 | 4 | 3 | X | X | X | X | X | X | X | 1 | 0 | 0 | 0 | 0 | 1 | 1 | 0 | 0 | 0 | 0 | 1 | X | X | X | X | X | X |
| 13 | 5 | 2 | 4 | 3 | X | X | X | X | X | X | 1 | 0 | 0 | 0 | 0 | 0 | 1 | 1 | 0 | 0 | 0 | 0 | 1 | X | X | X | X | X | X |
| 14 | 6 OR MORE | 2 | 4 | 3 | X | X | X | X | X | X | 0 | 0 | 0 | 0 | 0 | 0 | 1 | 1 | 0 | 0 | 0 | 0 | 1 | X | X | X | X | X | X |
| 15 | 2 | 2 | 5 | 7 | X | X | X | X | X | X | X | X | X | 1 | 0 | 0 | 1 | 1 | 0 | 0 | 0 | 0 | 0 | 1 | X | X | X | X | X |
| 16 | 3 | 2 | 5 | 3 | X | X | X | X | X | X | X | X | 1 | 0 | 0 | 0 | 1 | 1 | 0 | 0 | 0 | 0 | 0 | 1 | X | X | X | X | X |
| 17 | 4 | 2 | 5 | 3 | X | X | X | X | X | X | X | 1 | 0 | 0 | 0 | 0 | 1 | 1 | 0 | 0 | 0 | 0 | 0 | 1 | X | X | X | X | X |
| 18 | 5 | 2 | 5 | 3 | X | X | X | X | X | X | 1 | 0 | 0 | 0 | 0 | 0 | 1 | 1 | 0 | 0 | 0 | 0 | 0 | 1 | X | X | X | X | X |
| 19 | 6 OR MORE | 2 | 5 | 3 | X | X | X | X | X | X | 0 | 0 | 0 | 0 | 0 | 0 | 1 | 1 | 0 | 0 | 0 | 0 | 0 | 1 | X | X | X | X | X |
| 20 | 2 | 2 | 6 OR MORE | 7 | X | X | X | X | X | X | X | X | X | 1 | 0 | 0 | 1 | 1 | 0 | 0 | 0 | 0 | 0 | 0 | X | X | X | X | X |
| 21 | 3 | 2 | 6 OR MORE | 3 | X | X | X | X | X | X | X | X | 1 | 0 | 0 | 0 | 1 | 1 | 0 | 0 | 0 | 0 | 0 | 0 | X | X | X | X | X |
| 22 | 4 | 2 | 6 OR MORE | 3 | X | X | X | X | X | X | X | 1 | 0 | 0 | 0 | 0 | 1 | 1 | 0 | 0 | 0 | 0 | 0 | 0 | X | X | X | X | X |
| 23 | 5 | 2 | 6 OR MORE | 3 | X | X | X | X | X | X | 1 | 0 | 0 | 0 | 0 | 0 | 1 | 1 | 0 | 0 | 0 | 0 | 0 | 0 | X | X | X | X | X |
| 24 | 6 OR MORE | 2 | 6 OR MORE | 3 | X | X | X | X | X | X | 0 | 0 | 0 | 0 | 0 | 0 | 1 | 1 | 0 | 0 | 0 | 0 | 0 | 0 | X | X | X | X | X |
| 25 | 2 | 3 | 2 | 5 | X | X | X | X | X | X | X | X | X | 1 | 0 | 0 | 1 | 1 | 1 | 0 | 0 | 1 | X | X | X | X | X | X | X |
| 26 | 3 | 3 | 2 | 1 | X | X | X | X | X | X | X | X | 1 | 0 | 0 | 0 | 1 | 1 | 1 | 0 | 0 | 1 | X | X | X | X | X | X | X |
| 27 | 4 | 3 | 2 | 1 | X | X | X | X | X | X | X | 1 | 0 | 0 | 0 | 0 | 1 | 1 | 1 | 0 | 0 | 1 | X | X | X | X | X | X | X |
| 28 | 5 | 3 | 2 | 1 | X | X | X | X | X | X | 1 | 0 | 0 | 0 | 0 | 0 | 1 | 1 | 1 | 0 | 0 | 1 | X | X | X | X | X | X | X |
| 29 | 6 OR MORE | 3 | 2 | 1 | X | X | X | X | X | X | 0 | 0 | 0 | 0 | 0 | 0 | 1 | 1 | 1 | 0 | 0 | 1 | X | X | X | X | X | X | X |
| 30 | 2 | 3 | 3 | 5 | X | X | X | X | X | X | X | X | X | 1 | 0 | 0 | 1 | 1 | 1 | 0 | 0 | 0 | 1 | X | X | X | X | X | X |
| 31 | 3 | 3 | 3 | 1 | X | X | X | X | X | X | X | X | 1 | 0 | 0 | 0 | 1 | 1 | 1 | 0 | 0 | 0 | 1 | X | X | X | X | X | X |
| 32 | 4 | 3 | 3 | 1 | X | X | X | X | X | X | X | 1 | 0 | 0 | 0 | 0 | 1 | 1 | 1 | 0 | 0 | 0 | 1 | X | X | X | X | X | X |
| 33 | 5 | 3 | 3 | 1 | X | X | X | X | X | X | 1 | 0 | 0 | 0 | 0 | 0 | 1 | 1 | 1 | 0 | 0 | 0 | 1 | X | X | X | X | X | X |
| 34 | 6 OR MORE | 3 | 3 | 1 | X | X | X | X | X | X | 0 | 0 | 0 | 0 | 0 | 0 | 1 | 1 | 1 | 0 | 0 | 0 | 1 | X | X | X | X | X | X |
| 35 | 2 | 3 | 4 | 5 | X | X | X | X | X | X | X | X | X | 1 | 0 | 0 | 1 | 1 | 1 | 0 | 0 | 0 | 0 | 1 | X | X | X | X | X |
| 36 | 3 | 3 | 4 | 1 | X | X | X | X | X | X | X | X | 1 | 0 | 0 | 0 | 1 | 1 | 1 | 0 | 0 | 0 | 0 | 1 | X | X | X | X | X |
| 37 | 4 | 3 | 4 | 1 | X | X | X | X | X | X | X | 1 | 0 | 0 | 0 | 0 | 1 | 1 | 1 | 0 | 0 | 0 | 0 | 1 | X | X | X | X | X |
| 38 | 5 | 3 | 4 | 1 | X | X | X | X | X | X | 1 | 0 | 0 | 0 | 0 | 0 | 1 | 1 | 1 | 0 | 0 | 0 | 0 | 1 | X | X | X | X | X |
| 39 | 6 OR MORE | 3 | 4 | 1 | X | X | X | X | X | X | 0 | 0 | 0 | 0 | 0 | 0 | 1 | 1 | 1 | 0 | 0 | 0 | 0 | 1 | X | X | X | X | X |
| 40 | 2 | 3 | 5 | 5 | X | X | X | X | X | X | X | X | X | 1 | 0 | 0 | 1 | 1 | 1 | 0 | 0 | 0 | 0 | 0 | 1 | X | X | X | X |
| 41 | 3 | 3 | 5 | 1 | X | X | X | X | X | X | X | X | 1 | 0 | 0 | 0 | 1 | 1 | 1 | 0 | 0 | 0 | 0 | 0 | 1 | X | X | X | X |
| 42 | 4 | 3 | 5 | 1 | X | X | X | X | X | X | X | 1 | 0 | 0 | 0 | 0 | 1 | 1 | 1 | 0 | 0 | 0 | 0 | 0 | 1 | X | X | X | X |
| 43 | 5 | 3 | 5 | 1 | X | X | X | X | X | X | 1 | 0 | 0 | 0 | 0 | 0 | 1 | 1 | 1 | 0 | 0 | 0 | 0 | 0 | 1 | X | X | X | X |
| 44 | 6 OR MORE | 3 | 5 | 1 | X | X | X | X | X | X | 0 | 0 | 0 | 0 | 0 | 0 | 1 | 1 | 1 | 0 | 0 | 0 | 0 | 0 | 1 | X | X | X | X |
| 45 | 2 | 3 | 6 OR MORE | 5 | X | X | X | X | X | X | X | X | X | 1 | 0 | 0 | 1 | 1 | 1 | 0 | 0 | 0 | 0 | 0 | 0 | X | X | X | X |
| 46 | 3 | 3 | 6 OR MORE | 1 | X | X | X | X | X | X | X | X | 1 | 0 | 0 | 0 | 1 | 1 | 1 | 0 | 0 | 0 | 0 | 0 | 0 | X | X | X | X |
| 47 | 4 | 3 | 6 OR MORE | 1 | X | X | X | X | X | X | X | 1 | 0 | 0 | 0 | 0 | 1 | 1 | 1 | 0 | 0 | 0 | 0 | 0 | 0 | X | X | X | X |
| 48 | 5 | 3 | 6 OR MORE | 1 | X | X | X | X | X | X | 1 | 0 | 0 | 0 | 0 | 0 | 1 | 1 | 1 | 0 | 0 | 0 | 0 | 0 | 0 | X | X | X | X |
| 49 | 6 OR MORE | 3 | 6 OR MORE | 1 | X | X | X | X | X | X | 0 | 0 | 0 | 0 | 0 | 0 | 1 | 1 | 1 | 0 | 0 | 0 | 0 | 0 | 0 | X | X | X | X |

FIG. 13B

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 50 | 2 | 4 | 2 | 5 | X | X | X | X | X | X | X | X | X | X | 1 | 0 | 0 | 1 | 1 | 1 | 1 | 0 | 0 | 1 | X | X | X | X | X | X |
| 51 | 3 | 4 | 2 | 1 | X | X | X | X | X | X | X | X | X | 1 | 0 | 0 | 0 | 1 | 1 | 1 | 1 | 0 | 0 | 1 | X | X | X | X | X | X |
| 52 | 4 | 4 | 2 | 1 | X | X | X | X | X | X | X | X | 1 | 0 | 0 | 0 | 0 | 1 | 1 | 1 | 1 | 0 | 0 | 1 | X | X | X | X | X | X |
| 53 | 5 | 4 | 2 | 1 | X | X | X | X | X | X | X | 1 | 0 | 0 | 0 | 0 | 0 | 1 | 1 | 1 | 1 | 0 | 0 | 1 | X | X | X | X | X | X |
| 54 | 6 OR MORE | 4 | 2 | 1 | X | X | X | X | X | X | X | 0 | 0 | 0 | 0 | 0 | 0 | 1 | 1 | 1 | 1 | 0 | 0 | 1 | X | X | X | X | X | X |
| 55 | 2 | 4 | 3 | 5 | X | X | X | X | X | X | X | X | X | X | 1 | 0 | 0 | 1 | 1 | 1 | 1 | 0 | 0 | 0 | 1 | X | X | X | X | X |
| 56 | 3 | 4 | 3 | 1 | X | X | X | X | X | X | X | X | X | 1 | 0 | 0 | 0 | 1 | 1 | 1 | 1 | 0 | 0 | 0 | 1 | X | X | X | X | X |
| 57 | 4 | 4 | 3 | 1 | X | X | X | X | X | X | X | X | 1 | 0 | 0 | 0 | 0 | 1 | 1 | 1 | 1 | 0 | 0 | 0 | 1 | X | X | X | X | X |
| 58 | 5 | 4 | 3 | 1 | X | X | X | X | X | X | X | 1 | 0 | 0 | 0 | 0 | 0 | 1 | 1 | 1 | 1 | 0 | 0 | 0 | 1 | X | X | X | X | X |
| 59 | 6 OR MORE | 4 | 3 | 1 | X | X | X | X | X | X | X | 0 | 0 | 0 | 0 | 0 | 0 | 1 | 1 | 1 | 1 | 0 | 0 | 0 | 1 | X | X | X | X | X |
| 60 | 2 | 4 | 4 | 5 | X | X | X | X | X | X | X | X | X | X | 1 | 0 | 0 | 1 | 1 | 1 | 1 | 0 | 0 | 0 | 0 | 1 | X | X | X | X |
| 61 | 3 | 4 | 4 | 1 | X | X | X | X | X | X | X | X | X | 1 | 0 | 0 | 0 | 1 | 1 | 1 | 1 | 0 | 0 | 0 | 0 | 1 | X | X | X | X |
| 62 | 4 | 4 | 4 | 1 | X | X | X | X | X | X | X | X | 1 | 0 | 0 | 0 | 0 | 1 | 1 | 1 | 1 | 0 | 0 | 0 | 0 | 1 | X | X | X | X |
| 63 | 5 | 4 | 4 | 1 | X | X | X | X | X | X | X | 1 | 0 | 0 | 0 | 0 | 0 | 1 | 1 | 1 | 1 | 0 | 0 | 0 | 0 | 1 | X | X | X | X |
| 64 | 6 OR MORE | 4 | 4 | 1 | X | X | X | X | X | X | X | 0 | 0 | 0 | 0 | 0 | 0 | 1 | 1 | 1 | 1 | 0 | 0 | 0 | 0 | 1 | X | X | X | X |
| 65 | 2 | 4 | 5 | 5 | X | X | X | X | X | X | X | X | X | X | 1 | 0 | 0 | 1 | 1 | 1 | 1 | 0 | 0 | 0 | 0 | 0 | 1 | X | X | X |
| 66 | 3 | 4 | 5 | 1 | X | X | X | X | X | X | X | X | X | 1 | 0 | 0 | 0 | 1 | 1 | 1 | 1 | 0 | 0 | 0 | 0 | 0 | 1 | X | X | X |
| 67 | 4 | 4 | 5 | 1 | X | X | X | X | X | X | X | X | 1 | 0 | 0 | 0 | 0 | 1 | 1 | 1 | 1 | 0 | 0 | 0 | 0 | 0 | 1 | X | X | X |
| 68 | 5 | 4 | 5 | 1 | X | X | X | X | X | X | X | 1 | 0 | 0 | 0 | 0 | 0 | 1 | 1 | 1 | 1 | 0 | 0 | 0 | 0 | 0 | 1 | X | X | X |
| 69 | 6 OR MORE | 4 | 5 | 1 | X | X | X | X | X | X | X | 0 | 0 | 0 | 0 | 0 | 0 | 1 | 1 | 1 | 1 | 0 | 0 | 0 | 0 | 0 | 1 | X | X | X |
| 70 | 2 | 4 | 6 OR MORE | 5 | X | X | X | X | X | X | X | X | X | X | 1 | 0 | 0 | 1 | 1 | 1 | 1 | 0 | 0 | 0 | 0 | 0 | 0 | X | X | X |
| 71 | 3 | 4 | 6 OR MORE | 1 | X | X | X | X | X | X | X | X | X | 1 | 0 | 0 | 0 | 1 | 1 | 1 | 1 | 0 | 0 | 0 | 0 | 0 | 0 | X | X | X |
| 72 | 4 | 4 | 6 OR MORE | 1 | X | X | X | X | X | X | X | X | 1 | 0 | 0 | 0 | 0 | 1 | 1 | 1 | 1 | 0 | 0 | 0 | 0 | 0 | 0 | X | X | X |
| 73 | 5 | 4 | 6 OR MORE | 1 | X | X | X | X | X | X | X | 1 | 0 | 0 | 0 | 0 | 0 | 1 | 1 | 1 | 1 | 0 | 0 | 0 | 0 | 0 | 0 | X | X | X |
| 74 | 6 OR MORE | 4 | 6 OR MORE | 1 | X | X | X | X | X | X | X | 0 | 0 | 0 | 0 | 0 | 0 | 1 | 1 | 1 | 1 | 0 | 0 | 0 | 0 | 0 | 0 | X | X | X |
| 75 | 2 | 5 | – | 5 | X | X | X | X | X | X | X | X | X | X | 1 | 0 | 0 | 1 | 1 | 1 | 1 | 1 | 0 | X | X | X | X | X | X | X |
| 76 | 3 | 5 | – | 1 | X | X | X | X | X | X | X | X | X | 1 | 0 | 0 | 0 | 1 | 1 | 1 | 1 | 1 | 0 | X | X | X | X | X | X | X |
| 77 | 4 | 5 | – | 1 | X | X | X | X | X | X | X | X | 1 | 0 | 0 | 0 | 0 | 1 | 1 | 1 | 1 | 1 | 0 | X | X | X | X | X | X | X |
| 78 | 5 | 5 | – | 1 | X | X | X | X | X | X | X | 1 | 0 | 0 | 0 | 0 | 0 | 1 | 1 | 1 | 1 | 1 | 0 | X | X | X | X | X | X | X |
| 79 | 6 OR MORE | 5 | – | 1 | X | X | X | X | X | X | X | 0 | 0 | 0 | 0 | 0 | 0 | 1 | 1 | 1 | 1 | 1 | 0 | X | X | X | X | X | X | X |
| 80 | 2 | 6 | – | 5 | X | X | X | X | X | X | X | X | X | X | 1 | 0 | 0 | 1 | 1 | 1 | 1 | 1 | 1 | 0 | X | X | X | X | X | X |
| 81 | 3 | 6 | – | 1 | X | X | X | X | X | X | X | X | X | 1 | 0 | 0 | 0 | 1 | 1 | 1 | 1 | 1 | 1 | 0 | X | X | X | X | X | X |
| 82 | 4 | 6 | – | 1 | X | X | X | X | X | X | X | X | 1 | 0 | 0 | 0 | 0 | 1 | 1 | 1 | 1 | 1 | 1 | 0 | X | X | X | X | X | X |
| 83 | 5 | 6 | – | 1 | X | X | X | X | X | X | X | 1 | 0 | 0 | 0 | 0 | 0 | 1 | 1 | 1 | 1 | 1 | 1 | 0 | X | X | X | X | X | X |
| 84 | 6 OR MORE | 6 | – | 1 | X | X | X | X | X | X | X | 0 | 0 | 0 | 0 | 0 | 0 | 1 | 1 | 1 | 1 | 1 | 1 | 0 | X | X | X | X | X | X |
| 85 | 2 | 7 | – | 5 | X | X | X | X | X | X | X | X | X | X | 1 | 0 | 0 | 1 | 1 | 1 | 1 | 1 | 1 | 1 | 0 | X | X | X | X | X |
| 86 | 3 | 7 | – | 1 | X | X | X | X | X | X | X | X | X | 1 | 0 | 0 | 0 | 1 | 1 | 1 | 1 | 1 | 1 | 1 | 0 | X | X | X | X | X |
| 87 | 4 | 7 | – | 1 | X | X | X | X | X | X | X | X | 1 | 0 | 0 | 0 | 0 | 1 | 1 | 1 | 1 | 1 | 1 | 1 | 0 | X | X | X | X | X |
| 88 | 5 | 7 | – | 1 | X | X | X | X | X | X | X | 1 | 0 | 0 | 0 | 0 | 0 | 1 | 1 | 1 | 1 | 1 | 1 | 1 | 0 | X | X | X | X | X |
| 89 | 6 OR MORE | 7 | – | 1 | X | X | X | X | X | X | X | 0 | 0 | 0 | 0 | 0 | 0 | 1 | 1 | 1 | 1 | 1 | 1 | 1 | 0 | X | X | X | X | X |
| 90 | 2 | 8 | – | 5 | X | X | X | X | X | X | X | X | X | X | 1 | 0 | 0 | 1 | 1 | 1 | 1 | 1 | 1 | 1 | 1 | 0 | X | X | X | X |
| 91 | 3 | 8 | – | 1 | X | X | X | X | X | X | X | X | X | 1 | 0 | 0 | 0 | 1 | 1 | 1 | 1 | 1 | 1 | 1 | 1 | 0 | X | X | X | X |
| 92 | 4 | 8 | – | 1 | X | X | X | X | X | X | X | X | 1 | 0 | 0 | 0 | 0 | 1 | 1 | 1 | 1 | 1 | 1 | 1 | 1 | 0 | X | X | X | X |
| 93 | 5 | 8 | – | 1 | X | X | X | X | X | X | X | 1 | 0 | 0 | 0 | 0 | 0 | 1 | 1 | 1 | 1 | 1 | 1 | 1 | 1 | 0 | X | X | X | X |
| 94 | 6 OR MORE | 8 | – | 1 | X | X | X | X | X | X | X | 0 | 0 | 0 | 0 | 0 | 0 | 1 | 1 | 1 | 1 | 1 | 1 | 1 | 1 | 0 | X | X | X | X |
| 95 | 2 | 9 | – | 5 | X | X | X | X | X | X | X | X | X | X | 1 | 0 | 0 | 1 | 1 | 1 | 1 | 1 | 1 | 1 | 1 | 1 | 0 | X | X | X |
| 96 | 3 | 9 | – | 1 | X | X | X | X | X | X | X | X | X | 1 | 0 | 0 | 0 | 1 | 1 | 1 | 1 | 1 | 1 | 1 | 1 | 1 | 0 | X | X | X |
| 97 | 4 | 9 | – | 1 | X | X | X | X | X | X | X | X | 1 | 0 | 0 | 0 | 0 | 1 | 1 | 1 | 1 | 1 | 1 | 1 | 1 | 1 | 0 | X | X | X |
| 98 | 5 | 9 | – | 1 | X | X | X | X | X | X | X | 1 | 0 | 0 | 0 | 0 | 0 | 1 | 1 | 1 | 1 | 1 | 1 | 1 | 1 | 1 | 0 | X | X | X |
| 99 | 6 OR MORE | 9 | – | 1 | X | X | X | X | X | X | X | 0 | 0 | 0 | 0 | 0 | 0 | 1 | 1 | 1 | 1 | 1 | 1 | 1 | 1 | 1 | 0 | X | X | X |
| 100 | 2 | 10 | – | 5 | X | X | X | X | X | X | X | X | X | X | 1 | 0 | 0 | 1 | 1 | 1 | 1 | 1 | 1 | 1 | 1 | 1 | 1 | 0 | X | X |
| 101 | 3 | 10 | – | 1 | X | X | X | X | X | X | X | X | X | 1 | 0 | 0 | 0 | 1 | 1 | 1 | 1 | 1 | 1 | 1 | 1 | 1 | 1 | 0 | X | X |
| 102 | 4 | 10 | – | 1 | X | X | X | X | X | X | X | X | 1 | 0 | 0 | 0 | 0 | 1 | 1 | 1 | 1 | 1 | 1 | 1 | 1 | 1 | 1 | 0 | X | X |
| 103 | 5 | 10 | – | 1 | X | X | X | X | X | X | X | 1 | 0 | 0 | 0 | 0 | 0 | 1 | 1 | 1 | 1 | 1 | 1 | 1 | 1 | 1 | 1 | 0 | X | X |
| 104 | 6 OR MORE | 10 | – | 1 | X | X | X | X | X | X | X | 0 | 0 | 0 | 0 | 0 | 0 | 1 | 1 | 1 | 1 | 1 | 1 | 1 | 1 | 1 | 1 | 0 | X | X |
| 105 | 2 | 11 | – | 5 | X | X | X | X | X | X | X | X | X | X | 1 | 0 | 0 | 1 | 1 | 1 | 1 | 1 | 1 | 1 | 1 | 1 | 1 | 1 | 0 | X |
| 106 | 3 | 11 | – | 1 | X | X | X | X | X | X | X | X | X | 1 | 0 | 0 | 0 | 1 | 1 | 1 | 1 | 1 | 1 | 1 | 1 | 1 | 1 | 1 | 0 | X |
| 107 | 4 | 11 | – | 1 | X | X | X | X | X | X | X | X | 1 | 0 | 0 | 0 | 0 | 1 | 1 | 1 | 1 | 1 | 1 | 1 | 1 | 1 | 1 | 1 | 0 | X |
| 108 | 5 | 11 | – | 1 | X | X | X | X | X | X | X | 1 | 0 | 0 | 0 | 0 | 0 | 1 | 1 | 1 | 1 | 1 | 1 | 1 | 1 | 1 | 1 | 1 | 0 | X |
| 109 | 6 OR MORE | 11 | – | 1 | X | X | X | X | X | X | X | 0 | 0 | 0 | 0 | 0 | 0 | 1 | 1 | 1 | 1 | 1 | 1 | 1 | 1 | 1 | 1 | 1 | 0 | X |
| 110 | 2 | 12 | – | 5 | X | X | X | X | X | X | X | X | X | X | 1 | 0 | 0 | 1 | 1 | 1 | 1 | 1 | 1 | 1 | 1 | 1 | 1 | 1 | 1 | 0 |
| 111 | 3 | 12 | – | 1 | X | X | X | X | X | X | X | X | X | 1 | 0 | 0 | 0 | 1 | 1 | 1 | 1 | 1 | 1 | 1 | 1 | 1 | 1 | 1 | 1 | 0 |
| 112 | 4 | 12 | – | 1 | X | X | X | X | X | X | X | X | 1 | 0 | 0 | 0 | 0 | 1 | 1 | 1 | 1 | 1 | 1 | 1 | 1 | 1 | 1 | 1 | 1 | 0 |
| 113 | 5 | 12 | – | 1 | X | X | X | X | X | X | X | 1 | 0 | 0 | 0 | 0 | 0 | 1 | 1 | 1 | 1 | 1 | 1 | 1 | 1 | 1 | 1 | 1 | 1 | 0 |
| 114 | 6 OR MORE | 12 | – | 1 | X | X | X | X | X | X | X | 0 | 0 | 0 | 0 | 0 | 0 | 1 | 1 | 1 | 1 | 1 | 1 | 1 | 1 | 1 | 1 | 1 | 1 | 0 |

FIG. 13C

| | DETECTION PATTERN | | | | DETECTION BIT PATTERN | | | | | | | | | | | | | | | | | | | | | | | |
|---|---|---|---|---|---|---|---|---|---|---|---|---|---|---|---|---|---|---|---|---|---|---|---|---|---|---|---|---|
| | PRECED-ING SPACE LENGTH | TARGET MARK LENGTH | SUCCEED-ING SPACE LENGTH | DBA NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 115 | START EDGE | 2 | 2 | 2 | | X | X | X | X | X | X | X | 1 | 0 | 0 | 1 | 1 | 0 | 0 | 1 | X | X | X | X | X | X | X | X | X | X |
| 116 | 2 | 2 | 3 | 6 | X | X | X | X | X | X | X | 1 | 0 | 0 | 1 | 1 | 0 | 0 | 0 | 1 | X | X | X | X | X | X | X | X | X |
| 117 | 2 | 2 | 4 | 6 | X | X | X | X | X | X | X | 1 | 0 | 0 | 1 | 1 | 0 | 0 | 0 | 0 | 1 | X | X | X | X | X | X | X | X |
| 118 | 2 | 2 | 5 | 6 | X | X | X | X | X | X | X | 1 | 0 | 0 | 1 | 1 | 0 | 0 | 0 | 0 | 0 | 1 | X | X | X | X | X | X | X |
| 119 | 2 | 2 | 6 OR MORE | 6 | X | X | X | X | X | X | X | 1 | 0 | 0 | 1 | 1 | 0 | 0 | 0 | 0 | 0 | 0 | X | X | X | X | X | X | X | X |
| 120 | 3 | 2 | 2 | 8 | X | X | X | X | X | X | 1 | 0 | 0 | 0 | 1 | 1 | 0 | 0 | 1 | X | X | X | X | X | X | X | X | X | X |
| 121 | 3 | 2 | 3 | 6 | X | X | X | X | X | X | X | 1 | 0 | 0 | 1 | 1 | 0 | 0 | 0 | 1 | X | X | X | X | X | X | X | X | X |
| 122 | 3 | 2 | 4 | 6 | X | X | X | X | X | X | X | 1 | 0 | 0 | 1 | 1 | 0 | 0 | 0 | 0 | 1 | X | X | X | X | X | X | X | X |
| 123 | 3 | 2 | 5 | 6 | X | X | X | X | X | X | X | 1 | 0 | 0 | 1 | 1 | 0 | 0 | 0 | 0 | 0 | 1 | X | X | X | X | X | X | X |
| 124 | 3 | 2 | 6 OR MORE | 6 | X | X | X | X | X | X | X | 1 | 0 | 0 | 1 | 1 | 0 | 0 | 0 | 0 | 0 | 0 | X | X | X | X | X | X | X | X |
| 125 | 4 | 2 | 2 | 8 | X | X | X | X | X | X | 1 | 0 | 0 | 0 | 1 | 1 | 0 | 0 | 1 | X | X | X | X | X | X | X | X | X | X |
| 126 | 4 | 2 | 3 | 6 | X | X | X | X | X | X | X | 1 | 0 | 0 | 1 | 1 | 0 | 0 | 0 | 1 | X | X | X | X | X | X | X | X | X |
| 127 | 4 | 2 | 4 | 6 | X | X | X | X | X | X | X | 1 | 0 | 0 | 1 | 1 | 0 | 0 | 0 | 0 | 1 | X | X | X | X | X | X | X | X |
| 128 | 4 | 2 | 5 | 6 | X | X | X | X | X | X | X | 1 | 0 | 0 | 1 | 1 | 0 | 0 | 0 | 0 | 0 | 1 | X | X | X | X | X | X | X |
| 129 | 4 | 2 | 6 OR MORE | 6 | X | X | X | X | X | X | X | 1 | 0 | 0 | 1 | 1 | 0 | 0 | 0 | 0 | 0 | 0 | X | X | X | X | X | X | X | X |
| 130 | 5 | 2 | 2 | 8 | X | X | X | X | X | X | 1 | 0 | 0 | 0 | 1 | 1 | 0 | 0 | 1 | X | X | X | X | X | X | X | X | X | X |
| 131 | 5 | 2 | 3 | 6 | X | X | X | X | X | X | X | 1 | 0 | 0 | 1 | 1 | 0 | 0 | 0 | 1 | X | X | X | X | X | X | X | X | X |
| 132 | 5 | 2 | 4 | 6 | X | X | X | X | X | X | X | 1 | 0 | 0 | 1 | 1 | 0 | 0 | 0 | 0 | 1 | X | X | X | X | X | X | X | X |
| 133 | 5 | 2 | 5 | 6 | X | X | X | X | X | X | X | 1 | 0 | 0 | 1 | 1 | 0 | 0 | 0 | 0 | 0 | 1 | X | X | X | X | X | X | X |
| 134 | 5 | 2 | 6 OR MORE | 6 | X | X | X | X | X | X | X | 1 | 0 | 0 | 1 | 1 | 0 | 0 | 0 | 0 | 0 | 0 | X | X | X | X | X | X | X | X |
| 135 | 6 OR MORE | 2 | 2 | 8 | X | X | X | X | X | X | 0 | 0 | 0 | 0 | 1 | 1 | 0 | 0 | 1 | X | X | X | X | X | X | X | X | X | X |
| 136 | 6 OR MORE | 2 | 3 | 6 | X | X | X | X | X | X | X | 0 | 0 | 0 | 1 | 1 | 0 | 0 | 0 | 1 | X | X | X | X | X | X | X | X | X |
| 137 | 6 OR MORE | 2 | 4 | 6 | X | X | X | X | X | X | X | 0 | 0 | 0 | 1 | 1 | 0 | 0 | 0 | 0 | 1 | X | X | X | X | X | X | X | X |
| 138 | 6 OR MORE | 2 | 5 | 6 | X | X | X | X | X | X | X | 0 | 0 | 0 | 1 | 1 | 0 | 0 | 0 | 0 | 0 | 1 | X | X | X | X | X | X | X |
| 139 | 6 OR MORE | 2 | 6 OR MORE | 6 | X | X | X | X | X | X | X | 0 | 0 | 0 | 1 | 1 | 0 | 0 | 0 | 0 | 0 | 0 | X | X | X | X | X | X | X | X |
| 140 | 2 | 3 | 2 | 4 | X | X | X | X | X | X | 1 | 0 | 0 | 1 | 1 | 1 | 0 | 0 | 1 | X | X | X | X | X | X | X | X | X | X |
| 141 | 2 | 3 | 3 | 2 | X | X | X | X | X | X | X | 1 | 0 | 0 | 1 | 1 | 1 | 0 | 0 | 1 | X | X | X | X | X | X | X | X | X |
| 142 | 2 | 3 | 4 | 2 | X | X | X | X | X | X | X | 1 | 0 | 0 | 1 | 1 | 1 | 0 | 0 | 0 | 1 | X | X | X | X | X | X | X | X |
| 143 | 2 | 3 | 5 | 2 | X | X | X | X | X | X | X | 1 | 0 | 0 | 1 | 1 | 1 | 0 | 0 | 0 | 0 | 1 | X | X | X | X | X | X | X |
| 144 | 2 | 3 | 6 OR MORE | 2 | X | X | X | X | X | X | X | 1 | 0 | 0 | 1 | 1 | 1 | 0 | 0 | 0 | 0 | 0 | X | X | X | X | X | X | X | X |
| 145 | 3 | 3 | 2 | 4 | X | X | X | X | X | X | 1 | 0 | 0 | 1 | 1 | 1 | 0 | 0 | 1 | X | X | X | X | X | X | X | X | X | X |
| 146 | 3 | 3 | 3 | 2 | X | X | X | X | X | X | X | 1 | 0 | 0 | 1 | 1 | 1 | 0 | 0 | 1 | X | X | X | X | X | X | X | X | X |
| 147 | 3 | 3 | 4 | 2 | X | X | X | X | X | X | X | 1 | 0 | 0 | 1 | 1 | 1 | 0 | 0 | 0 | 1 | X | X | X | X | X | X | X | X |
| 148 | 3 | 3 | 5 | 2 | X | X | X | X | X | X | X | 1 | 0 | 0 | 1 | 1 | 1 | 0 | 0 | 0 | 0 | 1 | X | X | X | X | X | X | X |
| 149 | 3 | 3 | 6 OR MORE | 2 | X | X | X | X | X | X | X | 1 | 0 | 0 | 1 | 1 | 1 | 0 | 0 | 0 | 0 | 0 | X | X | X | X | X | X | X | X |
| 150 | 4 | 3 | 2 | 4 | X | X | X | X | X | X | 1 | 0 | 0 | 0 | 1 | 1 | 1 | 0 | 0 | 1 | X | X | X | X | X | X | X | X | X |
| 151 | 4 | 3 | 3 | 2 | X | X | X | X | X | X | X | 1 | 0 | 0 | 1 | 1 | 1 | 0 | 0 | 1 | X | X | X | X | X | X | X | X | X |
| 152 | 4 | 3 | 4 | 2 | X | X | X | X | X | X | X | 1 | 0 | 0 | 1 | 1 | 1 | 0 | 0 | 0 | 1 | X | X | X | X | X | X | X | X |
| 153 | 4 | 3 | 5 | 2 | X | X | X | X | X | X | X | 1 | 0 | 0 | 1 | 1 | 1 | 0 | 0 | 0 | 0 | 1 | X | X | X | X | X | X | X |
| 154 | 4 | 3 | 6 OR MORE | 2 | X | X | X | X | X | X | X | 1 | 0 | 0 | 1 | 1 | 1 | 0 | 0 | 0 | 0 | 0 | X | X | X | X | X | X | X | X |
| 155 | 5 | 3 | 2 | 4 | X | X | X | X | X | X | 1 | 0 | 0 | 0 | 1 | 1 | 1 | 0 | 0 | 1 | X | X | X | X | X | X | X | X | X |
| 156 | 5 | 3 | 3 | 2 | X | X | X | X | X | X | X | 1 | 0 | 0 | 1 | 1 | 1 | 0 | 0 | 1 | X | X | X | X | X | X | X | X | X |
| 157 | 5 | 3 | 4 | 2 | X | X | X | X | X | X | X | 1 | 0 | 0 | 1 | 1 | 1 | 0 | 0 | 0 | 1 | X | X | X | X | X | X | X | X |
| 158 | 5 | 3 | 5 | 2 | X | X | X | X | X | X | X | 1 | 0 | 0 | 1 | 1 | 1 | 0 | 0 | 0 | 0 | 1 | X | X | X | X | X | X | X |
| 159 | 5 | 3 | 6 OR MORE | 2 | X | X | X | X | X | X | X | 1 | 0 | 0 | 1 | 1 | 1 | 0 | 0 | 0 | 0 | 0 | X | X | X | X | X | X | X | X |
| 160 | 6 OR MORE | 3 | 2 | 4 | X | X | X | X | X | X | 0 | 0 | 0 | 0 | 1 | 1 | 1 | 0 | 0 | 1 | X | X | X | X | X | X | X | X | X |
| 161 | 6 OR MORE | 3 | 3 | 2 | X | X | X | X | X | X | X | 0 | 0 | 0 | 1 | 1 | 1 | 0 | 0 | 1 | X | X | X | X | X | X | X | X | X |
| 162 | 6 OR MORE | 3 | 4 | 2 | X | X | X | X | X | X | X | 0 | 0 | 0 | 1 | 1 | 1 | 0 | 0 | 0 | 1 | X | X | X | X | X | X | X | X |
| 163 | 6 OR MORE | 3 | 5 | 2 | X | X | X | X | X | X | X | 0 | 0 | 0 | 1 | 1 | 1 | 0 | 0 | 0 | 0 | 1 | X | X | X | X | X | X | X |
| 164 | 6 OR MORE | 3 | 6 OR MORE | 2 | X | X | X | X | X | X | X | 0 | 0 | 0 | 1 | 1 | 1 | 0 | 0 | 0 | 0 | 0 | X | X | X | X | X | X | X | X |
| 165 | 2 | 4 | 2 | 4 | X | X | X | X | X | X | 1 | 0 | 0 | 1 | 1 | 1 | 1 | 0 | 0 | 1 | X | X | X | X | X | X | X | X | X |
| 166 | 2 | 4 | 3 | 2 | X | X | X | X | X | X | X | 1 | 0 | 0 | 1 | 1 | 1 | 1 | 0 | 0 | 1 | X | X | X | X | X | X | X | X |
| 167 | 2 | 4 | 4 | 2 | X | X | X | X | X | X | X | 1 | 0 | 0 | 1 | 1 | 1 | 1 | 0 | 0 | 0 | 1 | X | X | X | X | X | X | X |
| 168 | 2 | 4 | 5 | 2 | X | X | X | X | X | X | X | 1 | 0 | 0 | 1 | 1 | 1 | 1 | 0 | 0 | 0 | 0 | 1 | X | X | X | X | X | X |
| 169 | 2 | 4 | 6 OR MORE | 2 | X | X | X | X | X | X | X | 1 | 0 | 0 | 1 | 1 | 1 | 1 | 0 | 0 | 0 | 0 | 0 | X | X | X | X | X | X | X |
| 170 | 3 | 4 | 2 | 4 | X | X | X | X | X | X | 1 | 0 | 0 | 1 | 1 | 1 | 1 | 0 | 0 | 1 | X | X | X | X | X | X | X | X | X |
| 171 | 3 | 4 | 3 | 2 | X | X | X | X | X | X | X | 1 | 0 | 0 | 1 | 1 | 1 | 1 | 0 | 0 | 1 | X | X | X | X | X | X | X | X |
| 172 | 3 | 4 | 4 | 2 | X | X | X | X | X | X | X | 1 | 0 | 0 | 1 | 1 | 1 | 1 | 0 | 0 | 0 | 1 | X | X | X | X | X | X | X |
| 173 | 3 | 4 | 5 | 2 | X | X | X | X | X | X | X | 1 | 0 | 0 | 1 | 1 | 1 | 1 | 0 | 0 | 0 | 0 | 1 | X | X | X | X | X | X |
| 174 | 3 | 4 | 6 OR MORE | 2 | X | X | X | X | X | X | X | 1 | 0 | 0 | 1 | 1 | 1 | 1 | 0 | 0 | 0 | 0 | 0 | X | X | X | X | X | X | X |
| 175 | 4 | 4 | 2 | 4 | X | X | X | X | X | X | 1 | 0 | 0 | 0 | 1 | 1 | 1 | 1 | 0 | 0 | 1 | X | X | X | X | X | X | X | X |
| 176 | 4 | 4 | 3 | 2 | X | X | X | X | X | X | X | 1 | 0 | 0 | 1 | 1 | 1 | 1 | 0 | 0 | 1 | X | X | X | X | X | X | X | X |
| 177 | 4 | 4 | 4 | 2 | X | X | X | X | X | X | X | 1 | 0 | 0 | 1 | 1 | 1 | 1 | 0 | 0 | 0 | 1 | X | X | X | X | X | X | X |
| 178 | 4 | 4 | 5 | 2 | X | X | X | X | X | X | X | 1 | 0 | 0 | 1 | 1 | 1 | 1 | 0 | 0 | 0 | 0 | 1 | X | X | X | X | X | X |
| 179 | 4 | 4 | 6 OR MORE | 2 | X | X | X | X | X | X | X | 1 | 0 | 0 | 1 | 1 | 1 | 1 | 0 | 0 | 0 | 0 | 0 | X | X | X | X | X | X | X |
| 180 | 5 | 4 | 2 | 4 | X | X | X | X | X | X | 1 | 0 | 0 | 0 | 1 | 1 | 1 | 1 | 0 | 0 | 1 | X | X | X | X | X | X | X | X |
| 181 | 5 | 4 | 3 | 2 | X | X | X | X | X | X | X | 1 | 0 | 0 | 1 | 1 | 1 | 1 | 0 | 0 | 1 | X | X | X | X | X | X | X | X |
| 182 | 5 | 4 | 4 | 2 | X | X | X | X | X | X | X | 1 | 0 | 0 | 1 | 1 | 1 | 1 | 0 | 0 | 0 | 1 | X | X | X | X | X | X | X |
| 183 | 5 | 4 | 5 | 2 | X | X | X | X | X | X | X | 1 | 0 | 0 | 1 | 1 | 1 | 1 | 0 | 0 | 0 | 0 | 1 | X | X | X | X | X | X |
| 184 | 5 | 4 | 6 OR MORE | 2 | X | X | X | X | X | X | X | 1 | 0 | 0 | 1 | 1 | 1 | 1 | 0 | 0 | 0 | 0 | 0 | X | X | X | X | X | X | X |
| 185 | 6 OR MORE | 4 | 2 | 4 | X | X | X | X | X | X | 0 | 0 | 0 | 0 | 1 | 1 | 1 | 1 | 0 | 0 | 1 | X | X | X | X | X | X | X | X |
| 186 | 6 OR MORE | 4 | 3 | 2 | X | X | X | X | X | X | X | 0 | 0 | 0 | 1 | 1 | 1 | 1 | 0 | 0 | 1 | X | X | X | X | X | X | X | X |
| 187 | 6 OR MORE | 4 | 4 | 2 | X | X | X | X | X | X | X | 0 | 0 | 0 | 1 | 1 | 1 | 1 | 0 | 0 | 0 | 1 | X | X | X | X | X | X | X |
| 188 | 6 OR MORE | 4 | 5 | 2 | X | X | X | X | X | X | X | 0 | 0 | 0 | 1 | 1 | 1 | 1 | 0 | 0 | 0 | 0 | 1 | X | X | X | X | X | X |

| No. | Discriminator Bit Array | | | | | | | | XOR Mask Bit Array | | | | | | | | | | | | | | | | |
|---|---|---|---|---|---|---|---|---|---|---|---|---|---|---|---|---|---|---|---|---|---|---|---|---|---|
| | | | | | | | | | L-Target | | | | | | | | R-Target | | | | | | | | |
| 1 | X | X | 1 | 1 | 0 | 0 | 0 | X | X | X | 0 | 1 | 0 | 0 | 0 | X | X | X | 0 | 0 | 1 | 0 | 0 | X | X |
| 2 | X | X | 0 | 0 | 0 | 0 | 1 | X | X | X | 0 | 1 | 0 | 0 | 0 | X | X | X | 0 | 0 | 1 | 0 | 0 | X | X |
| 3 | X | X | 1 | 1 | 0 | 1 | 0 | X | X | X | 0 | 1 | 0 | 0 | 0 | X | | | | | | | | | |
| 4 | X | X | 0 | 0 | 1 | 0 | 0 | X | X | X | 0 | 1 | 0 | 0 | 0 | X | | | | | | | | | |
| 5 | X | X | 0 | 1 | 0 | 0 | 0 | X | 0 | 0 | 1 | 0 | 1 | 0 | 0 | 0 | X | X | 0 | 0 | 1 | 0 | 0 | X | X |
| 6 | X | X | 1 | 0 | 0 | 1 | 1 | X | 0 | 0 | 1 | 0 | 1 | 0 | 0 | 0 | X | X | 0 | 0 | 1 | 0 | 0 | X | X |
| 7 | 0 | 0 | 0 | 0 | 1 | 0 | 0 | 1 | 1 | 0 | 0 | 0 | 1 | 0 | 0 | 0 | 0 | 0 | 0 | 0 | 0 | 1 | 1 | 0 | 0 |
| 8 | 1 | 1 | 1 | 1 | 0 | 1 | 0 | 0 | 0 | 1 | 0 | 0 | 1 | 0 | 0 | 0 | 0 | 0 | 0 | 0 | 0 | 1 | 1 | 0 | 0 |

FIG. 15

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| INPUT DATA | PR CLASS | D1 | 3 | 6 | 9 | 13 | 16 | 17 | 16 | 13 | 9 | 6 | 3 | | | | | | | | | | | | | | | |
| | TIME POINT | D2 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| | VITERBI DETECTION RESULT | D3 | 0 | 0 | 0 | 1 | 1 | 1 | 1 | 0 | 0 | 0 | 0 | 1 | 1 | 0 | 0 | 1 | 1 | 1 | 1 | 0 | 0 | 1 | 1 | 1 | 1 | 1 |
| | INPUT WAVEFORM | D4 | 21 | 14 | 12 | 15 | 16 | 15 | 9 | -2 | -17 | -29 | -31 | -23 | -10 | 5 | 16 | 27 | 34 | 38 | 37 | 38 | 42 | 51 | 57 | 63 | 64 | 62 |
| INTERMEDIATE OPERATION PROCESSING | PR CLASS MAXIMUM AMPLITUDE | D5 | 111 | | | | | | | | | | | | | | | | | | | | | | | | | |
| | MAXIMUM AMPLITUDE OF INPUT WAVEFORM | D6 | 222 | | | | | | | | | | | | | | | | | | | | | | | | | |
| | PR CLASS NORMALIZATION | D7 | 6 | 12 | 18 | 26 | 32 | 34 | 32 | 26 | 18 | 12 | 6 | | | | | | | | | | | | | | | |
| | VITERBI DETECTION RESULT (CORRECTION) | D8 | -0.5 | -0.5 | -0.5 | 0.5 | 0.5 | 0.5 | 0.5 | -0.5 | -0.5 | -0.5 | -0.5 | 0.5 | 0.5 | -0.5 | -0.5 | 0.5 | 0.5 | 0.5 | 0.5 | -0.5 | -0.5 | 0.5 | 0.5 | 0.5 | 0.5 | 0.5 |
| | IDEAL WAVEFORM | D9 | | | | | | 13 | 5 | -5 | -19 | -31 | -29 | -21 | -9 | 9 | 21 | 29 | 37 | 37 | 35 | 39 | 45 | | | | | |
| | R-TARGET | D10 | | | | | | | | | 0 | 0 | 0 | 0 | 0 | 1 | 0 | 1 | 0 | 0 | | | | | | | | |
| | L-TARGET | D11 | | | | | | | | | 0 | 0 | 1 | 0 | 1 | 0 | 0 | 0 | 0 | 0 | | | | | | | | |
| | R-TARGET PRODUCT | D12 | -0.5 | -0.5 | -0.5 | 0.5 | 0.5 | 0.5 | 0.5 | -0.5 | -0.5 | -0.5 | -0.5 | 0.5 | 0.5 | 0.5 | -0.5 | -0.5 | 0.5 | 0.5 | 0.5 | -0.5 | -0.5 | 0.5 | 0.5 | 0.5 | 0.5 | 0.5 |
| | L-TARGET PRODUCT | D13 | -0.5 | -0.5 | -0.5 | 0.5 | -0.5 | 0.5 | 0.5 | -0.5 | -0.5 | -0.5 | 0.5 | 0.5 | -0.5 | -0.5 | -0.5 | 0.5 | 0.5 | 0.5 | 0.5 | -0.5 | -0.5 | 0.5 | 0.5 | | | |
| | PRECEDING-SHIFT IDEAL WAVEFORM | D14 | | | | | | | | | -13 | -19 | -17 | -7 | 5 | 17 | 21 | 21 | 23 | 23 | 23 | 27 | 39 | | | | | |
| | SUCCEEDING-SHIFT IDEAL WAVEFORM | D15 | | | | | | 19 | 17 | 7 | -5 | -17 | -21 | -21 | -17 | -5 | 7 | 17 | 25 | 31 | | | | | | | | |
| | DISTANCE BETWEEN PRECEDING-SHIFT IDEAL WAVEFORM AND IDEAL WAVEFORM AT EACH TIME POINT | D16 | | | | | | | | | 36 | 144 | 144 | 196 | 196 | 64 | 0 | 64 | 196 | 196 | 144 | 144 | 36 | | | | | |
| | SQUARE EUCLIDEAN DISTANCE BETWEEN PRECEDING-SHIFT IDEAL WAVEFORM AND IDEAL WAVEFORM | D17 | 1560 | | | | | | | | | | | | | | | | | | | | | | | | | |
| L-SEAT OPERATION | PRECEDING-SHIFT OPERATION VALUE AT EACH TIME POINT | D18 | | | | | | | | | 12 | 24 | -24 | -28 | -14 | -32 | 0 | 16 | 42 | -14 | -24 | 12 | 18 | | | | | |
| | PRECEDING-SHIFT INTEGRATED VALUE | D19 | -12 | | | | | | | | | | | | | | | | | | | | | | | | | |
| | SUCCEEDING-SHIFT OPERATION VALUE AT EACH TIME POINT | D20 | | | | | | 12 | 48 | 36 | 28 | 28 | -16 | 0 | 8 | 56 | 70 | 24 | 36 | -6 | | | | | | | | |
| | SUCCEEDING-SHIFT INTEGRATED VALUE | D21 | 324 | | | | | | | | | | | | | | | | | | | | | | | | | |
| | L-SEAT VALUE | D22 | -168 | | | | | | | | | | | | | | | | | | | | | | | | | |
| | L-SEAT VALUE (NORMALIZED) | D23 | -0.108 | | | | | | | | | | | | | | | | | | | | | | | | | |

OPTICAL DISK RECORDING METHOD, OPTICAL DISK DEVICE, AND INTEGRATED CIRCUIT

TECHNICAL FIELD

The present disclosure relates to an optical disk recording method for recording information on an optical disk, an optical disk device, and an integrated circuit that executes a processing related to information recording.

BACKGROUND ART

As the related art, there are standards for BD-R, BD-RE, DVD-RAM, DVD-R, DVD-RW, CD-RW, and the like which are recording media of an optical disk, and there is a technique of irradiating a laser beam onto an optical disk conforming to these standards to record information by additional writing or rewriting. Recently, a technique for performing recording on an optical disk with a higher density than a BD (Blu-ray (registered trademark) Disc) has been studied.

BD is a high-density optical disk having a recording capacity of about 25 GB for single-sided single-layer and about 50 GB for single-sided dual-layer. Further, BDXL (registered trademark) has been put to practical use, in which a channel bit length, that is, a mark length of BD is shortened to increase the density in the line density direction, thereby realizing a large capacity of 100 GB for 3 layers and 128 GB for four layers. In order to further increase the recording capacity, there has been proposed an optical disk device that performs information recording using an optical disk that employs a method of recording data on both a groove track and a land track (referred to as "land and groove recording method" as appropriate) (see, for example, Patent Literature 1).

In the case of increasing the recording density, since a mark for recording information becomes smaller than the diameter of an optical beam spot irradiated on an optical disk, a technique for sufficiently reducing an error rate when reading a minute mark is required. As an example, in an optical disk device that performs recording or reproducing using maximum likelihood decoding such as PRML (Partial Response Maximum Likelihood), in order to reduce optical intersymbol interference or thermal interference that occurs during recording or reproducing, a technique has been proposed in which conditions of a recording pulse string, etc. are adjusted according to a mark length of a recording mark and a space length to perform writing under an optimal recording condition (see, for example, Patent Literature 2). Patent Literature 2 is an example of adaptive recording compensation technique for calculating a shift evaluation value of an edge of interest in a binary bit array of a reproduction signal waveform, and adjusting the start position of the last pulse in the pulse string of the recording pulse so that the shift evaluation value is minimized. This related-art example discloses the adaptive recording compensation in which the edge shift evaluation value is calculated by performing classification into a plurality of patterns according to a recording mark length and a subsequent space length, an adjustment value is calculated for each classification, and the last pulse start position is adjusted.

CITATION LIST

Patent Literature

Patent Literature 1: WO 2016/208104
Patent Literature 2: WO 2011/089735

SUMMARY OF INVENTION

Technical Problem

In the case of further increasing the recording density of an optical disk, for example, achieving a recording density exceeding that of an optical disk device supporting the above-mentioned BDXL (registered trademark), the related art has a problem that optical intersymbol interference and thermal interference generated at the time of recording or reproducing cannot be sufficiently reduced.

The present disclosure has been contrived in view of the above-described circumstances of the related arts, and aims to provide an optical disk recording method, an optical disk device, and an integrated circuit which can reduce optical intersymbol interference and thermal interference according to a further increase in the density of an optical disk.

Solution to Problem

The present disclosure provides an optical disk recording method for irradiating an optical disk with an optical beam to form a plurality of marks on a medium, and recording information using edge positions of each mark and a space between two adjacent marks, including: encoding recording data according to modulation codes to generate binary encoded data corresponding to the mark and the space; regarding run lengths of the mark and the space in the encoded data, if a mark of interest is target mark, classifying the encoded data according to a combination of at least two run lengths of a mark length of the target mark, a space length of a preceding space on a preceding side of the target mark, a mark length of a preceding mark on the preceding side of the target mark, and a space length of a succeeding space on a succeeding side of the target mark; for each classification of the run length of the encoded data, setting individual correction amounts for adjusting positions of a start edge and an end edge of a recording pulse for forming the mark, based on an evaluation index of a decoding result which is obtained when a reproduction signal obtained by reproducing the mark and space corresponding to the encoded data is decoded by maximum likelihood decoding of a PRML scheme; generating a recording pulse according to the encoded data using the correction amount according to the classification of the run length of the encoded data; and forming a mark according to the recording data on the medium of the optical disk by changing a power of the optical beam in a plurality of stages with the recording pulse and irradiating the optical disk with the optical beam, wherein the encoded data is generated by modulation codes having a maximum code length of 11T or more, and includes a code array having a minimum run length of 2T and a maximum run length of 11T or more, wherein a constraint length, which is a class of the maximum likelihood decoding of the PRML scheme, is 11 or more, wherein the evaluation index of the decoding result is an evaluation index by an extended L-SEAT operation in which an L-SEAT value representing a shift amount in a preceding or succeeding direction of a pattern in a predetermined range of a recording mark of interest is calculated using a binary bit array of the decoding result of the reproduction signal by the maximum likelihood decoding with the constraint length of 11 or more and at least one of a right-shift bit array and a left-shift bit array obtained by shifting the binary bit array by a single bit to right and left respectively, and wherein in the classification of the encoded data, the classification is performed for each of run lengths 2T, 3T, 4T, 5T, 6T, 7T, and 8T or more according to the mark length of the target mark, and the correction amount is set for each classification.

The present disclosure provides an optical disk device which irradiates an optical disk with an optical beam to form a plurality of marks on a medium, and records information using edge positions of each mark and a space between two adjacent marks, including: an encoding unit configured to encode recording data according to modulation codes to generate binary encoded data corresponding to the mark and the space; a classification unit configured to, regarding run lengths of the mark and the space in the encoded data, if a mark of interest is target mark, classify the encoded data according to a combination of at least two run lengths of a mark length of the target mark, a space length of a preceding space on a preceding side of the targetmark, a mark length of a preceding mark on the preceding side of the target mark, and a space length of a succeeding space on a succeeding side of the target mark; a correction amount setting unit configured to for each classification of the run length of the encoded data, set individual correction amounts for adjusting positions of a start edge and an end edge of a recording pulse for forming the mark, based on an evaluation index of a decoding result which is obtained when a reproduction signal obtained by reproducing the mark and space corresponding to the encoded data is decoded by maximum likelihood decoding of a PRML scheme; a recording waveform generating unit configured to generate a recording pulse according to the encoded data using the correction amount according to the classification of the run length of the encoded data; and a recording light output unit configured to form a mark according to the recording data on the medium of the optical disk by changing a power of the optical beam in a plurality of stages with the recording pulse and irradiating the optical disk with the optical beam, wherein the encoded data is generated by modulation codes having a maximum code length of 11T or more, and includes a code array having a minimum run length of 2T and a maximum run length of 11T or more, wherein a constraint length, which is a class of the maximum likelihood decoding of the PRML scheme, is 11 or more, wherein the evaluation index of the decoding result is an evaluation index by an extended L-SEAT operation in which an L-SEAT value representing a shift amount in a preceding or succeeding direction of a pattern in a predetermined range of a recording mark of interest is calculated using a binary bit array of the decoding result of the reproduction signal by the maximum likelihood decoding with the constraint length of 11 or more and at least one of a right-shift bit array and a left-shift bit array obtained by shifting the binary bit array by a single bit to right and left respectively, wherein the classification unit performs, in the classification of the encoded data, the classification for each of run lengths 2T, 3T, 4T, 5T, 6T, 7T, and 8T or more according to the mark length of the target mark, and wherein the correction amount setting unit sets the correction amount for each classification.

The present disclosure provides an integrated circuit which executes individual processes in an optical disk recording method for irradiating an optical disk with an optical beam to form a plurality of marks on a medium, and recording information using edge positions of each mark and a space between two adjacent marks, the processes including: encoding recording data according to modulation codes to generate binary encoded data corresponding to the mark and the space; regarding run lengths of the mark and the space in the encoded data, if a mark of interest is target mark, classifying the encoded data according to a combination of at least two run lengths of a mark length of the target mark, a space length of a preceding space on a preceding side of the target mark, a mark length of a preceding mark on the preceding side of the target mark, and a space length of a succeeding space on a succeeding side of the target mark; for each classification of the run length of the encoded data, setting individual correction amounts for adjusting positions of a start edge and an end edge of a recording pulse for forming the mark, based on an evaluation index of a decoding result which is obtained when a reproduction signal obtained by reproducing the mark and space corresponding to the encoded data is decoded by maximum likelihood decoding of a PRML scheme; generating a recording pulse according to the encoded data using the correction amount according to the classification of the run length of the encoded data; and forming a mark according to the recording data on the medium of the optical disk by changing a power of the optical beam in a plurality of stages with the recording pulse and irradiating the optical disk with the optical beam, wherein the encoded data is generated by modulation codes having a maximum code length of 11T or more, and includes a code array having a minimum run length of 2T and a maximum run length of 11T or more, wherein a constraint length, which is a class of the maximum likelihood decoding of the PRML scheme, is 11 or more, wherein the evaluation index of the decoding result is an evaluation index by an extended L-SEAT operation in which an L-SEAT value representing a shift amount in a preceding or succeeding direction of a pattern in a predetermined range of a recording mark of interest is calculated using a binary bit array of the decoding result of the reproduction signal by the maximum likelihood decoding with the constraint length of 11 or more and at least one of a right-shift bit array and a left-shift bit array obtained by shifting the binary bit array by a single bit to right and left respectively, and wherein in the classification of the encoded data, the classification is performed for each of run lengths 2T, 3T, 4T, 5T, 6T, 7T, and 8T or more according to the mark length of the target mark, and the correction amount is set for each classification.

Advantageous Effects of Invention

According to the present disclosure, optical intersymbol interference and thermal interference can be reduced in response to a further increase in the density of an optical disk.

BRIEF DESCRIPTION OF DRAWINGS

[FIG. 12A] A diagram illustrating a first example of classification of a detection bit pattern used in the adaptive recording compensation of the embodiment.

[FIG. 12B] A diagram illustrating the first example of classification of the detection bit pattern used in the adaptive recording compensation of the embodiment.

[FIG. 12C] A diagram illustrating the first example of classification of the detection bit pattern used in the adaptive recording compensation of the embodiment.

[FIG. 12D] A diagram illustrating the first example of classification of the detection bit pattern used in the adaptive recording compensation of the embodiment.

[FIG. 13A] A diagram illustrating a second example of classification of the detection bit pattern used in the adaptive recording compensation of the embodiment.

[FIG. 13B] A diagram illustrating the second example of classification of the detection bit pattern used in the adaptive recording compensation of the embodiment.

[FIG. 13C] A diagram illustrating the second example of classification of the detection bit pattern used in the adaptive recording compensation of the embodiment.

[FIG. 13D] A diagram illustrating the second example of classification of the detection bit pattern used in the adaptive recording compensation of the embodiment.

[FIG. 14] A diagram illustrating types of bit arrays used for an extended L-SEAT operation in the embodiment.

[FIG. 15] A diagram for explaining an example of the extended L-SEAT operation processing in the embodiment.

DESCRIPTION OF EMBODIMENTS

Figure 1:
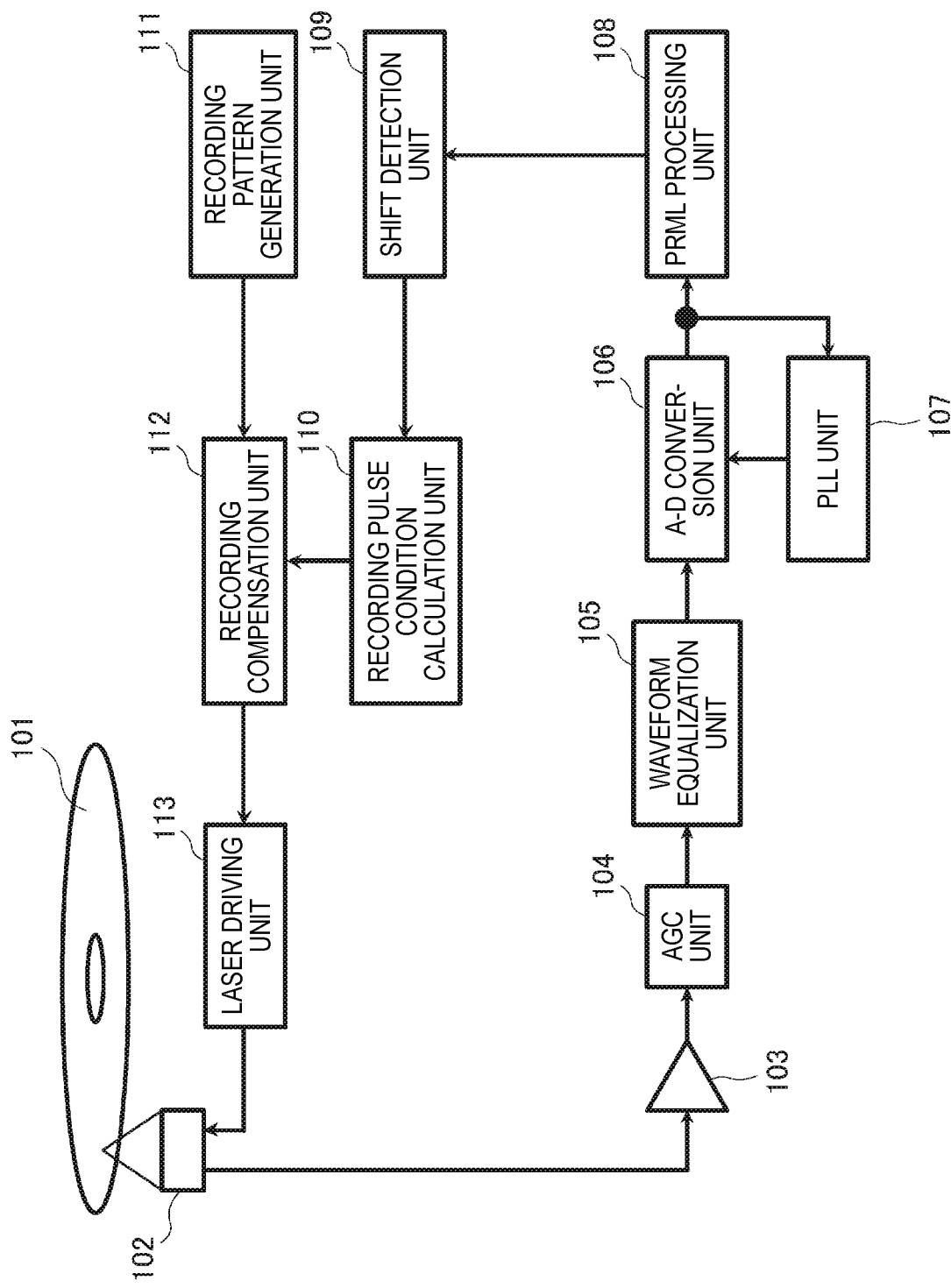
[FIG. 1] A block diagram illustrating an example of a configuration of an optical disk device according to an embodiment.

Hereinafter, each embodiment which specifically discloses an optical disk recording method and an optical disk device according to the present disclosure will be described in detail with reference to the drawings as appropriate. However, more detailed description than necessary may be omitted. For example, detailed explanation of already well-known matters and duplicate explanation for substantially the same configuration may be omitted. This is to avoid the following explanation becoming unnecessarily redundant and facilitate understanding by those skilled in the art. The attached drawings and the following description are provided to enable those skilled in the art to fully understand the present disclosure but not intended to limit the claimed subject matter.

The present disclosure exemplifies embodiments relating to an optical disk recording method, an optical disk device, an optical disk reproducing method, and an integrated circuit using maximum likelihood decoding such as PRML. The present disclosure exemplifies a technique which performs adaptive recording compensation in accordance with at least the space lengths of spaces on preceding and succeeding sides of a mark of interest and performs writing under an optimum recording condition, in order to reduce optical intersymbol interference or thermal interference that occurs when recording or reproducing a mark that is sufficiently smaller than the spot diameter of an optical beam. Further, the present disclosure exemplifies a technique which performs writing under the optimum recording condition by performing the adaptive recording compensation further in accordance with, in addition to the space lengths of the spaces on the preceding and succeeding sides of the mark of interest, mark lengths of marks on preceding and succeeding sides of the space.

In this specification, a direction in which an optical beam spot travels on an optical disk by rotation of the optical disk, which is an optical information recording medium, starting from a certain position is referred to as "succeeding" of the position, and the opposite direction starting from the certain position is referred to as "preceding".

(Background to the Content of each Embodiment of the Present Disclosure)

When recording a minute mark or space on an optical disk, a laser beam for recording (referred to as "recording pulse" as appropriate) having a predetermined pulse shape is irradiated onto the recording surface of the optical disk to cause a change in the physical state of a mark on the recording surface, thereby recording information. Then, by irradiating a laser beam for reproduction onto the recording surface of the optical disk and detecting a change in the reflectance of the recording surface, information is read out and reproduced.

In order to increase the recording density, it is generally conceivable to shorten the length of a mark or space to be recorded (to increase the linear density). However, especially when the length of a space on the just preceding side of a recording mark is reduced, thermal interference occurs in which heat at the end portion of the recording mark conducts through a space and affects temperature rise at the start portion of the next mark, and, in contrast, heat at the start portion of the recording mark affects cooling process at the end portion of a mark on the preceding side. Even if marks and spaces with individual correct lengths are formed on a track, there arises a problem in which the edge positions of short marks and spaces detected during reproduction are reproduced differently from individual ideal values due to the frequency characteristics of a reproduction optical system determined by the size of an optical beam spot. The shift between the detected edge and the ideal value is generally called intersymbol interference. When the size of the mark and the space is smaller than that of the optical spot, the intersymbol interference becomes remarkable, causing a problem that jitter at the time of reproduction is increased and a bit error rate is increased.

For example, at the recording density as in BD, the size of a mark to be recorded and the distance of the space between marks are small. As a result, the heat of a laser beam applied to form a mark reaches not only the target mark but also marks on the preceding and succeeding sides via the spaces, and distortion may occur in the shapes of the target mark and the marks on the preceding and succeeding sides. In order to avoid this, there is known a technique in which a start pulse position of recording pulses for forming a mark is changed according to the relationship between the length of the target mark and the length of a space on the just preceding side of the target mark, or a technique in which a last pulse position of recording pulses for forming a mark is changed according to the relationship between the length of the target mark and the length of a space on the just trailing side of the target mark. This technique performs recording by correcting in advance the thermal interference of a recording mark. This recording pulse position control is generally called adaptive recording compensation.

An example of the adaptive recording compensation using a maximum likelihood decoding method such as PRML (referred to as a "PRML scheme" as appropriate) will be described. For example, in an optical disk device, for a plurality of possible combinations such as a combination of the length of a mark and the length of a space on the just preceding side of the mark of an optical disk or a combination of the length of a mark and the length of a space on the just trailing side of the mark, recording parameters specifying the positional information of the recording pulses for each combination are set in advance. Using the set recording parameters, test writing is performed on a predetermined track on an optical disk, and information recorded by the test writing is reproduced. For the obtained reproduction signal, a signal pattern of the recorded information is preliminarily estimated from the reproduction signal waveform, and an estimated signal waveform is generated. Next, demodulated data having the most probable signal path is decoded from the reproduction signal while comparing the reproduction signal waveform with the estimated signal waveform. By such a PRML scheme, the recording parameters are optimized so that the probability of occurrence of an error when decoding a reproduction signal is minimized.

With the increase in the density of an optical disk, a mark length approaches the limit of the optical resolution, and the increase in the intersymbol interference and the deterioration of SNR (Signal to Noise Ratio) have become more remarkable. When the recording density of an optical disk is increased, the size of a recording mark becomes smaller than the size of the optical spot, and the amplitude of an obtained reproduction signal becomes also smaller. The resolution of the optical spot is determined by the wavelength $\lambda$ of the laser beam and the numerical aperture NA (Numerical Aperture) of an objective lens. When the length of the recording mark having the shortest run length becomes $\lambda/(4 \cdot NA)$ or less, the amplitude of a repetition signal becomes zero. This is a phenomenon generally known as an optical cutoff. In BD, the wavelength $\lambda=405$ nm and the numerical aperture NA of the objective lens =0.85, so that $\lambda/(4 \cdot NA)$ is almost equal to 119 nm. When a track pitch is constant in BD, in order to achieve a capacity of about 31 GB or more, the amplitude of the repetition signal having the shortest run length 2T becomes zero. In order to obtain good reproduction performance under such a high-density condition, it is essential to use the PRML scheme.

In the case of BD, a recording capacity is about 25 GB for single-sided single layer. At this recording density, a necessary system margin can be secured by employing the PR (1, 2, 2, 1) ML scheme. In the case of high density BDXL (registered trademark), the recording capacity is about 33.4 GB for single-sided single layer and 100 GB for triple layers. Under such a high-density condition, required reproduction performance can be obtained by increasing the constraint length of the PRML scheme and employing the PR (1, 2, 2, 2, 1) ML scheme.

Recently, ultra-high-density optical disk devices exceeding the recording density of optical disk devices supporting BDXL (registered trademark) have been studied to further increase the recording density. In the present specification, as an example, an optical disk device using an optical disk having about 83.33 GB for single-sided single-layer and about 500 GB for double-sided triple-layer is studied in which the recording density in the linear direction (track direction) of an optical disk is increased to 1.7 times that of BDXL (registered trademark) by miniaturizing recording marks and spaces, and the recording density in the radial direction is increased to 1.4 times that of BDXL by adopting the land and groove recording scheme. In this optical disk device, it is necessary to record and reproduce a recording mark and a space smaller than the spot size at optical diffraction limit determined by $\lambda/NA$. When performing such high-density recording/reproducing, there arises a problem that the thermal interference by a recording mark and the intersymbol interference during reproduction sharply increase, and reproduction signal quality such as SER (Symbol Error Rate) deteriorates.

Thus, the embodiment provides an optical disk recording method, an optical disk device, and an integrated circuit that reduce the optical intersymbol interference and the thermal interference in response to a further increase in the density, thereby enabling recording and reproducing with the ultra-high density as described above.

(Outline of the Embodiment)

In the embodiment, a write-once optical disk medium will be described as an example of an optical information recording medium. However, this does not particularly limit the type of the recording medium. The type of the recording medium is not limited as long as the recording medium records information by injecting energy into the recording medium to form a mark having different physical properties from an unrecorded portion. For example, this technique can be commonly applied to a rewritable optical disk medium.

The main optical condition and the disk structure used in the recording method of the embodiment are as follows, for example. In the embodiment, in order to increase the density, the NA of the objective lens is increased, the shortest mark length and space length are shortened, and the track pitch is reduced. However, the content of the present invention is not limited to the numerical values.

Laser beam: within a wavelength range of 400 nm to 410 nm, for example, wavelength $\lambda=405$ nm Objective lens: NA in the range of 0.90 to 0.92, for example, NA=0.91

Track pitch 0.225 µm, land and groove recording scheme, single-speed (1×) channel bit rate 61.408 Mbps, single-speed (1×) linear velocity 2.101 m/s, shortest mark length (2T) of optical disk 68.432 nm, shortest space is the same Modulation code used for recording data: 110PCWA (Parity-Complementary Word Assignment), code length 2T to 11T PR class used for maximum likelihood decoding of a reproduction signal: PR (3, 6, 9, 13, 16, 17, 16, 13, 9, 6, 3), constraint length=11

When recording is performed at a linear density at which the shortest mark length is 68.432 nm, the recording capacity per one surface of an optical disk having a diameter of 12 cm is approximately 83.33 GB. When this surface is adhered to both surfaces and laminated as three layers, the recording capacity is 83.33×2×3=approximately 500 GB. The shortest mark length 68.432 nm in the embodiment is about 0.61 times the shortest mark length 111, 74 nm of BDXL (registered trademark).

(Configuration Example of Optical Disk Device)

FIG. 1 is a block diagram illustrating an example of the configuration of the optical disk device according to the embodiment. The optical disk device includes a light irradiation unit 102, a preamplifier unit 103, an AGC unit 104, a waveform equalization unit 105, an A-D conversion unit 106, a PLL (Phase Locked Loop) unit 107, and a PRML (Partial Response Maximum Likelihood) processing unit 108. The optical disk device further includes a shift detection unit 109, a recording pulse condition operation unit 110, a recording pattern generation unit 111, a recording compensation unit 112, and a laser driving unit 113. The description of the function of each constituent element will be described in relation to a reproducing processing and a recording processing for the optical disk 101 in the optical disk device described later. These functional blocks of the optical disk device are achieved by, for example, an LSI which is an integrated circuit of a semiconductor circuit. The functional blocks of the optical disk device may be configured by hardware including an integrated circuit and an optical pickup, or may be configured to operate a computer including an integrated circuit by a software program and execute each function by the software.

The light irradiation unit 102 is an optical pickup including, for example, a semiconductor laser such as a laser diode (LD) that emits a laser beam, and an objective lens that collects the laser beam emitted from the semiconductor laser, thereby irradiating the laser beam onto the recording surface of the optical disk 101 as an optical beam.

Although FIG. 1 shows the optical disk 101 as an optical information recording medium, the optical disk 101 may not be a constituent element of the optical disk device. The light irradiation unit 102 may be an optical pickup having any configuration as long as it irradiates an optical storage medium with an optical beam and outputs a signal corresponding to the optical beam reflected from the optical storage medium.

Figure 2:
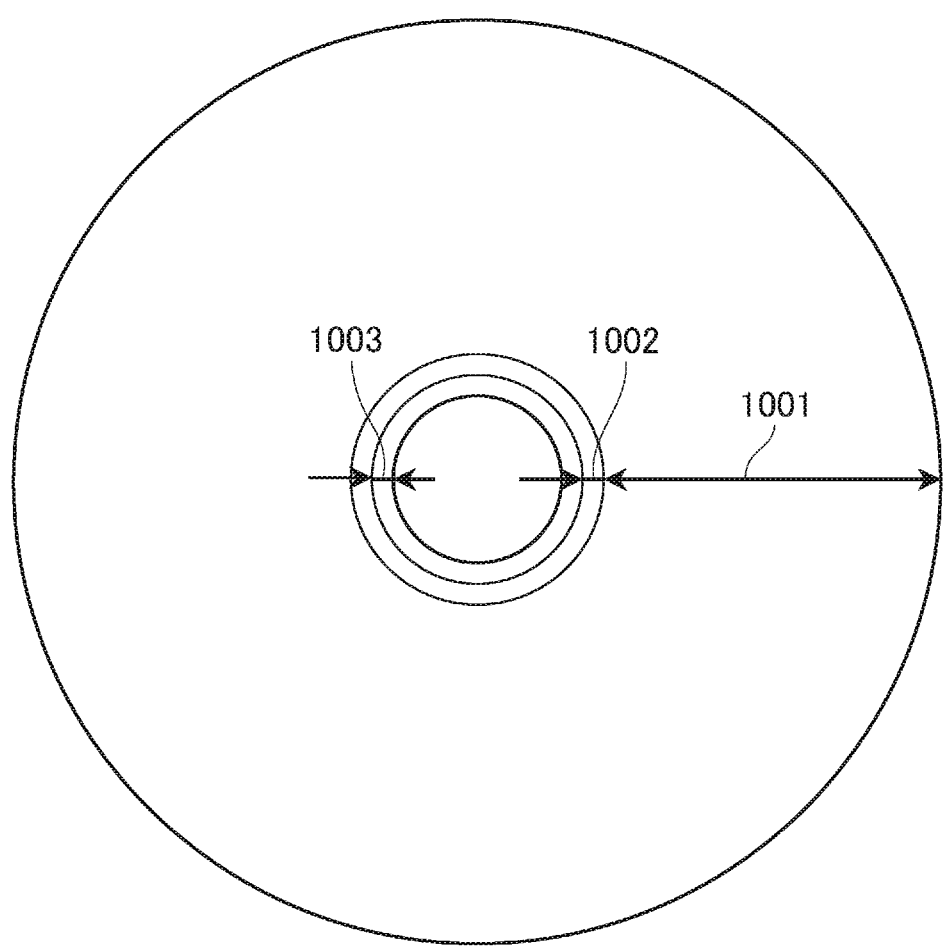
[FIG. 2] A schematic diagram for explaining the configuration of an optical disk used in the embodiment.

FIG. 2 is a schematic diagram for explaining the configuration of an optical disk used in the embodiment. The configuration of the optical disk 101 used as a recording medium in the optical disk recording device of the embodiment will be described below using an example. The optical disk 101 has, from the outer circumference toward the inner circumference, a data area 1001, a recording condition learning area 1002 for learning a recording condition, and an initial value recording area 1003 for recording initial values of the recording condition. The recording condition learning area 1002 is provided on the inner peripheral side of the optical disk 101, and the initial value recording area 1003 is provided on the innermost peripheral part on the inner peripheral side of the recording condition learning area 1002.

The data area 1001 is an area used by a user to actually save data on the optical disk. The recording condition learning area 1002 is an area used for recording data of test writing, before a user records data in the data area, in order to adjust the fluctuation of a recording power and a recording pulse condition at the time of startup or when a temperature fluctuation occurs. The initial value recording area 1003 is a read-only area in which information such as a recommended recording power value, a recommended value of the recording pulse condition, a recording linear velocity, and a disk ID, which are predetermined for each disk, is recorded. These pieces of information may be recorded in a state of being formed on a disk substrate with the track meandering direction or the like as a recording unit of information. Alternatively, initial value information may be recorded on a disk by using a scheme called BCA (Burst Cutting Area) in which information is recorded by modulating the interval between stripes having a constant width. Although not explicitly shown in FIG. 2, the recording condition learning area may further be provided on the outer peripheral part of the data area 1001. By providing the recording condition learning area on the outer periphery part, the recording power distribution in the disk surface between the inner periphery and the outer periphery of the disk may be corrected.

Figure 3:
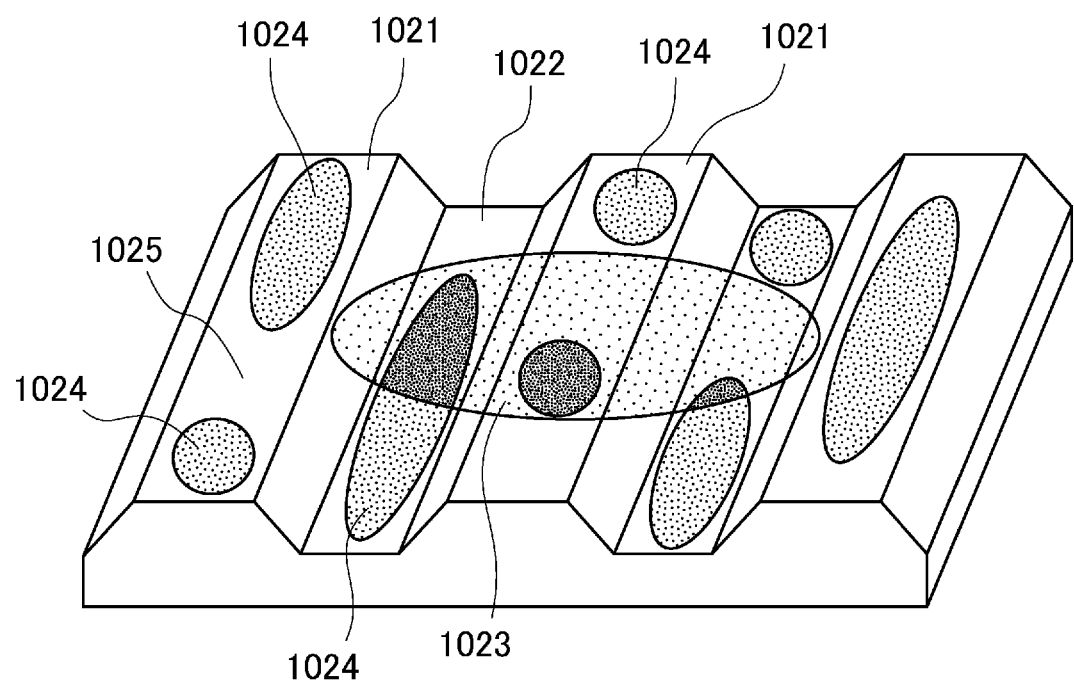
[FIG. 3] A schematic diagram illustrating an example of a track configuration of the optical disk used in the embodiment.

FIG. 3 is a schematic diagram illustrating an example of the track configuration of the optical disk used in the embodiment. On the recording surface of the optical disk 101, a groove track (hereinafter, also simply referred to as "groove") 1021 is formed in a spiral shape. A land track (hereinafter, also simply referred to as "land") 1022 is formed in a spiral shape in a region sandwiched between the spirally formed grooves 1021. The optical disk 101 can record user data in the groove 1021 and the land 1022. That is, the groove 1021 and the land 1022 can be used as recording tracks.

In the case of recording or reproducing data on or from the optical disk 101, when the optical pickup irradiates the groove 1021 or the land 1022 on the recording surface of the optical disk 101 with an optical beam, a beam spot 1023 is formed on the track. At the time of data recording, a track is irradiated with an optical beam having the recording power according to recording pulses based on recording data, thereby forming a recording mark 1024 having a predetermined mark length and space length on the track. At the time of data reproduction, by irradiating a track with an optical beam having a reproducing power and receiving the reflected light, a reproduction signal whose amplitude changes according to the difference in reflectance between the recording mark 1024 and a space 1025 between the marks is obtained, and thus reproduction data is generated from the reproduction signal.

(Recording/Reproducing Operation of the Embodiment)

Here, the data reproducing processing in the optical disk device of the embodiment will be described.

At the time of the reproducing operation, the optical pickup as the light irradiation unit 102 irradiates the optical beam emitted from the laser diode onto the medium surface of the optical disk 101 and receives the reflected light. The received light is converted into an electric signal by a photodetector and becomes an analog reproduction signal. The analog reproduction signal is converted from an analog signal to a digital signal by the preamplifier unit 103, AGC unit 104, waveform equalization unit 105, and A-D conversion unit 106. The digital signal is sampled by the PLL unit 107 at clock intervals. The digital signal is input to the PRML processing unit 108. Inside the PRML processing unit 108, for example, a Viterbi decoding unit is provided as a maximum likelihood decoding unit, which performs maximum likelihood decoding on the digital signal, generates a binary signal indicating the result of the maximum likelihood decoding and outputs the binary signal as a reproduction signal. The optical disk device restores the reproduction data corresponding to recording marks on the optical disk 101 based on the obtained reproduction signal in the form of the binary signal.

The reflected light may be split into five or six rays by an HOE element, and the split rays may be received by divided five or six parts of a photodetector, respectively. The system may be configured so that a waveform equalization processing is performed on output signals corresponding to the respective light amounts of the divided reception rays, and the conversion processing from an analog signal to a digital signal is performed. By doing so, for example, at the time of groove reproduction, it is possible to improve the quality of the reproduction signal by performing a crosstalk cancellation processing which performs the waveform equalization processing that minimizes crosstalk from adjacent land tracks.

Next, the data recording processing in the optical disk device of the embodiment will be described.

At the time of the recording (writing) operation, the recording pattern generation unit 111 outputs an arbitrary code string as binary encoded data encoded based on the recording data as an NRZI (Non Return to Zero Inversion) signal. The recording compensation unit sets the recording pulse condition calculated by the recording pulse condition operation unit 110, and generates recording pulses based on the NRZI signal while performing the recording compensation according to the recording pulse condition and adjusting the pulse length. The laser driving unit 113 drives the laser diode in the light irradiation unit 102 by using a signal replaced with the recording pulses in accordance with the NRZI signal, and outputs an optical beam of laser beam. The laser driving unit 113 irradiates an optical beam onto the medium surface of the optical disk 101, thereby recording a mark corresponding to the recording data at a desired position on the optical disk 101 according to the intensity of the recording power of the optical beam.

At this time, the binary signal acquired by the PRML processing unit 108 during the reproduction is input to the shift detection unit 109. The shift detection unit 109 detects a shift of a binary bit array (bit pattern) in the reproduction signal of the recording marks on the optical disk 101 based on the result of the maximum likelihood decoding in the PRML processing unit 108. The shift detection unit 109 detects, as the shift of the bit pattern of the reproduction signal, for example, a shift amount and a shift direction of the bit pattern of the reproduction signal from the phase information of the binary signal and the PLL clock. The recording pulse condition operation unit 110 calculates a correction amount of the recording pulse as an example of the recording pulse condition based on a shift amount such as a pattern shift which is detected by the shift detection unit 109, and thus updates the recording pulse condition. The recording pulse condition operation unit 110 sets the recording pulse condition in the recording compensation unit 112 according to the calculation result of the correction amount for performing the recording compensation.

In the above configuration, the recording pattern generation unit 111 implements a function as an example of an encoding unit, the recording pulse condition operation unit 110 implements a function as an example of a classification unit, and the PRML processing unit 108, the shift detection unit 109, and the recording pulse condition operation unit 110 implement a function as an example of a correction amount setting unit. The recording compensation unit 112 implements a function as an example of a recording waveform generating unit, and the laser driving unit 113 and the light irradiation unit 102 implement a function as an example of a recording light output unit.

Figure 4:
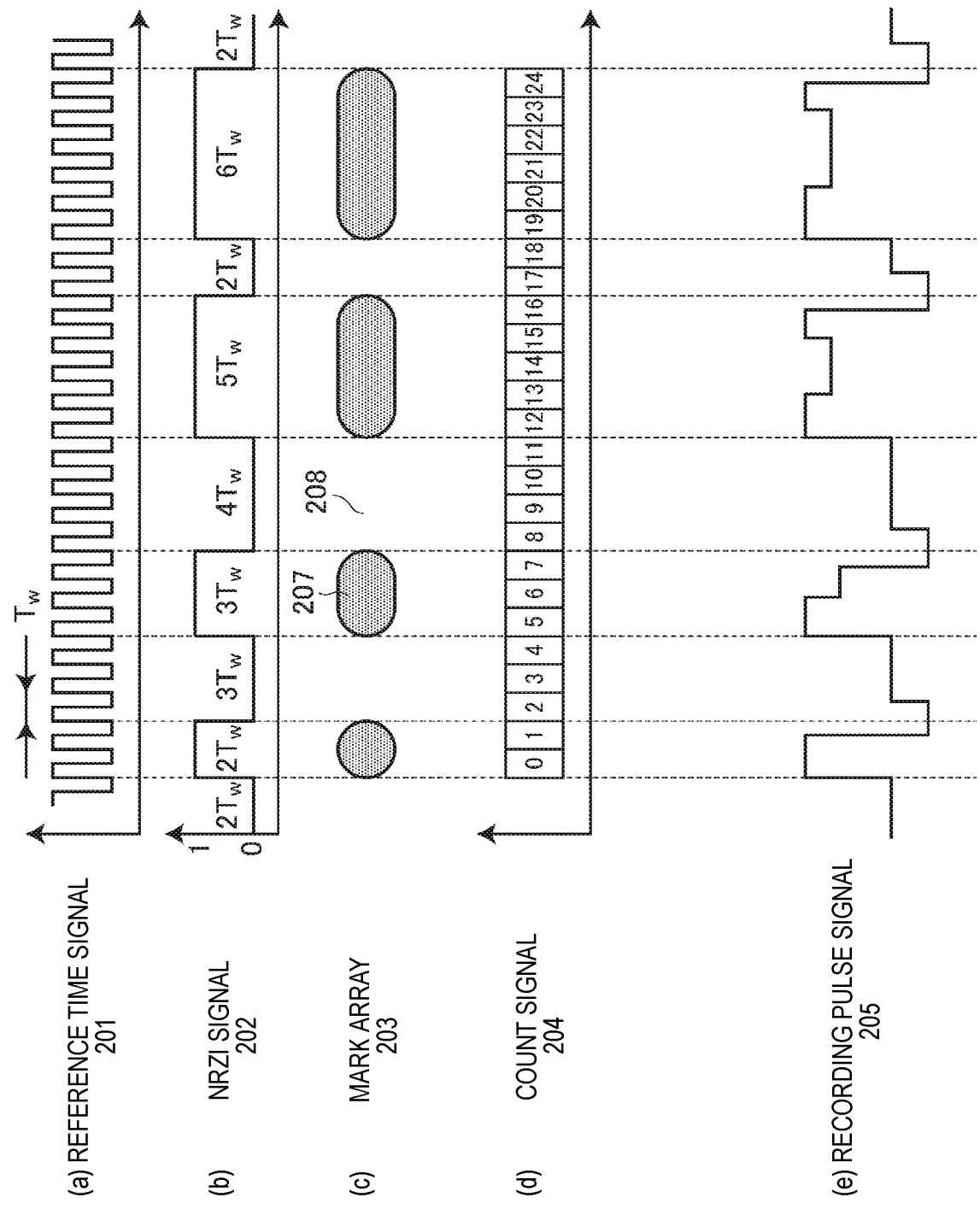
[FIG. 4] A diagram illustrating an example of a recording code string, marks, spaces, and recording pulses corresponding to recording data in the optical disk device of the embodiment.

FIG. 4 is a diagram illustrating an example of a recording code string, marks, spaces, and recording pulses corresponding to recording data in the optical disk device of the embodiment. (a) of FIG. 4 shows a waveform of a reference time signal 201 serving as a time reference of the recording operation. The reference time signal 201 is pulse clocks having a cycle Tw. (b) of FIG. 4 shows an NRZI signal 202 in the form of a recording code string generated by the recording pattern generation unit 111. Here, Tw is a detection window width, which is the minimum unit of the change amount of a mark length and a space length in the NRZI signal 202. This Tw is also referred to as a reference time. Note that the mark length and the space length are represented as 2Tw, 3Tw, etc., but there are cases where w is omitted and represented as 2T, 3T, etc. The space length may be represented by Ts such as 4Ts, and the mark length may be represented by Tm such as 2Tm.

(c) of FIG. 4 shows a mark array 203 representing images of marks and spaces actually recorded on the optical disk. The beam spot of the optical beam scans marks and spaces in the mark array 203 from left to right. For example, a mark 207 corresponds to the "1" level of the NRZI signal 202 in a one-to-one relationship, and is formed with a length proportional to the period of the level. A space 208 between the marks 207 corresponds to the "0" level of the NRZI signal 202, and has a length proportional to the period of the level. A mark may correspond to "0" and a space may correspond to "1" in the NRZI signal 202.

(d) of FIG. 4 shows a count signal 204. The count signal 204 measures the times of the mark 207 and the space 208 from a predetermined position in units of Tw.

(e) of FIG. 4 shows the waveform of a recording pulse signal 205 corresponding to the NRZI signal 202 of (b). This waveform is an example of an actually recorded optical waveform. The recording pulse signal 205 is generated with reference to the count signal 204, the NRZI signal 202, and recording compensation table data sent from the recording pulse condition operation unit 110.

Figure 5:
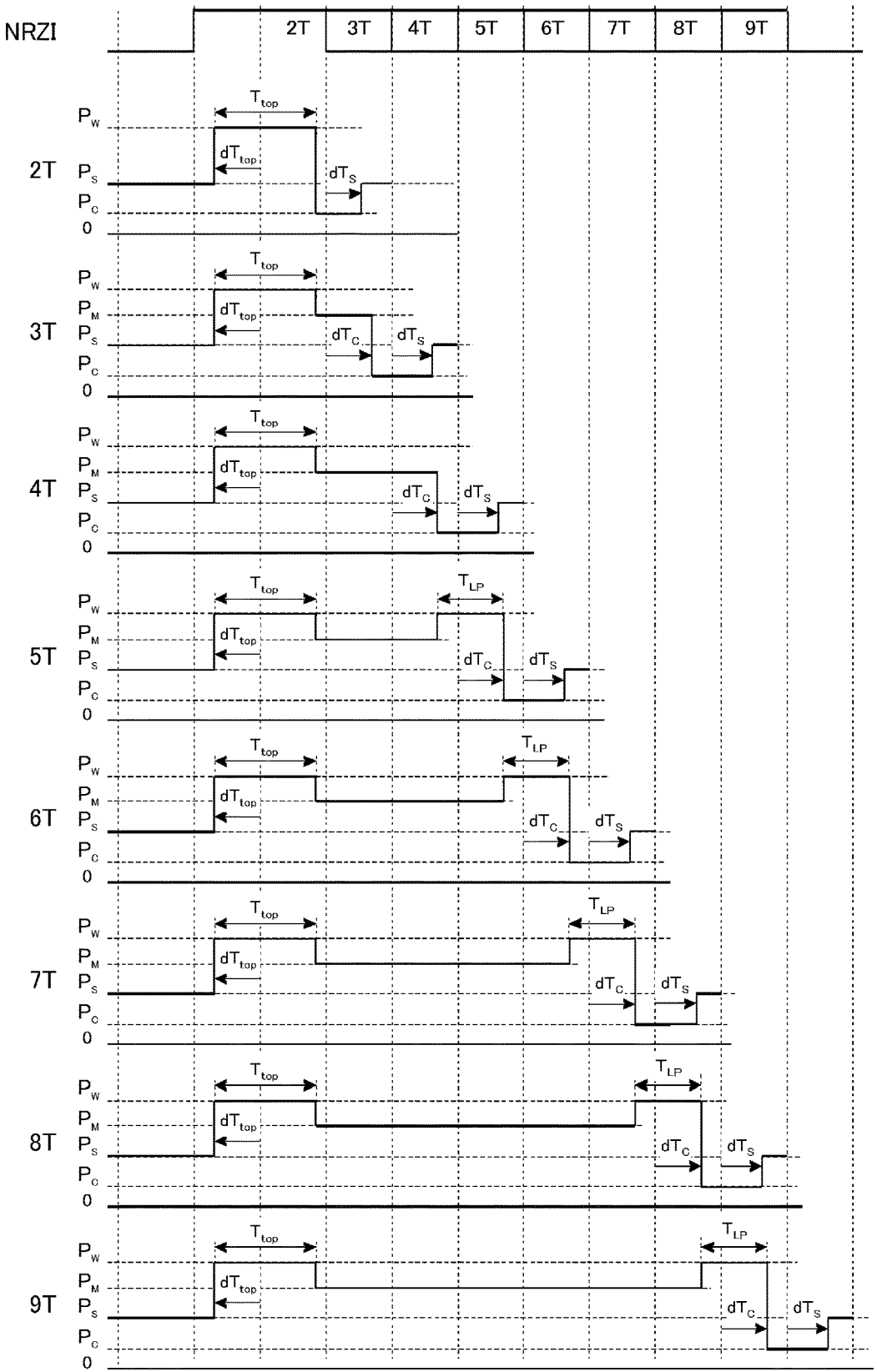
[FIG. 5] A diagram illustrating a relationship between a mark length and a recording pulse waveform to be recorded on an optical disk in the embodiment.

Next, a recording compensation method in the optical disk device of the embodiment will be described. FIG. 5 is a diagram illustrating a relationship between a mark length and a recording pulse waveform to be recorded on the optical disk in the embodiment. In FIG. 5, the NRZI signal with 2T, 3T, . . . 9T representing the mark length in units of the reference time Tw (also appropriately referred to as channel bits) is shown at the upper end. Below the NRZI signal, the waveforms of the recording pulse signals 205 respectively having 2T, 3T, . . . 9T are shown.

The recording pulse signal 205 is level-modulated, and there are four types of output power levels of the recording power of the laser beam: write power PW, middle power PM, space power PS, and cooling power PC. The write power PW is the maximum power level in the recording pulse, and is the power level of a first pulse and a last pulse. This power level is used to apply energy to a recording film to cause a state change. The middle power PM is an intermediate power level used between the first pulse and the last pulse or between the first pulse and a cooling pulse. The space power PS is a power level for irradiating a portion between marks (space), and is mainly used for the preheating for forming the next mark. In a rewritable optical disk, the space power PS may be called an erase power for erasing a recording mark with power in a space section. The cooling power PC is a power level of the cooling pulse, and is mainly used for the purpose of interrupting diffusion of heat to a subsequent mark recording portion and reducing thermal interference. In each power level described above, a uniform value is used regardless of the mark length.

In the illustrated example, 2T to 9T are shown, but a recording pulse waveform of 10T or more is generated according to the same rule as 9T or the like. In FIG. 5, 2T indicates a recording pulse waveform called a monopulse type, 3T and 4T indicate recording pulse waveforms called an L type, and 5T to 9T indicate recording pulse waveforms called a Castle type. In the case of 5T or more, the section of the middle power PM increases by 1T every time the mark length increases by 1T. 3T and 4T may be the monopulse type with one pulse like 2T. 4T may be the Castle type having the last pulse. In addition, the L-type having no last pulse may be used for 3T or more.

The parameters related to the timing of a recording pulse for performing the recording compensation according to the recording pulse condition include a start position $dT_{top}$ of the first pulse, a time width Ttop of the first pulse, a time width $T_{LP}$ of the last pulse, a start position $dT_C$ of the cooling pulse, and an end position $dT_S$ of the cooling pulse. In the case of $dT_{top}$, $dT_C$, and $dT_S$, as shown in FIG. 5, the amount of time change is defined in reference to the inversion timing of the NRZI signal of the recording data. The adjustment unit of these parameters is, for example, ⅓2 of a channel bit cycle. The adjustment unit of the recording pulse may be arbitrarily set according to various conditions.

Among the parameters of a recording pulse described above, $dT_{top}$ and $T_{top}$ mainly determine the condition for forming the start position (preceding edge) of a recording mark. $dT_C$, $T_{LP}$, and $dT_S$ mainly determine the condition for forming the end position (succeeding edge) of a recording mark. By appropriately setting these parameters and setting the correction amount of the recording pulse, a recording mark is formed at an appropriate position, and thus quality of recorded information can be kept good.

For this reason, in the embodiment, an adaptive recording pulse that adaptively changes the parameters of a recording pulse in accordance with the length of a mark of interest (target mark), the length of a space preceding the target mark (preceding space), the length of a mark preceding the target mark (preceding mark), and the length of a space subsequent to the target mark (succeeding space) is used. The recording compensation method using such an adaptive recording pulse is called the adaptive recording compensation. Hereinafter, an example will be described in which the start position (referred to as a start edge as appropriate) of a recording pulse is adjusted by $dT_{top}$ and $T_{top}$, and the end position (referred to as an end edge as appropriate) of a recording pulse is adjusted by $dT_C$, $T_{LP}$, and $dT_S$.

In the embodiment, the start position and the end position of a mark are more strictly controlled in consideration of the optical intersymbol interference and the thermal interference that can be a problem during high-density recording beyond the OTF (Optical Transfer Function) limit determined by the shortest mark length and optical spot diameter. More specifically, based on the run length of the encoded data of recording data (for example, the maximum run length of 11T or more, in this example, 2T to 11T), regarding the start position, for example, accordance to the mark length (target mark length) of a mark of interest, the target mark length is finely classified into a plurality of classes of 2T, 3T, 4T, 5T, 6T, 7T, and 8T or more, and the correction amount of the recording pulse is set for each class. For example, according to the space length of a preceding space preceding the mark of interest (preceding space length), the preceding space length is finely classified into a plurality of classes of 2T, 3T, 4T, 5T, 6T, 7T, and 8T or more, and the correction amount of the recording pulse is set for each class. Regarding the end position, for example, accordance to the target mark length of a mark of interest, the target mark length is finely classified into a plurality of classes of 2T, 3T, 4T, 5T, 6T, 7T, and 8T or more, and the correction amount of the recording pulse is set for each class. For example, according to the space length of a succeeding space subsequent to the mark of interest (succeeding space length), the succeeding space length is finely classified into a plurality of classes of 2T and 3T or more, and the correction amount of the recording pulse is set for each class.

The optical disk device of the embodiment uses an optical pickup having a semiconductor laser with a wavelength λ: 405 nm and an objective lens with an NA: 0.91. If the diameter in a range of $1/e^2$ of the peak intensity of a Gaussian beam is defined as an effective spot diameter Rs, the effective spot diameter Rs is represented by Rs=0.82× (λ/NA), and thus Rs is almost equal to 0.365 μm. In such an optical system, the recording mark having the shortest mark length (2T) of 68.532 nm, almost equal to 0.068 μm, and a 3T mark length of 0.103 μm exceeds the optical resolution limit at which a mark can be identified by an optical spot. The signal amplitude of a reproduction signal when a recording mark is reproduced by the optical beam decreases as the recording mark becomes shorter, and becomes zero at the limit of the optical resolution. The reciprocal of the mark length of the recording mark at which the signal amplitude becomes 0 is a spatial frequency.

Figure 6:
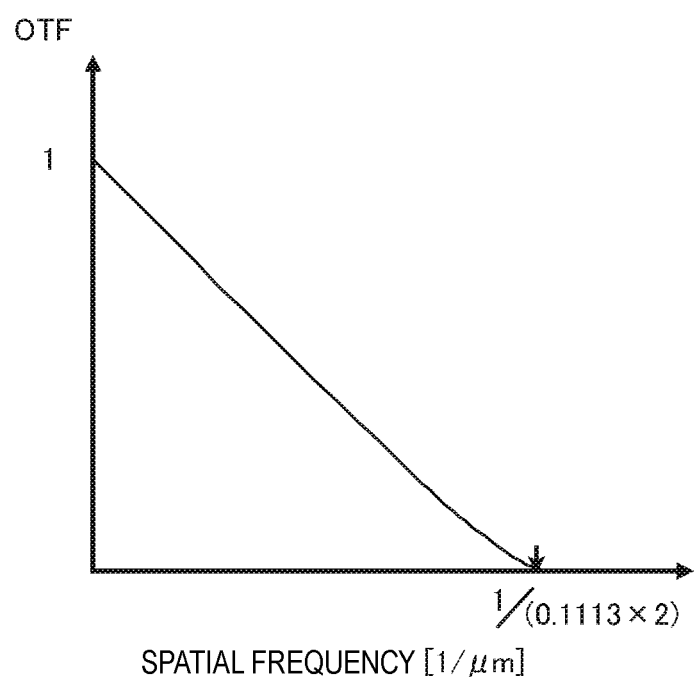
[FIG. 6] A diagram illustrating a relationship between OTF and spatial frequency in an optical system of the optical disk device.

FIG. 6 is a diagram illustrating a relationship between OTF and the spatial frequency in the optical system of the optical disk device. The relationship between the spatial frequency and a signal amplitude is called OTF. The signal amplitude decreases linearly as the spatial frequency increases, and the limit at which the signal amplitude becomes zero is called an OTF cutoff frequency. FIG. 6 shows the OTF cutoff frequency in the above-described optical system. In the case of the above-described optical system, the OTF cut-off cycle is obtained from the wavelength λ and the NA of the objective lens, and is λ/NA×0.5. That is, when λ=405 nm and NA=0.91, the cutoff cycle is 0.2225 μm. The shortest mark length that can be optically resolved is 0.1113 μm, which is half of the cutoff cycle. When the shortest mark length (2T) of a recording mark is 0.068 μm and the 3T mark length is 0.103 μm, the recording mark having the spatial frequency higher than the optically reproducible cutoff frequency is handled, and thus reproducing and recording become difficult. The limit of the cutoff frequency varies due to variations in the optical pickup or the like, distortion of a recording mark, mark shape, and the like. As condition for the largest spot size, in addition to the specific numerical values (λ=405 nm, NA=0.91) of the embodiment, when, for example, the laser wavelength of 410 nm, the objective lens NA=0.92, 5%, error of 5% due to the above-mentioned variation, etc. are taking into account, a half of the OTF cutoff cycle is λ/NA×0.26=0.1159 μm. Therefore, when recording or reproducing a mark whose shortest mark length is approximately 0.1159 μm or less, the optical intersymbol interference cannot be ignored.

Figure 7:
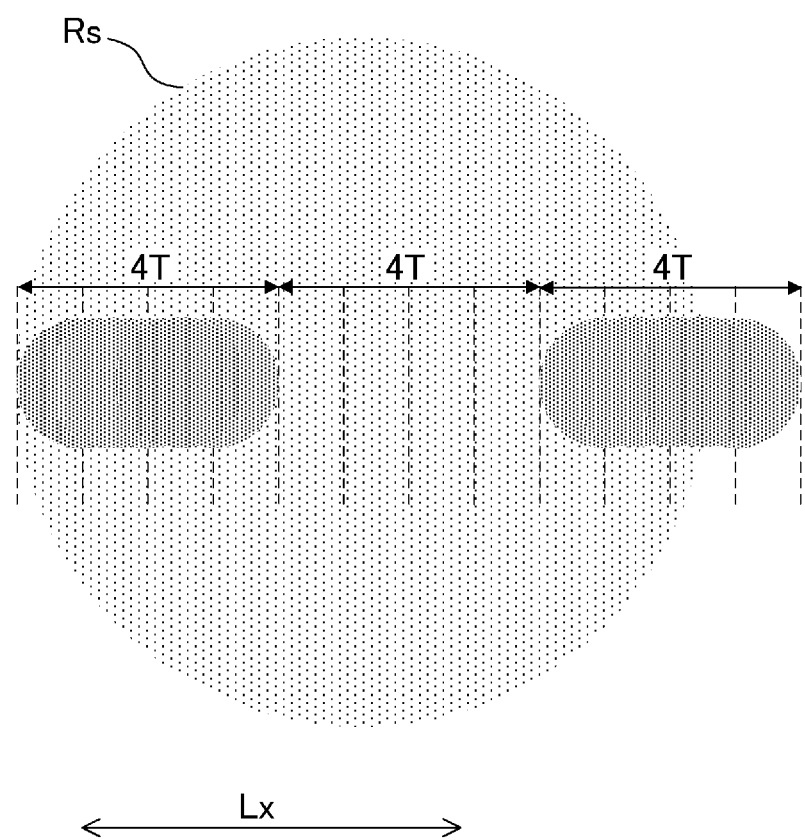
[FIG. 7] A schematic diagram illustrating a relationship between an effective spot diameter and a physical size of a recording mark in the optical disk device of the embodiment and a diagram illustrating a bit pattern in which 4T mark-4T space continues.

FIG. 7 is a schematic diagram illustrating a relationship between the effective spot diameter and the physical size of a recording mark in the optical disk device of the embodiment and a diagram illustrating a bit pattern in which 4T mark-4T space continues. In FIG. 7, a reference length Lx for comparing physical sizes is Lx=100 nm=0.1 μm. One unit separated by a broken line indicates a run length of 1T (that is, a channel clock cycle, a channel bit length) of 34.2 nm=0.0342 μm.

As shown in FIG. 7, in the case of a bit pattern in which 4T mark-4T space is continuous, the mark length and space length of 4T are 136.9 nm, and 4T×3=410.6 nm is larger than the effective spot diameter Rs=365 nm. The inventors of the present application have confirmed from experimental results that, in the recording marks with the physical size shown in FIG. 7, a simple repetitive signal formed of marks and spaces of 4T or more is optically readable because measured values such as CNR are measured using a spectrum analyzer, but a mark and space of 3T or less are difficult to resolve optically. If the mark length/the effective spot diameter Rs is defined as an optical resolution evaluation value OR, it was found that optical reading is possible when OR=mark length/Rs≥⅓=0.33, and optical resolution is difficult when OR<0.33. In the example of FIG. 7, the optical resolution evaluation value OR in the case of 4T is OR (4T)=0.38, and optical resolution is possible in the case of 4T or more.

Figure 8:
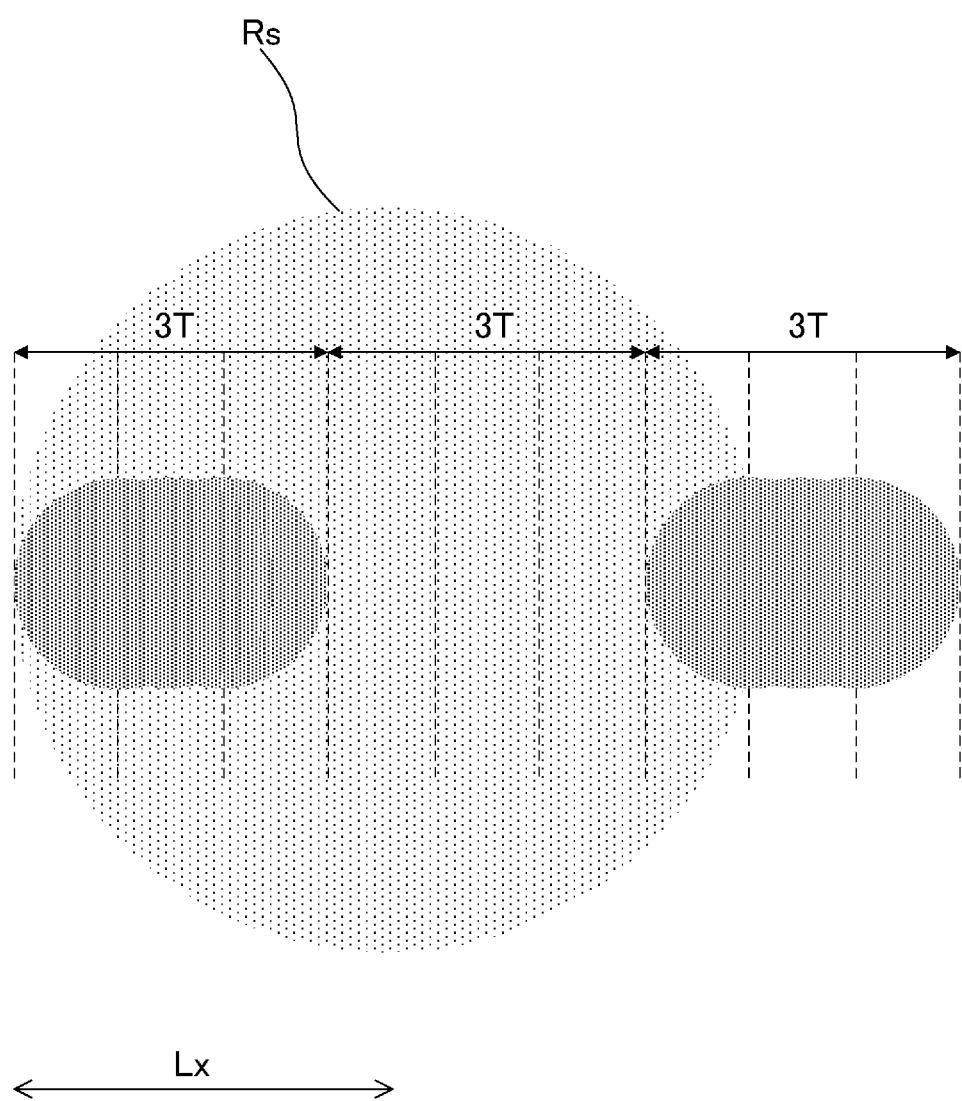
[FIG. 8] A schematic diagram illustrating a relationship between an effective spot diameter and a physical size of a recording mark in an optical disk device of a comparative example and a diagram illustrating a bit pattern in which 3T mark-3T space continues.

FIG. 8 is a schematic diagram illustrating a relationship between the effective spot diameter and the physical size of a recording mark in an optical disk device of a comparative example and a diagram illustrating a bit pattern in which 3T mark-3T space continues. This comparative example shows the case of BDXL (registered trademark). In FIG. 8, a reference length Lx for comparing physical sizes is Lx=100 nm=0.1 μm as in FIG. 7. One unit separated by a broken line indicates a run length of 1T (that is, a channel clock cycle, a channel bit length) of 55.9 nm=0.0559 μm.

In the example of FIG. 8, the mark length and space length of 3T are 167.6 nm, which are close to the values of 4T in the embodiment shown in FIG. 7. In the recording mark of the comparative example of FIG. 8, a mark and space of 3T or more is optically readable, but a mark and space of 2T or less are difficult to resolve optically. For this reason, in the case of BDXL (registered trademark), the mark and space of 2T can be decoded by employing the maximum likelihood decoding of the PR (1, 2, 2, 2, 1) ML scheme.

Figure 9:
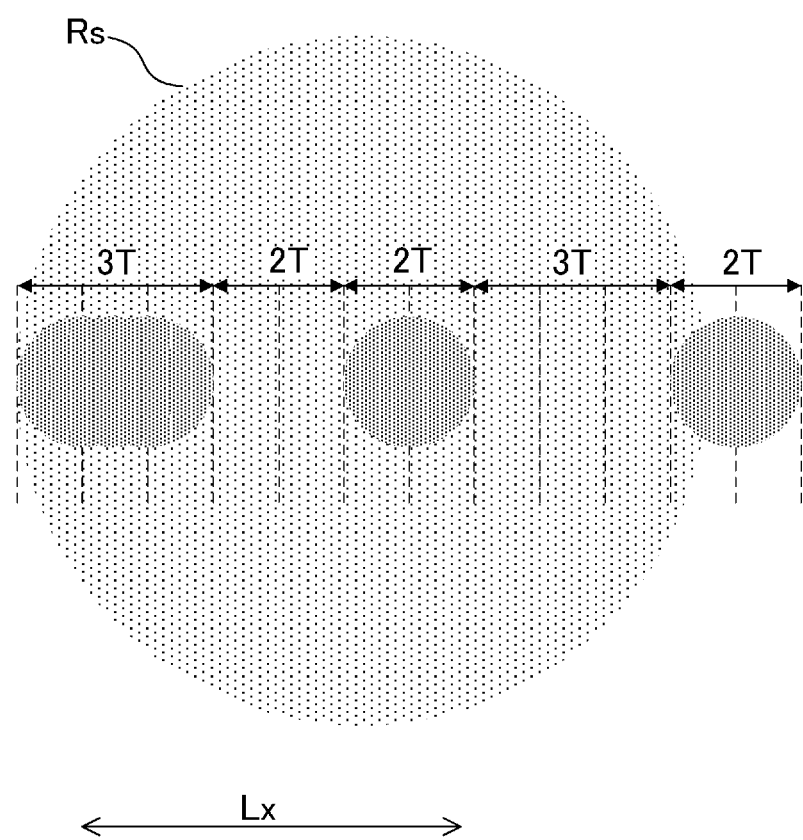
[FIG. 9] A schematic diagram illustrating a relationship between an effective spot diameter and a physical size of a recording mark in the optical disk device of the embodiment and a diagram illustrating a bit pattern containing 2T mark-2T space which is the shortest mark length and space length.

FIG. 9 is a schematic diagram illustrating a relationship between the effective spot diameter and the physical size of a recording mark in the optical disk device of the embodiment and a diagram illustrating a bit pattern containing 2T mark-2T space which is the shortest mark length and space length. In FIG. 9, a reference length Lx for comparing physical sizes is Lx=100 nm=0.1 μm as in FIG. 7. One unit separated by a broken line indicates a run length of 1T (that is, a channel clock cycle, a channel bit length) of 34.2 nm=0.0342 μm.

Here, the modulation code of recording data used in the optical disk device of the embodiment will be described. In the embodiment, for example, 110PCWA (Parity-Complementary Word Assignment) is used as a modulation code. 110PCWA is the modulation code in which the minimum number of "0" between "1" and "1" of the coded data after modulation is 1 (that is, 2T) and the maximum number is 10 (that is, 11T), and is a type of RLL (1, 10) modulation code (Run Length Limited encoding code). Thus, 110PCWA has a code length of 2T to 11T. The sync mark of a synchronization signal allocates 12T exceeding the maximum code length. Here, PCWA means parity complement word assignment. The RLL modulation code with PCWA has the property of generating two modulation code strings of the same data bit array and that having opposite parity except for two DC control bit values. In the 110PCWA, the continuations number of the shortest run length 2T is limited to 2 in order to suppress a decrease in the amplitude of a reproduction signal and improve read performance. Therefore, a mark or space of 2T does not continue after 2T mark-2T space or 2T space-2T mark, and the mark or space of 3T or more continues. By employing such a modulation code, the occurrence of code errors at the time of reproduction can be effectively reduced. Regarding the maximum run length, a mark and a spaces whose optical resolution evaluation value OR exceeds about 1.0 only have higher redundancy, and the coding efficiency and recording efficiency thereof are reduced. Thus, it is preferable that the maximum run length of marks and spaces is such that OR is about 1.0. Consequently, in the embodiment, since 11T is 376.4 nm and OR (11T) is 1.03 with respect to 365 nm of the maximum run length where OR=1, modulation codes of 2T to 11T are used. By modulating the recording data using 110PCWA, a recording code string of encoded data having a run length of 2T to 12T is generated.

As shown in FIG. 9, in the case of a bit pattern including the shortest run length such as 3T mark-2T space-2T mark-3T space-2T mark, it is difficult to optically read a mark or space of 2T or 3T. OR (3T) is 0.28 in the case of 3T, and OR (2T) is 0.19 in the case of 2T. In each case, since OR<0.33, it is difficult to optically resolve 2T and 3T. Therefore, in the embodiment, the maximum likelihood decoding is performed using, for example, a higher-order PRML scheme with a constraint length of 11 even for a bit pattern including a mark or space of 3T or less as shown in FIG. 9, so that it is possible to obtain a decoding result of a reproduction signal satisfying a practically sufficient error rate. In the maximum likelihood decoding of the PRML scheme, in order to estimate the bit pattern of a reproduction signal using the state at preceding and succeeding time points, the constraint length of PRML is increased to 11 corresponding to a recording code string having run lengths of 2T to 12T as in the embodiment. According to the length of the constraint length, the PR class is also multi-valued and subdivided, for example, as PR (3, 6, 9, 13, 16, 17, 16, 13, 9, 6, 3). In the embodiment, a pattern shift is detected by using L-SEAT (run-length-Limited Sequence Error for Adaptive Target), which is an extended evaluation index described later, as an evaluation index of a decoding result, and the adaptive recording compensation is performed for each classification of mark lengths and space lengths. Thus, it is possible to sufficiently reduce an error rate during reproduction even for a bit pattern having a high probability of a decoding error.

In the embodiment, the modulation code having a long code length such as the maximum code length 11T is adopted as a modulation code for generating encoded data of recording data, thereby improving the SNR of a reproduction signal of recording marks. By increasing the constraint length of PRML to 11 with respect to recording marks of 2T to 12T, a short mark or space of 2T or 3T, OR of which is OR<0.33 and which cannot be separated optically, can be reproduced and read errors for each run length from 2T to 12T can be reduced. As a result, encoding efficiency is improved, reading performance is improved, and an error rate is reduced. In this embodiment, the code length of the modulation code for generating encoded data is assumed to be a long modulation code having the maximum code length of 11T or more, and thus can be applied to a case where a modulation code having the maximum code length of, for example, 13T or more is used. However, if the maximum code length is increased, there are disadvantages such as a decrease in coding efficiency and a need to increase the recording linear density.

In the embodiment, the correction amount of the start position and end position of a recording pulse when forming a recording mark is finely classified and set according to a mark length and a space length, thereby reducing the intersymbol interference and the thermal interference. At this time, target mark length, a preceding space length, and a succeeding space length are finely classified according to short marks and spaces such as 2T and 3T, and 4T, 5T, 6T, and 7T are classified for each run length. In the embodiment, OR in the case of 7T is OR (7T)=0.66. According to the experimental results of the inventors of the present application, it has been found that an error rate during reproduction can be sufficiently reduced by performing the classifying for each run length concerning marks and spaces of 7T or less where OR<⅔=0.66. That is, according to the mark length and space length of a mark of interest, these lengths are finely classified into a plurality of classes of 2T, 3T, 4T, 5T, 6T, 7T, and 8T or more, and the correction amount of a recording pulse is set for each class. Thereby, the intersymbol interference and the thermal interference are reduced, and an error rate is reduced. 8T or more may be further classified, and long mark lengths or space lengths may be individually classified as, for example, 8T, 9T, 10T, 11T or more. As a result, it is possible to further reduce an error rate.

In the optical disk device of the embodiment, a 256 KB extended RSPC (Reed-Solomon Product Code) is used as the error correction code in corresponding to encoded data using the modulation code of 110 PCWA having the long maximum code length of 11T. This error correction code corresponds to decoded data having a long run length of 2T to 12T.

(Adaptive Recording Compensation)

Next, a processing procedure of the adaptive recording compensation in the optical disk device of the embodiment will be described. Here, an example is shown in which a computer executes a computer program that defines a processing procedure related to the operation of the optical disk device.

Figure 10:
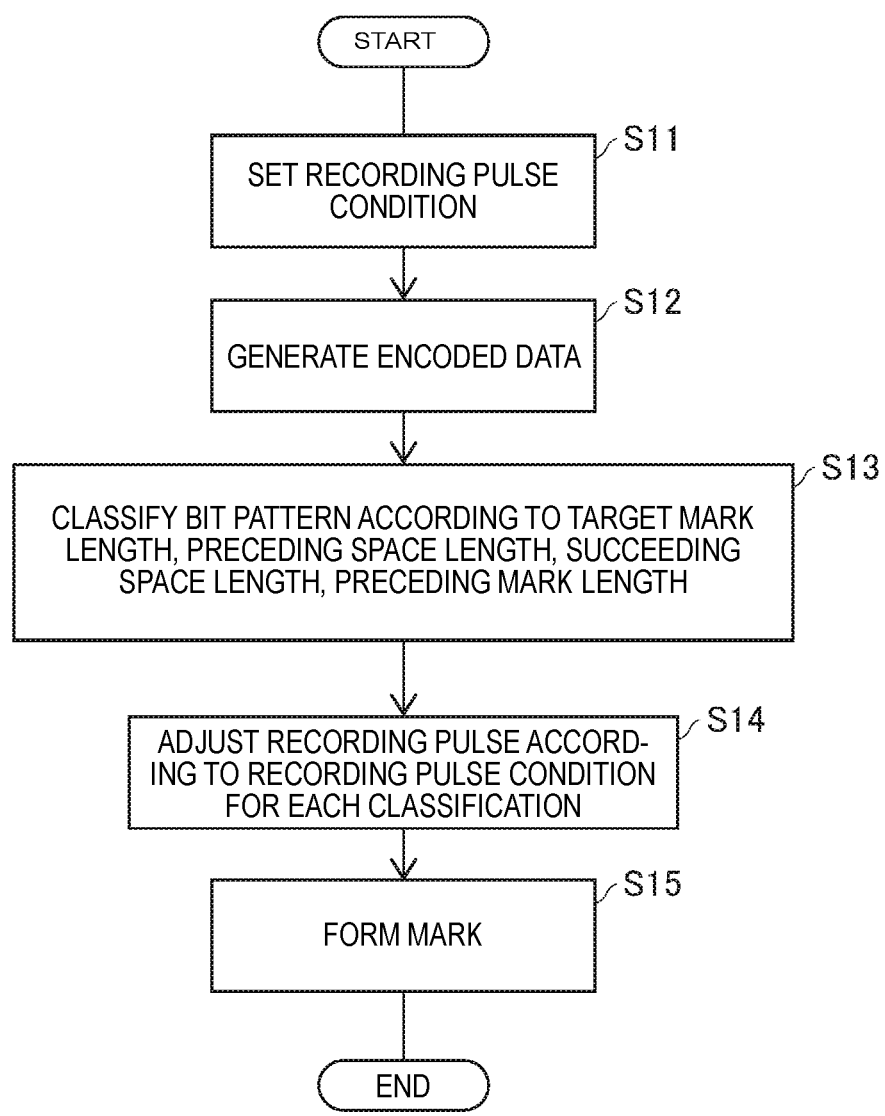
[FIG. 10] A flowchart illustrating a processing procedure for executing a recording processing by adaptive recording compensation of the embodiment.

FIG. 10 is a flowchart illustrating a processing procedure for executing the recording processing by the adaptive recording compensation in the embodiment. The optical disk device sets recording powers and the like in the laser driving unit 113 as the recording condition at the time of executing the data recording processing, and sets the recording pulse condition in the recording compensation unit 112 (S11). In this embodiment, in the adaptive recording compensation, the optimized recording pulse correction amount is set as the recording pulse condition for each classification of the bit pattern of recording data.

In the optical disk device, first, the recording pattern generation unit 111 encodes recording data to generate encoded data which is a combination of marks and spaces (S12). The NRZI signal 202 shown in (b) of FIG. 4 corresponds to the encoded data.

Next, in the optical disk device, the recording compensation unit 112 classifies the bit pattern of the encoded data according to the mark length and the space length (S13). In the embodiment, a mark of interest is classified according to the target mark length, a preceding space length, a succeeding space length, a preceding mark length, and the like.

Subsequently, in the optical disk device, the recording compensation unit 112 adjusts the pulse waveform of the recording pulse corresponding to the encoded data according to the recording pulse condition for each classification of the bit pattern (S14). In the embodiment, the start and end positions of the recording pulse are controlled using the correction amounts set for each classification of the bit pattern.

In the optical disk device, the laser driving unit 113 drives the light irradiation unit 102 based on the recording pulses and irradiates the optical disk 101 with a laser beam based on the recording pulse string to form a mark (S15). Through the above processing, the start and end positions of the recording mark recorded on the optical disk are adaptively corrected according to the bit pattern of the recording data.

Figure 11:
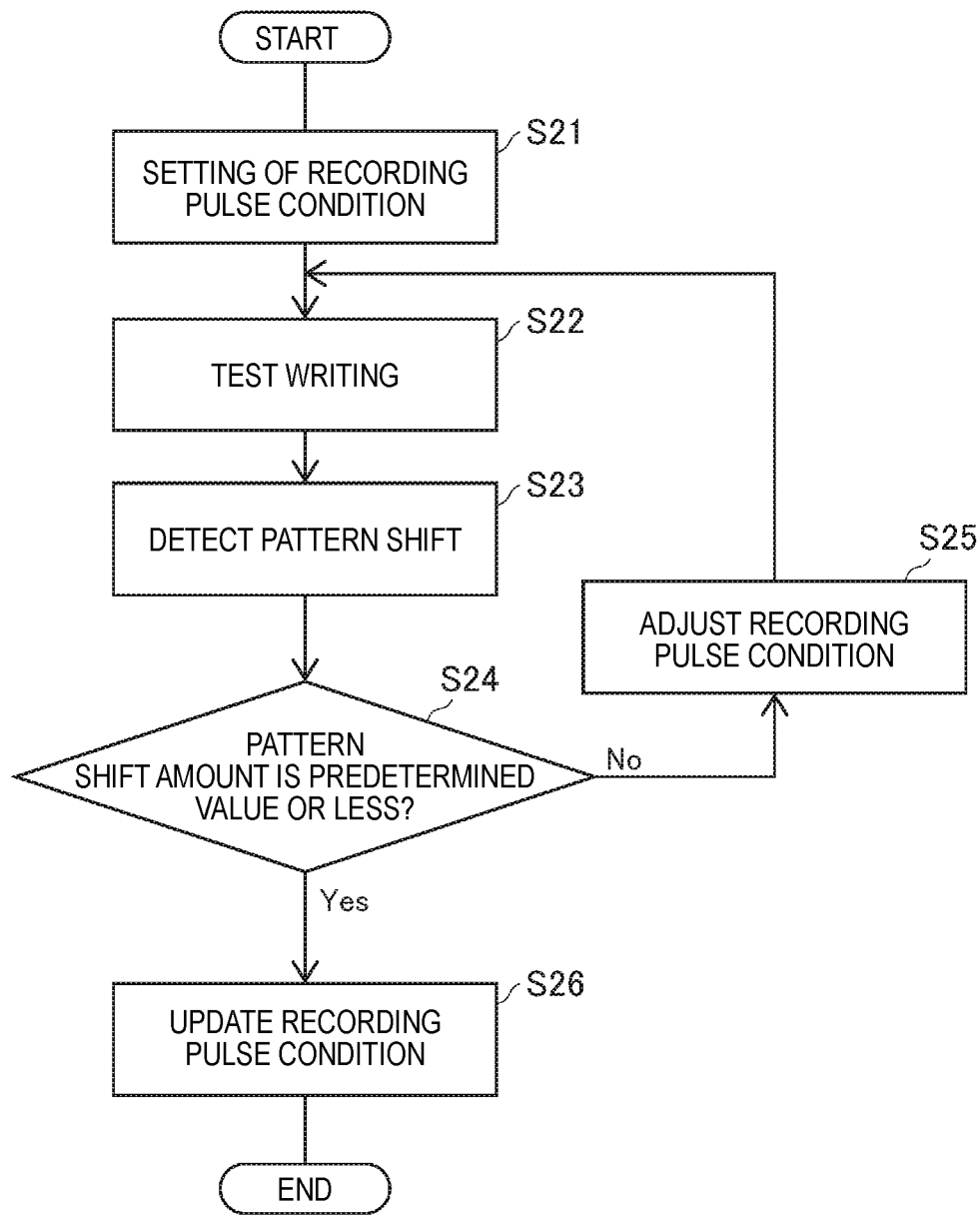
[FIG. 11] A flowchart illustrating a procedure of an adjustment processing of a recording pulse condition in the adaptive recording compensation of the embodiment.

FIG. 11 is a flowchart illustrating a procedure of an adjustment processing of the recording pulse condition in the adaptive recording compensation of the embodiment. The optical disk device sets the recording pulse condition in the recording compensation unit 112 using the recording condition recorded on the optical disk 101 or the recording condition stored in a memory of the optical disk device (S21). The optical disk device controls the laser driving unit 113 and the light irradiation unit 102 according to the set recording pulse condition, and performs test writing on a predetermined track of the optical disk 101 (S22).

Next, the optical disk device reproduces the recording mark of the track on which the test writing has been performed, causes the PRML processing unit 108 to decode the binary signal, and causes the shift detection unit 109 to detect the shift amount (pattern shift amount) of the pattern shift of the bit pattern of interest in the binary signal (S23). Subsequently, in the optical disk device, the recording pulse condition operation unit 110 determines whether the pattern shift amount is suppressed to a predetermined value or less (S24). If the pattern shift amount exceeds the predetermined value (S24: No), the recording pulse condition operation unit 110 adjusts the recording pulse condition according to the pattern shift amount (S25). The optical disk device performs the test writing (S22) and the pattern shift detection (S23) according to the adjusted recording pulse condition, and determines the pattern shift amount (S24). If the pattern shift amount is equal to or smaller than the predetermined value (S24: Yes), the recording pulse condition operation unit 110 updates the recording pulse condition (S26), and ends the recording pulse condition adjustment processing. The recording compensation unit 112 sets a recording pulse condition by using the optimized recording pulse condition, and executes the adaptive recording compensation.

When performing the test writing, for example, first, a correction amount of a recording pulse of a bit pattern having a mark length of 4T or more is obtained, and then, when performing the next test writing, the test writing may be performed using a bit pattern including a signal of 2T and 3T to calculate and set a correction amount for a short run length. In an optical disk with high density, the amplitude of a reproduction signal with short marks and spaces is extremely small. In such an optical disk, when the position of a recording mark 3T or less cannot be accurately recorded, it may be difficult to correctly align the positions a mark and space of 4T or more. When reproducing a signal having extremely large intersymbol interference as described above, first, a mark having a code length of 4T or more is recorded, and the recording compensation is accurately performed on the edge positions of the mark and space of 4T or more. Thereafter, marks and spaces of 2T and 3T may be recorded, and the recording positions of the marks and spaces of 2T and 3T may be accurately compensated. As a result, recording can be performed more accurately and efficiently, and the quality of a reproduction signal can be improved.

At the time of recording of the test writing, the size and shift amount of a recording mark of a short mark such as a mark of 2T or 3T differ for each recording condition. When the tap coefficient of an adaptive equivalent filter changes for each recording condition, a pattern shift state of the reproduction signal due to a change in the reproduction state is added in addition to the change in the recording state. Therefore, in order to accurately perform the adjustment of the pattern shift caused by the difference in the recording condition, when performing the recording adjustment, it is preferable to fix the boost value of a reproduction equalizer or the tap coefficient of the adaptive equalization filter in advance for the test recording or the recording compensation adjustment, or to limit the fluctuation range. By doing so, the pattern shift amount of each bit pattern can be accurately adjusted.

(Examples of Classification of Encoded Data)

Next, some examples of classification of the bit patterns of encoded data used in the adaptive recording compensation in the embodiment will be described.

Regarding the thermal interference in a recording mark, the effect on target mark is asymmetric between the space and mark on the preceding side of the target mark and the space and mark on the succeeding side of the target mark. There are disks and layers where the space and mark located on the preceding side greatly contribute to the effect. In the embodiment, assuming such a disk, regarding the start edge of a recording pulse, a fine classification is made for the target mark length and the preceding space length to set the correction amount of the recording pulse, thereby effectively reducing the thermal interference. Regarding the end edge of a recording pulse, since a long marks and a long space have a small influence of heat in the succeeding direction, a fine classification is made for short mark lengths and space lengths in which the influence of heat in the succeeding direction is large, thereby reducing the thermal interference.

Regarding the intersymbol interference that occurs when reproducing a recording mark, the effect on the target mark is substantially symmetrical between the space and mark on the preceding side of the target mark and the space and mark on the succeeding side of the target mark. Thus, in the embodiment, regarding the start edge and the end edge of a recording pulse, a fine classification is made for the target mark length, the preceding space length and the succeeding space length to set the correction amount of the recording pulse, thereby effectively reducing the intersymbol interference.

(1) First Example of Classification Patterns of Detection Bit Patterns

FIGS. 12A, 12B, 12C, and 12D are diagrams illustrating a first example of the classification of the detection bit patterns used in the adaptive recording compensation in the embodiment. The correction amount of a recording pulse is set with reference to the classifications of the detection bit patterns shown in FIGS. 12A to 12D. In each drawing, the table on the left side shows the pattern number of each classification, a preceding mark length, a preceding space length, target mark length, and a succeeding space length in the detection pattern of each pattern number. The table on the right side shows, in bit units, the detection bit pattern corresponding to the detection pattern of each pattern number. For the individual detection bit patterns, eight types of classification represented by DBA numbers 1 to 8 illustrated in FIG. 14 are shown. DBA (Discriminator Bit Array) (identification bit array) is used when performing an L-SEAT operation described later, and indicates the type of a bit array of a total 10 bits on the preceding 5T and succeeding 5T sides centering an edge of interest. Each detection pattern shown with a dark background in the left table in the figure is a pattern in which three or more marks or spaces of 2T are continuous, and is a bit pattern that does not appear in 110PCWA used as modulation codes in the embodiment and thus excluded here.

(1-1) Start Edge Adjustment of Recording Pulse

Figure 12B:
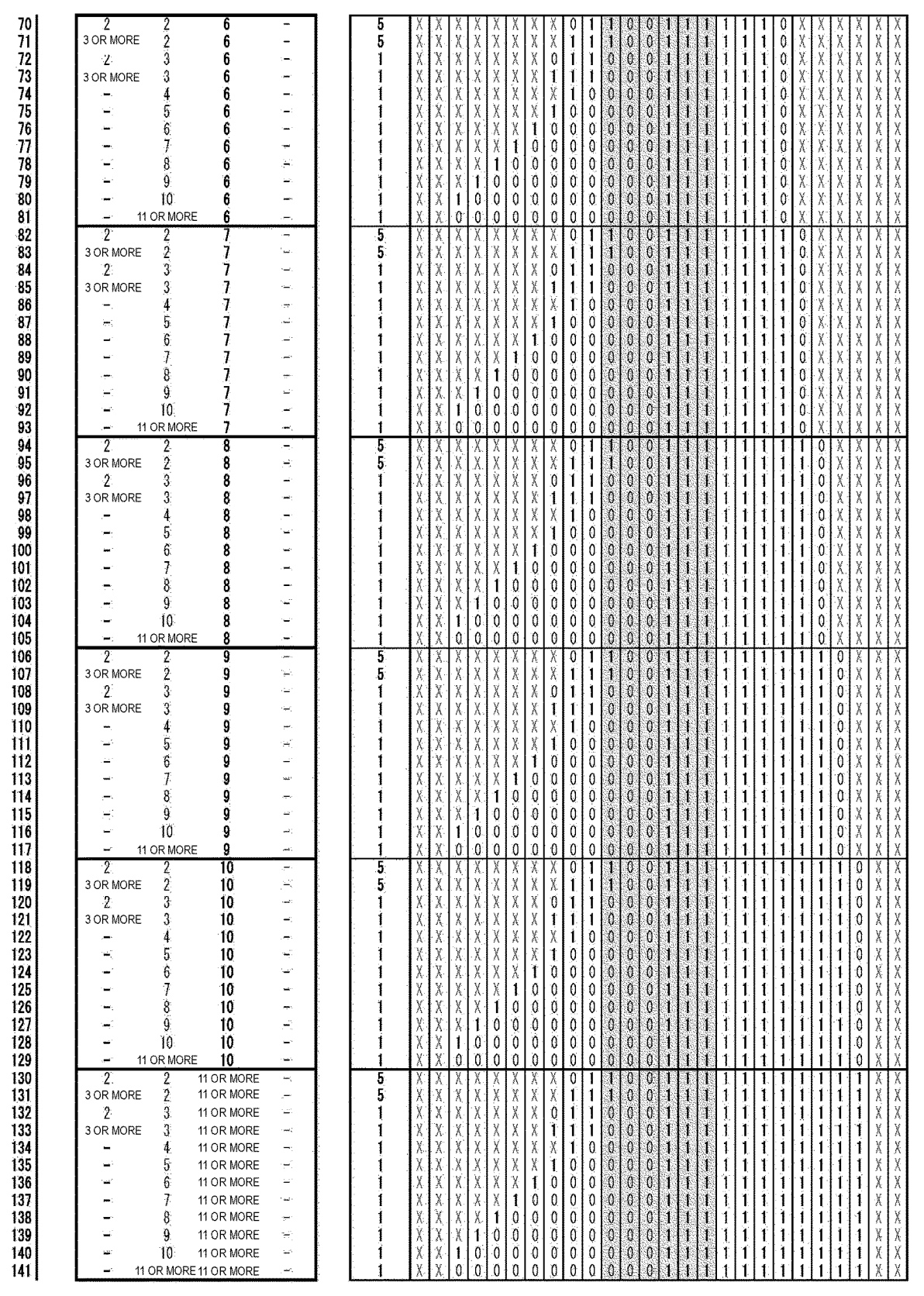

FIGS. 12A and 12B show the classifications of bit patterns used for adjusting the start position of a recording pulse. FIG. 12A shows the classification when target mark lengths are 2T, 3T, 4T, and 5T, and FIG. 12B shows the classification when the target mark lengths are 6T, 7T, 8T, 9T, 10T, and 11T or more (11T and 12T).

(a) In each of the target mark lengths 2T, 3T, 4T, 5T, 6T, 7T, 8T, 9T, 10T, and 11T or more, the classification is performed for each of preceding space lengths 2T, 3T, 4T, 5T, 6T, 7T, 8T, 9T, 10T, and 11T or more. That is, the classification is performed for individual combinations of the target mark lengths and the preceding space lengths.

(b) In each case of the preceding space lengths 2T and 3T, the classification is performed for each of the preceding mark lengths 2T and 3T or more.

(c) In each case of the target mark lengths 2T and 3T, the classification is performed for each of the succeeding space lengths 2T and 3T or more.

(1-2) End Edge Adjustment of Recording Pulse

Figure 12C:
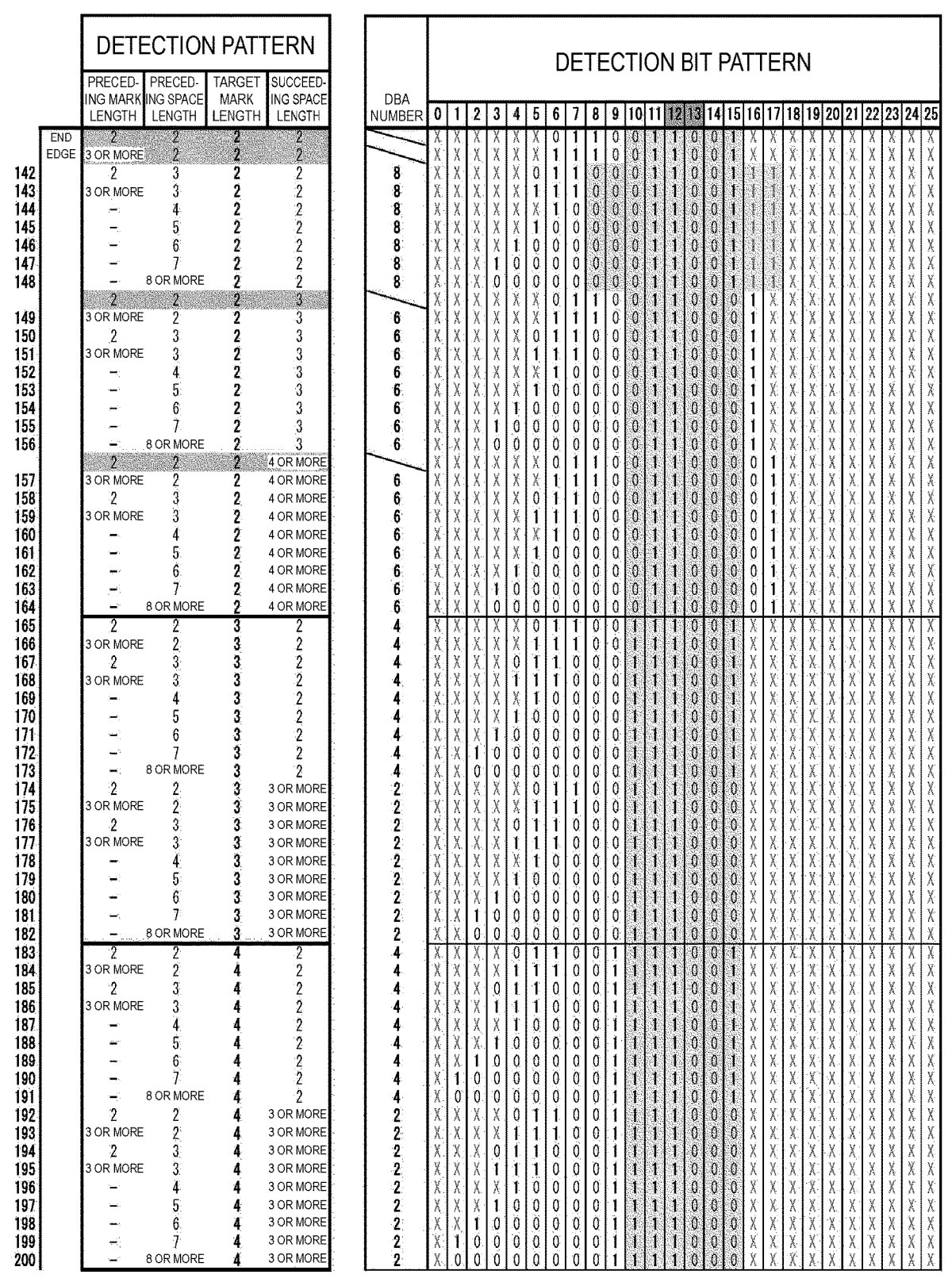
Figure 12D:
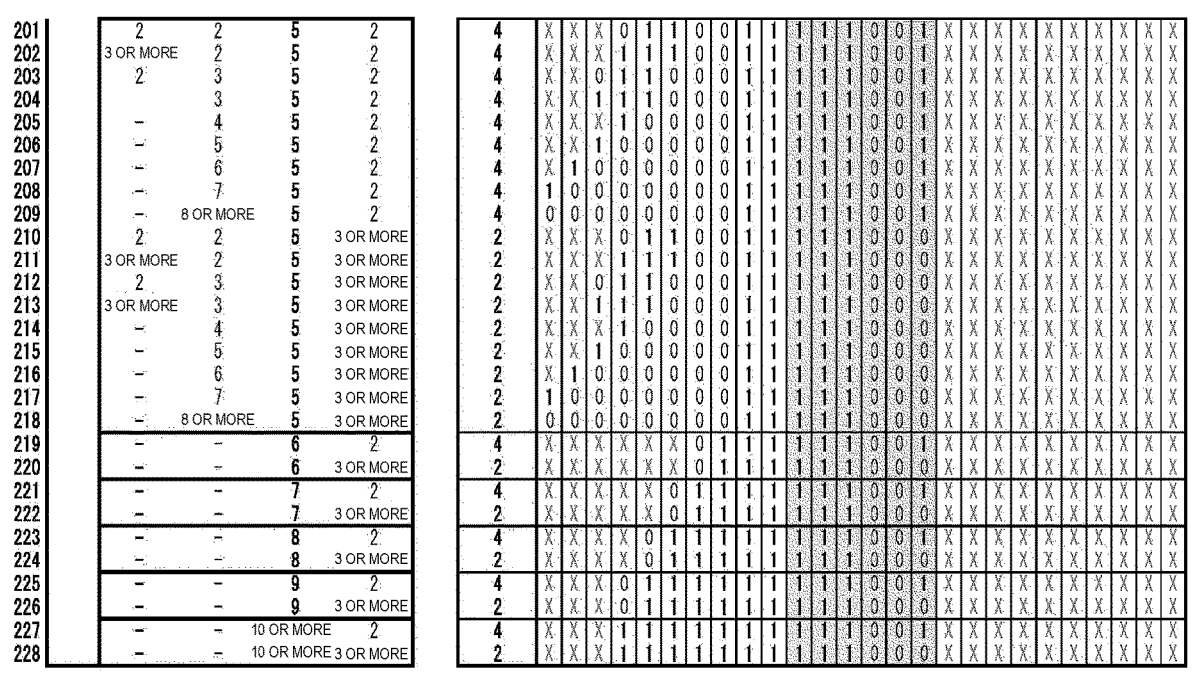

FIGS. 12C and 12D show the classifications of bit patterns used for adjusting the end position of a recording pulse. FIG. 12C shows the classification when the target mark lengths are 2T, 3T, and 4T, and FIG. 12D shows the classification when the target mark lengths are 5T, 6T, 7T, 8T, 9T, and 10T or more (10T, 11T and 12T).

(a) In the target mark lengths 2T, 3T, 4T, 5T, 6T, 7T, 8T, 9T, and 10T or more, the classification is performed for each of the succeeding space lengths 2T, 3T, and 4T or more when the target mark length is 2T, and the classification is performed for each of the succeeding space lengths 2T and 3T or more in each case of the target mark lengths 3T, . . . , 9T, and 10T or more. That is, the classification is performed for individual combinations of the target mark lengths and the succeeding space lengths.

(b) In each case of the target mark lengths 2T, 3T, 4T, and 5T, the classification is performed for each of the preceding space lengths 2T, 3T, 4T, 5T, 6T, 7T, and 8T or more.

(c) In each case of the preceding space lengths 2T and 3T, the classification is performed for each of the preceding mark lengths 2T and 3T or more.

The first example is an example of the bit pattern classification in which the thermal interference with a mark and a space on the preceding side of the target mark is emphasized. Concerning the start edge of a recording pulse, the thermal interference and the intersymbol interference can be reduced by performing the fine classification for the individual combinations of the run lengths of the target mark lengths and the preceding space lengths. When the classification is performed for each of the preceding mark lengths 2T and 3T or more in each of the short space lengths of the preceding space lengths 2T and 3T, the thermal interference with the short marks and spaces can be reduced more effectively.

When the classification is performed for each of the succeeding space lengths 2T and 3T or more in each of the short mark lengths of the target mark lengths 2T and 3T, the intersymbol interference can be reduced. Concerning the end edge of a recording pulse, the thermal interference and the intersymbol interference can be reduced by performing the fine classification for the individual combinations of the run lengths of the target mark lengths and the succeeding space lengths. When the fine classification is performed according to the preceding space length in each of the short mark mark lengths of the target mark lengths 2T to 5T, the thermal interference can be reduced more effectively. When the classification is performed for each of the preceding mark lengths 2T and 3T or more in each of the short space lengths of the preceding space lengths 2T and 3T, the thermal interference with the short marks and spaces can be reduced more effectively.

(1) Second Example of Classification Patterns of Detection Bit Patterns

FIGS. 13A, 13B, 13C, and 13D are diagrams illustrating a second example of the classification of the detection bit patterns used in the adaptive recording compensation in the embodiment. The correction amount of a recording pulse is set with reference to the classification of the detection bit patterns shown in FIGS. 13A to 13D. In each drawing, the table on the left side shows the pattern number of each classification, a preceding mark length, a preceding space length, target mark length, and a succeeding space length in the detection pattern of each pattern number. The table on the right side shows, in bit units, the detection bit pattern corresponding to the detection pattern of each pattern number. For the individual detection bit patterns, eight types of classification represented by DBA numbers 1 to 8 illustrated in FIG. 14 are shown. DBA (identification bit array) is used when performing the L-SEAT operation described later, and indicates the type of a bit array of a total 10 bits of preceding 5T and succeeding 5T centering an edge of interest. Each detection pattern shown with a dark background in the figure is a pattern in which three or more marks or spaces of 2T are continuous, and is a bit patterns that does not appear in 110PCWA used as modulation codes in the embodiment and thus excluded here.

(2-1) Start Edge Adjustment of Recording Pulse

FIGS. 13A and 13B show the classifications of bit patterns used for adjusting the start position of a recording pulse. FIG. 13A shows the classification when target mark lengths are 2T and 3T, and FIG. 13B shows the classification when the target mark lengths are 4T, 5T, 6T, 7T, 8T, 9T, 10T, 11T and 12T.

(a) In each of the target mark lengths 2T, 3T, 4T, 5T, 6T, 7T, 8T, 9T, 10T, 11T, and 12T, the classification is performed for each of preceding mark lengths 2T, 3T, 4T, 5T, and 6T or more. That is, the classification is performed for individual combinations of the target mark lengths and the preceding space lengths.

(b) In each case of the target mark lengths 2T, 3T and 4T, the classification is performed for each of the succeeding space lengths 2T, 3T, 4T, 5T, and 6T or more.

(2-2) End Edge Adjustment of Recording Pulse

Figure 13D:
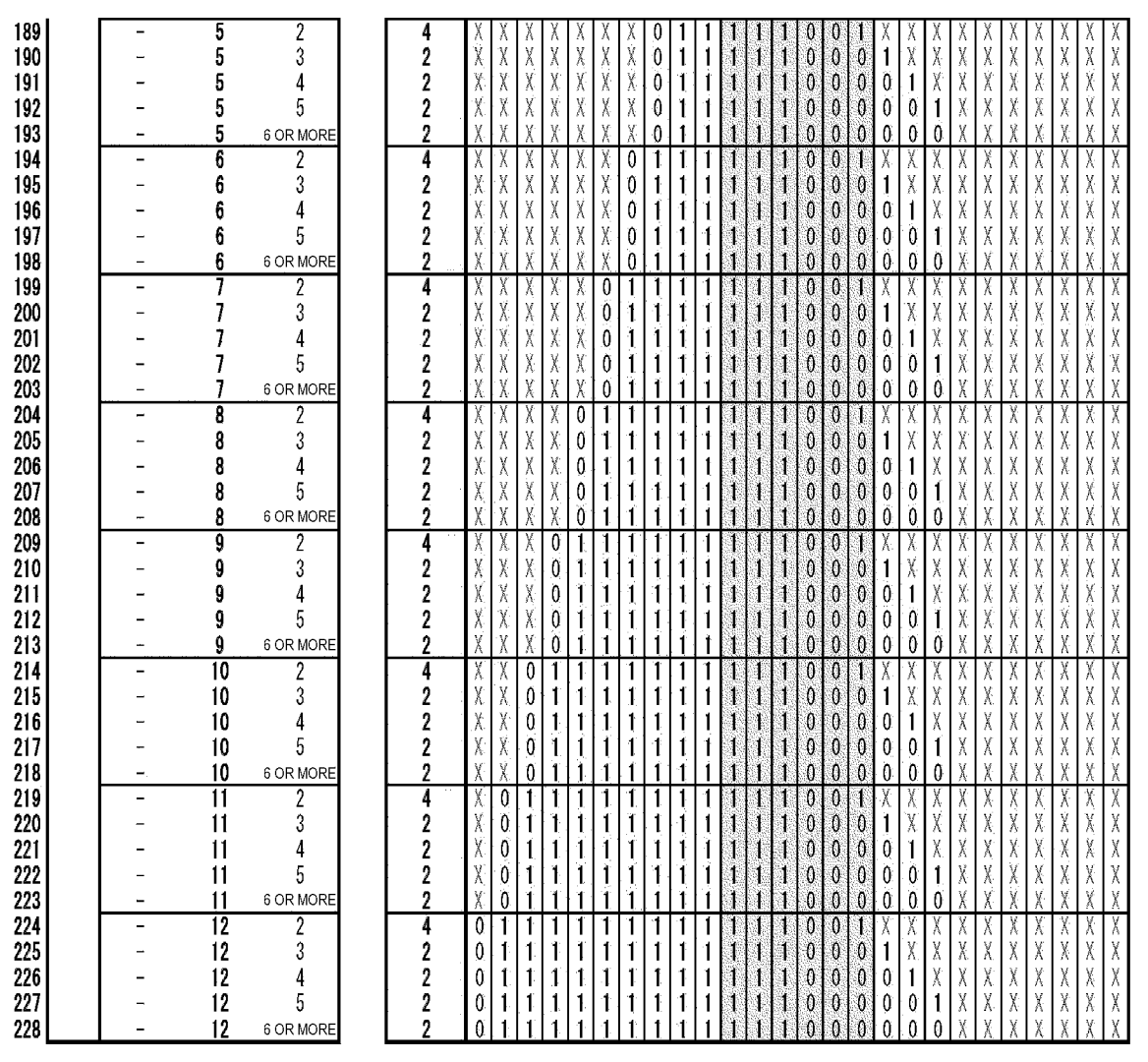

FIGS. 13C and 13D show the classifications of bit patterns used for adjusting the end position of a recording pulse. FIG. 13C shows the classification when the target mark lengths are 2T, 3T, and 4T, and FIG. 13D shows the classification when the target mark lengths are 5T, 6T, 7T, 8T, 9T, 10T, 11T, and 12T.

(a) In each of the target mark lengths 2T, 3T, 4T, 5T, 6T, 7T, 8T, 9T, 10T, 11T and 12T, the classification is performed for each of the succeeding space lengths 2T, 3T, 4T, 5T, and 6T or more. That is, the classification is performed for individual combinations of the target mark lengths and the succeeding space lengths.

(b) In each case of the target mark lengths 2T, 3T, and 4T, the classification is performed for each of the preceding space lengths 2T, 3T, 4T, 5T, and 6T or more.

The second example is an example of the bit pattern classification in which the intersymbol interference with marks and spaces on the preceding and succeeding sides of the target mark is emphasized. Concerning the start edge of a recording pulse, the thermal interference and the intersymbol interference can be reduced by performing the fine classification for the individual combinations of the run lengths of the target mark lengths and the preceding space lengths. When the fine classification is performed according to the succeeding space length in each of the short mark lengths of the target mark lengths 2T to 4T, the intersymbol interference can be reduced effectively. Concerning the end edge of a recording pulse, the thermal interference and the intersymbol interference can be reduced by performing the fine classification for the individual combinations of the run lengths of the target mark lengths and the succeeding space lengths. When the fine classification is performed according to the preceding space length in each of the short mark lengths of the target mark lengths 2T to 4T, the intersymbol interference can be reduced effectively.

The classification of the encoded data according to the mark lengths and the space lengths is not limited to the above examples, and may be appropriately set according to various factors such as the characteristics of the optical disk and the optical conditions of the optical pickup. For example, it is also possible to perform detection and record adjustment by reducing the number of mark/space classifications without classifying the space lengths on the preceding and succeeding sides while setting the mark lengths for adjusting the recording pulse to 4 types of 2T, 3T, 4T, and 5T or more, In this case, it is possible to reduce the time required for a series of record adjustments (learning) of recording multiple patterns by the test recording, detecting shift, and adjusting the setting of the recording pulse.

(Pattern Shift Detection)

Next, the method of detecting the pattern shift of a reproduction signal in the embodiment will be described. In the embodiment, the PRML processing unit 108 generates a binary signal of a reproduction signal by the higher-order maximum likelihood decoding processing of the PRML scheme with constraint length=11, and the shift detecting unit 109 detects a pattern shift of the binary bit array by the L-SEAT operation.

First, an outline of the L-SEAT operation using L-SEAT which is the evaluation index of the related art as an evaluation index of a decoding result will be described. As described in Patent Literature 2 described above, L-SEAT is an evaluation index that performs evaluation by separating a component corresponding to the shift of an edge of interest of a binary bit array from a component depending on SNR, in an evaluation index according to a difference in Euclidean distance between a reproduction signal and target signals.

W denotes a reproduction signal, T a target signal in the form of a binary bit array obtained from the reproduction signal, L a target signal in the form of a binary bit array in which the edge of interest is shifted by a single bit to the left and which satisfies the condition of restriction on run length, and R a target signal in the form of a binary bit array in which the edge of interest is shifted by a single bit to the right and which satisfies the condition of restriction on run length. In this case, L is the target signal in the form of the binary bit array shifted by a single bit in the leftward direction in the shortest code distance with respect to the binary bit array of the target signal T, and R is the target signal in the form of the binary bit array shifted by a single bit in the rightward direction in the shortest code distance. The Euclidean distances between W, T, R, L are denoted by ED (W, T), ED (W, R), etc. The evaluation value for the error caused when the edge of interest is shifted leftward is represented by xL, and the evaluation value for the error caused when the edge of interest is shifted rightward is represented by xR. These evaluation values are called equivalent edge shifts and defined with the following expressions (D1) and (D2).

[Expression 1]

$$xL = \frac{1}{2}\left(1 - \frac{ED(L, W) - ED(T, W)}{ED(T, L)}\right) \quad (1)$$

[Expression 2]

$$xR = \frac{1}{2}\left(1 - \frac{ED(R, W) - ED(T, W)}{ED(T, R)}\right) \quad (2)$$

The edge shift amount of the edge of interest is called an edge shift D, and is defined by the following expression (3).

[Expression 3]

$$D = \frac{xR - xL}{2} \quad (3)$$

The correction amount corresponding to the error probability for the edge of interest is called an SNR factor S, and is defined by the following expression (4).

[Expression 4]

$$S = \frac{xR + xL}{2} \quad (4)$$

Regarding the group of edges recorded with a condition in which the mark length of an edge of interest is equal to the space length of the space on the preceding (or succeeding) side of the mark, that is, with the same record condition, the amount of edge shift used for record adjustment, which is interpreted as the statistical average Δ of edge shifts D, is defined with the following expression (5).

[Expression 5]

$$\Delta = \sum_{n=1}^{N} D_n \quad (5)$$

Where N denotes the total number of edges subjected to measurement, and Dn the extended edge shift for the n-th edge.

Each of the evaluation indices defined by the above expressions (1) to (5) is called an evaluation index L-SEAT of the related art, and the statistical average Δ defined by the expression (5) is called an L-SEAT shift.

In the embodiment, a pattern shift amount corresponding to the L-SEAT shift is calculated for a pattern including a mark/space of interest of the binary bit string of the reproduction signal, the correction amount of the recording pulse that minimizes the pattern shift amount is calculated, and the recording pulse condition is set.

Next, a processing procedure for detecting a pattern shift from a reproduction signal to perform the adaptive recording compensation in the embodiment will be described. The extended L-SEAT of this embodiment detects a shift for each pattern having a long constraint code length and including a plurality of marks/spaces, and thus the shift is called a pattern shift, not an edge shift as in the related art. The extended L-SEAT is a concept that calculates not only an edge shift amount at the start/end of a mark as in Patent Literature 2, but also shift amounts by extending to a space and a mark on the preceding/succeeding side of a mark of interest. When adjusting the position of the start and/or end of a recording pulse from the reproduction signal in the arrangement of a plurality of recording marks/spaces, it is necessary to detect, as a pattern shift, a pattern shift direction and a pattern shift amount for each of individual combinations of marks and spaces.

FIG. 14 is a diagram illustrating types of bit arrays used for the extended L-SEAT operation in the embodiment. In the binary bit array of a reproduction signal, when noticing a bit pattern centered on an edge of interest, a bit array of a total 10 bits on the preceding 5T and succeeding 5T sides is classified into eight patterns of DBA numbers 1 to 8 as shown in FIG. 14. The illustrated example shows a case of a mark polarity for recording a mark corresponding to "0" of a binary bit array. In this case, a portion corresponding to "1" of the binary bit array is a space. In FIG. 14, the table on the left side shows bit arrays of eight types of DBA (Discriminator Bit Array), and the table on the right side shows XOR mask bit arrays (XOR Mask Bit Arrays) when the bit arrays of the shortest code distance, which are respectively shifted left and right by a single bit for the bit array of each DBA type, are generated by the XOR operation. L-Target is an XOR mask bit array (left-shift mask bit array) when shifting by a single bit to the left and R-Target is an XOR mask bit array (right-shift mask bit array) when shifting by a single bit to the right. A blank portion is a pattern in which a bit string of the shortest code distance does not exist. Hereinafter, the bit shift to the left direction is referred to as "left shift", and the bit shift to the right direction is referred to as "right shift". The side of the traveling direction of the optical spot is defined as the succeeding side, and the side opposite to the traveling direction is defined as the preceding side.

When performing a comparison operation of extended L-SEAT, it is determined which DBA type a detection bit pattern of 10 bits (10T), which is centered on the pattern of interest, is according to the DBA type classification shown in FIG. 14, and thus a right shift mask bit array and a left shift mask bit array are determined. The XOR operation is performed on the detection bit pattern using the right-shift mask bit array and the left-shift mask bit array, thereby calculating a right-shift bit array and a left-shift bit array. The right-shift bit array and the left-shift bit array are bit arrays of patterns most likely to be erroneous in the left and right bit directions with respect to the detection bit pattern, respectively.

FIG. 15 is a diagram for explaining an example of the extended L-SEAT operation processing in the embodiment. As shown in FIG. 15, individual coefficients D1 of the PR class in the embodiment are D1: 3, 6, 9, 13, 16, 17, 16, 13, 9, 6, 3, and 3. That is, the constraint length is 11 and there are 11 coefficients. Time point D2 is assumed to be 0 at the timing of a predetermined channel bit and incremented by 1 every 1T. Here, a case is illustrated in which decoding results (Viterbi detection results) D3, shown in the upper part, obtained by the Viterbi decoding are obtained with respect to the respective values of input waveform D4 shown as input data in the figure. In D3 of FIG. 15, 0 indicates a mark, 1 indicates a space, and 1 time point indicates a unit of 1 Tw. In the example of FIG. 15, the Viterbi detection results D3 at the time points D2=8 to 17 are the bit pattern corresponding to the DBA number 7 in FIG. 14 and the pattern number 11 of the detection bit pattern of the first example in FIG. 12A. At time points D2=7 to 18 including the preceding and following time points, the bit pattern is 4T mark-2T space-2T mark-4T space. In this case, the edge of interest is the start edge of the 2T mark at the time point D2=13, and a pattern shift of the target mark is calculated in the case where the target mark is a 2T mark and the preceding space is a 2T space.

The maximum amplitude D5 of the PR class is obtained by summing the individual coefficients D1: 3, 6, 9, 13, 16, 17, 16, 13, 9, 6, and 3 to be D5=Σ(D1)=111.

If the maximum amplitude (peak to peak) D6 of the input waveform is set to D6=222 and each coefficient D1 of the PR class is normalized by D6/D5, the coefficients D7 of the PR class after the normalization are D7=D1×(D6/D5)=6, 12, 18, 26, 32, 34, 32, 26, 18, 12, 6. The values of Viterbi detection result D3 are each offset so that it is centered at 0, and thus the values corrected from 0 to −0.5, and 1 to +0.5 are D8.

Next, in the corrected Viterbi detection result D8, the values of the Viterbi detection result D8 at individual time points of 11T in total including the preceding and succeeding 5T are each multiplied by the coefficient D7 of the PR class and are added, thereby calculating an ideal waveform D9 obtained by performing a PR equalization processing on the Viterbi decoding result. That is, when the Viterbi detection result D8 at time point t is D8(t), the ideal waveform D9 is D9(t), and the current time point is t=13, the calculation of D9(t)={D8(t)×D7(n)} is executed for t=8 to 18 and n=1 to 11, thereby obtaining an ideal waveform D9(t) of the Viterbi decoding result.

Subsequently, the XOR operation is performed on the corrected Viterbi detection result D8 using the R-Target D10 and L-Target D11 of DBA number 7, thereby calculating an R-Target product (right-shift bit array) D12 and an L-Target product (left-shift bit array) D13. The PR equalization processing is performed on each of the R-Target product D12 and the L-Target product D13 in the same manner as the Viterbi detection result D8, and a preceding-shift ideal waveform D14 and a succeeding-shift ideal waveform D15 are obtained. The preceding-shift ideal waveform D14 and the succeeding-shift ideal waveform D15 are ideal waveforms respectively corresponding to the R-Target product D12 and the L-Target product D13 of the pattern most likely to be erroneous in the preceding and succeeding directions.

A distance D16 between the preceding-shift ideal waveform D14 and the ideal waveform D9 at each time point is calculated by squaring the difference between the two waveforms as D16=(D14−D9)^2. Here, the symbol ^ represents a power. A distance between the succeeding-shift ideal waveform D15 and the ideal waveform D9 at each time point can also be obtained by the same calculation as in the forward shift. A square Euclidean distance D17 between the ideal waveform D14 and the ideal waveform D9 is calculated by integrating the distances D16 at individual time points.

Next, a preceding-shift operation value D18 at each time point is obtained by multiplying the difference between the ideal waveform D9 and the input waveform D4 by the difference between the ideal waveform D9 and the preceding-shift ideal waveform D14 as D18=(D9−D4)×(D9−D14). The preceding-shift operation values D18 at individual time points are integrated to obtain a preceding-shift integrated value D19. The preceding-shift integrated value D19 is a value indicating the degree of a shift in the preceding direction of the input waveform D4 with respect to the ideal waveform D9 and the preceding-shift ideal waveform D14. By multiplying the difference between the ideal waveform D9 and the input waveform D4 by the difference between the ideal waveform D9 and the succeeding-shift ideal waveform D15, a succeeding-shift operation value D20 at each time point is obtained as D20=(D9−D4)×(D9−D15). The succeeding-shift operation values D20 at individual time points are integrated to obtain a succeeding-shift integrated value D21. The succeeding-shift integrated value D21 is a value indicating the degree of a shift in the succeeding direction of the input waveform D4 with respect to the ideal waveform D9 and the succeeding-shift ideal waveform D15.

Finally, the difference between the preceding-shift integrated value D19 and the succeeding-shift integrated value D21 is divided by 2 to obtain an L-SEAT value D22 corresponding to the L-SEAT shift Δ defined by the above expression (5), as D22=(D19−D21)/2. The L-SEAT value D22 is a value indicating how much the input waveform D4 is shifted in the preceding or training direction with respect to the ideal waveform D9, that is, how much the recording pattern including the mark/space on the preceding and succeeding sides of a recording mark of interest is shifted in the preceding or training direction from an ideal position. The sign and the absolute value of the L-SEAT value D22 indicate the edge shift direction and the edge shift amount, respectively. When the L-SEAT value D22 is calculated by subtracting the succeeding-shift integrated value D21 from the preceding-shift integrated value D19 as in the above equation, if the L-SEAT value D22 is positive, it indicates that the input waveform D4 is shifted to the right with respect to the ideal waveform D9, that is, the recording pattern including the mark/space on the preceding and succeeding sides of the recording mark of interest is shifted in the succeeding direction from the ideal position. If the L-SEAT value D22 is negative, it indicates that the input waveform D4 is shifted to the left with respect to the ideal waveform D9, that is, the recording pattern including the mark/space on the preceding and succeeding sides of the recording mark of interest is shifted in the preceding direction from the ideal position. Then, the L-SEAT value D22 is normalized by the square Euclidean distance D17 between the preceding-shift ideal waveform D14 and the ideal waveform D9, and a normalized L-SEAT value D23 is calculated by D23=D22/D17. The normalized L-SEAT value D23 may be expressed as a percentage. By such an L-SEAT operation, the difference between the input waveform D4 and the ideal waveform D9, the preceding-shift ideal waveform D14, the succeeding-shift ideal waveform D15 is calculated, and the pattern shift of the input waveform D4 with respect to the ideal waveform D9 can be detected.

Figure 16:
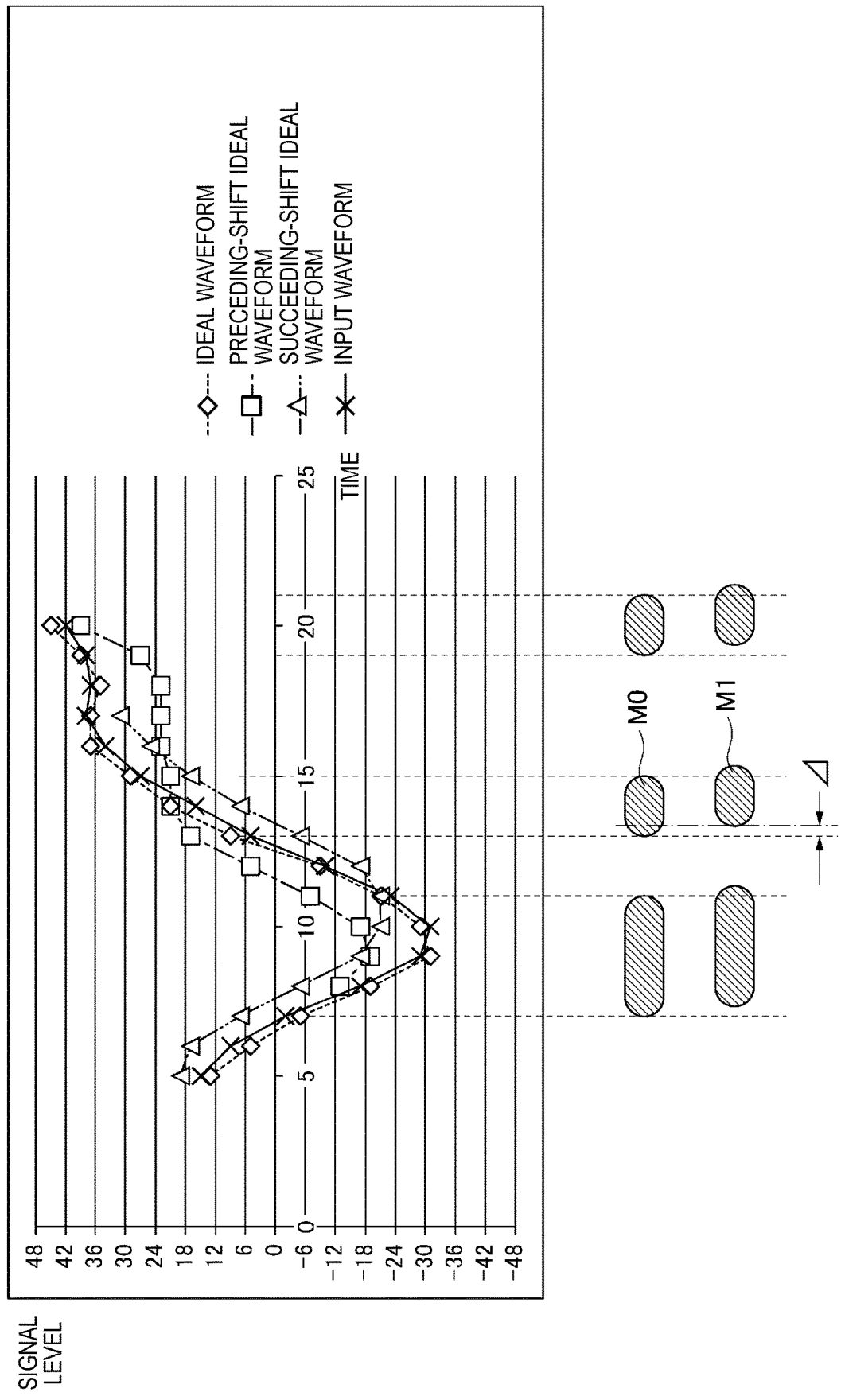
[FIG. 16] A diagram illustrating an example of a processing result of the extended L-SEAT operation in the embodiment.

FIG. 16 is a diagram illustrating an example of the processing result of the extended L-SEAT operation in the embodiment. FIG. 16 is a graph showing the signal level values at individual time points of the input waveform D4 (x and solid lines in the figure), the ideal waveform D9 (rhombuses and a broken line in the figure), the preceding-shift ideal waveform D14 (squares and a dashed line in the figure), the succeeding-shift ideal waveform D15 (triangles and a two-dot chain line in the figure) in the L-SEAT operation described in FIG. 15. A mark M1 corresponding to the input waveform D4 and a mark M0 corresponding to the ideal waveform D9 are shown below the graph in FIG. 16. By the above-described extended L-SEAT operation, the difference (pattern shift) between the patterns of the mark M1 and the mark M0 is calculated as the L-SEAT value D22 representing a pattern shift amount, that is, the SEAT shift Δ. The illustrated example shows a case where the mark M1 corresponding to the input waveform D4 is shifted in the succeeding direction with respect to the mark M0 corresponding to the ideal waveform D9 by the pattern shift amount Δt. In this case, by setting the correction amount of the recording pulse and correcting the position of the recording pattern so that the recording mark including the mark M1 and the space are moved in the preceding direction by the pattern shift amount Δ, it is possible to obtain a reproduction signal substantially matching the ideal waveform D9.

The pattern shift detection as described above is executed in the same procedure for each classification of the detection bit patterns in the first example of FIGS. 12A to 12D or the second example of FIGS. 13A to 13D, thereby calculating the pattern shift amounts of the bit patterns in each classification. At this time, the pattern shift amount is calculated for each pattern number of the combination of the recording mark of interest and the preceding/succeeding space lengths for each classification of the detection bit pattern. The correction amount of the recording pulse in the detection bit pattern of each classification is calculated based on the pattern shift amount obtained for each classification. As the correction amount of the recording pulse, as described with reference to FIG. 11, the test writing is performed to detect the pattern shift amount, and the correction amount that makes the pattern shift amount equal to or less than the predetermined value is obtained by a predetermined algorithm. Regarding the start position (start edge) of the recording pulse, parameters $dT_{top}$ and $T_{top}$ defining the start position are set including the correction amount for each classification of the detection bit pattern. Regarding the end position (end edge) of the recording pulse, parameters $dT_c$, $T_{LP}$ and $dT_S$ defining the end position are set including the correction amount for each classification of the detection bit pattern. As the correction amount of the recording pulse, a reference value of each parameter may be set, and the correction amount of a difference may be set for each classification of the bit pattern.

(Example of the Processing result of the Embodiment)

Next, the effect of reducing the error rate when the adaptive recording compensation in the embodiment is used will be described. Hereinafter, an example of the extended L-SEAT calculation result and the error rate detection result will be shown which was obtained by performing an experiment in which recording and reproduction was actually performed on and from the L0 layer of a 500 GB density 3-layer disk at an 8×speed (clock frequency of 491 MHz) using an optical disk evaluation device equipped with the optical system, signal processing system, and recording system having the parameters described in the embodiment of the present invention.

Figure 17:
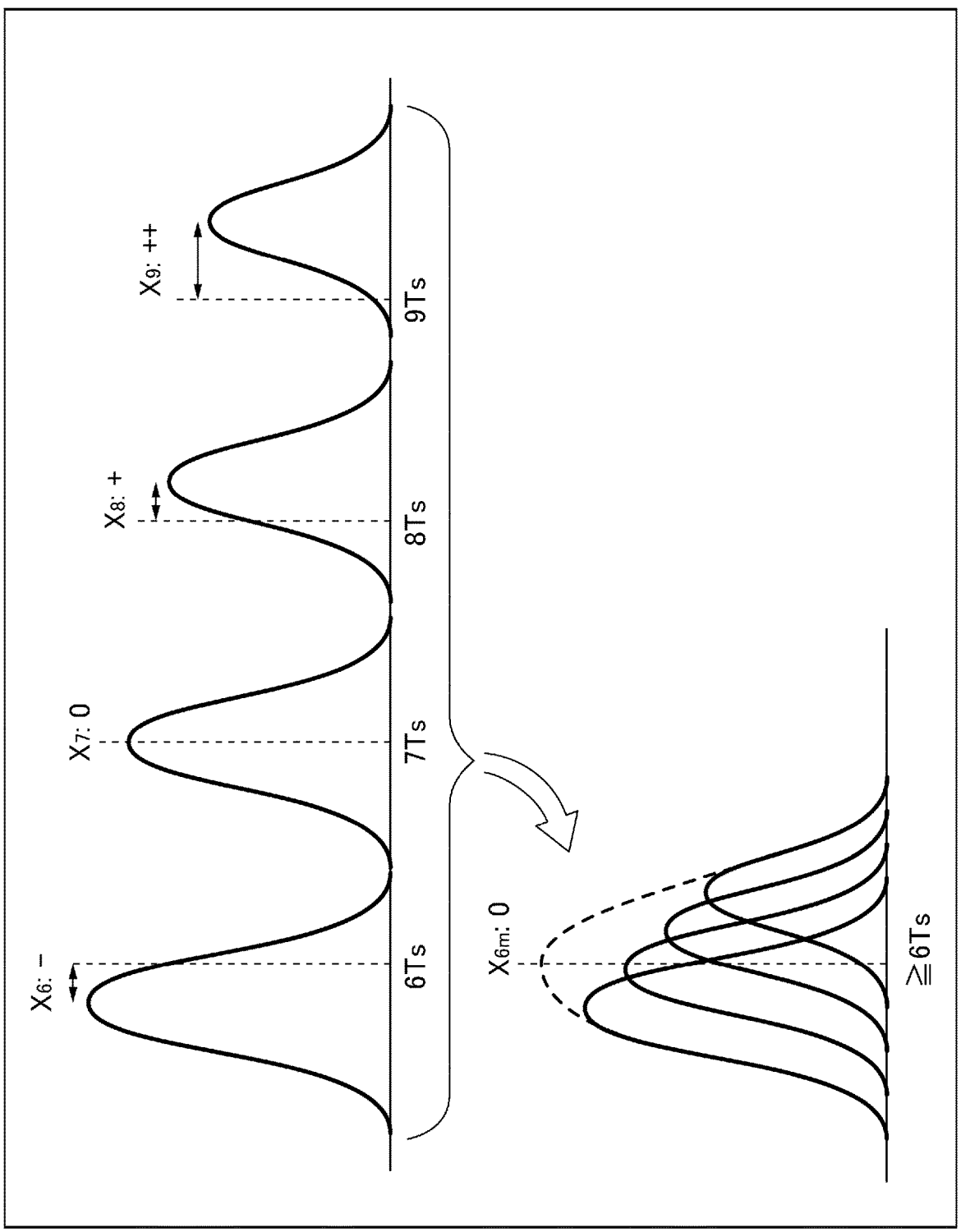
[FIG. 17] A diagram illustrating an example of a histogram of pattern shift amounts obtained by the extended L-SEAT operation.

FIG. 17 is a diagram illustrating an example of a distribution of a pattern shift amount calculated by the extended L-SEAT operation. The upper part of FIG. 17 shows a histogram distribution when the pattern shift amount in each space length of 6T space (6Ts), 7T space (7Ts), 8T space (8Ts), and 9T space (9Ts) on the preceding side of 4T mark is individually obtained. The portion indicated by Xi (i=6, 7, 8, 9) of the histogram represents the shift amount of the average value of the histogram from the window center (detection window center) of each T. In the illustrated example, the start position of the 4T mark is detected to have a pattern shift of negative (preceding direction) in the case of the 6T space (X6) on the preceding side of the 4T mark, the start position of the 4T mark is detected to have a pattern shift whose representative value is near zero in the case of the 7T space (X7) on the preceding side, and the start position of the 4T mark is detected to have a pattern shift of positive (succeeding direction) in the case of the 8T (8X) space and 9T space (9X) on the preceding side. The lower part of FIG. 17 shows a distribution in a case where the space length is integrated for the spaces of 6T or more (≥6Ts) on the preceding side of the 4T mark, and the pattern shift amount was obtained. When the space lengths of the spaces of 6T or more are collectively set (X6m), the distribution is obtained by accumulating the distribution of each pattern shift of the spaces 6Ts to 12Ts, and a pattern shift whose representative value is close to zero is detected. Therefore, for the space lengths of 6T or more, when the pattern shift detection and the setting of recording pulse condition are performed by a classification that is united at the space lengths of 6T or more without classifying the space length of the spaces 6Ts, 7Ts, 8Ts, 9Ts, . . . , the preceding spaces 6Ts, 8Ts, 9Ts, 10Ts, . . . may be shifted from ideal positions due to the degeneration, and the recording compensation may not be performed suitably.

Thus, in the embodiment, even for the mark lengths and space lengths of 6T or more, the fine classification is performed for each mark length or space length, and the pattern shift detection and the recording pulse condition setting are performed for each classification. When the marks and spaces having the run lengths of 2T to 12T are recorded, it has been found from an experimental result by the inventors of the present application that, in particular, in the bit pattern including the preceding space having the space length of 6T or more, the pattern shift amount for each space length gradually increases, and the error rate increases. In this case, an error frequently occurs in the bit pattern related to the space of 8T to 12T. Thus, the classification is performed finely according to the mark length and the space length such that the target mark length and the preceding space length are finely classified into, for example, 2T, 3T, 4T, 5T, 6T, 7T, and 8T or more, and more preferably, the mark and space lengths of 8T or more are further classified into 8T, 9T, 10T, and 11T or more, and the recording pulse condition is set for each classification. As a result, the recording pulse can be optimized, and the appropriate recording compensation can be achieved.

Figure 18:
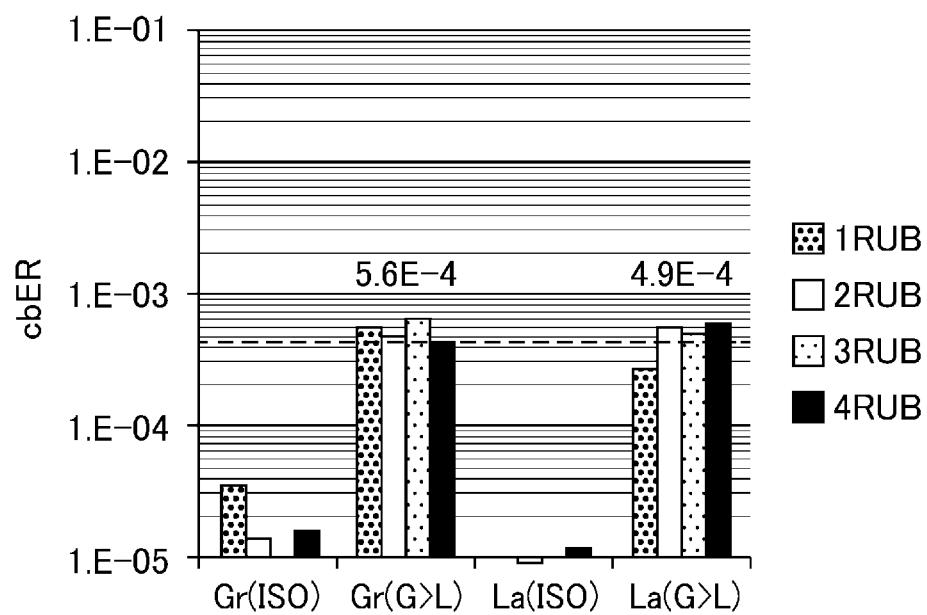
[FIG. 18] A diagram illustrating an error rate detection result in the optical disk device in an example of the embodiment.
Figure 19:
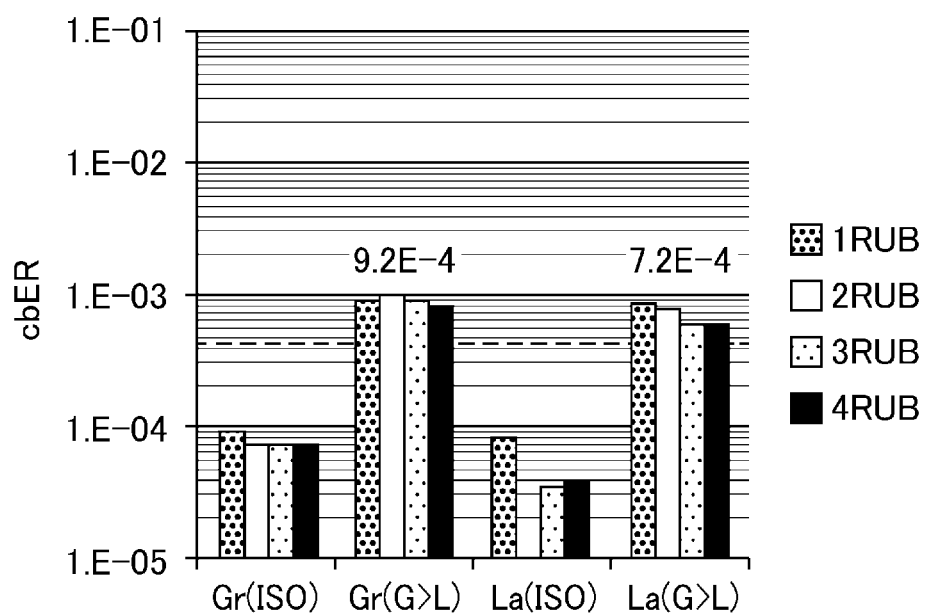
[FIG. 19] A diagram illustrating an error rate detection result in the optical disk device of the comparative example.

FIG. 18 is a diagram illustrating a channel bit error rate detection result in the optical disk device in an example of the embodiment. FIG. 19 is a diagram illustrating a channel bit error rate detection result in the optical disk device of the comparative example. In FIGS. 18 and 19, the vertical axis indicates the channel bit error rate (cbER), Gr (ISO) indicates the error rate of an isolated groove track recorded only on the groove, Gr (G>L) indicates the error rates of groove tracks (adjacent recorded grooves) in a state of having been recorded on a land track between the recorded grooves (groove previous recording) after recording on the grooves first, La (ISO) indicates the error rate of an isolated land track recorded only on the land, and La (G>L) indicates the error rates of a land track (adjacent recorded land) in a state of having been recorded on a land track between recorded grooves (groove previous recording) after recording on the grooves first. FIGS. 18 and 19 are examples in which recording is performed on four RUBs in units of RUB (Recording Unit Block), which is a recording data unit of the optical disk, and the error rates are detected. 1RUB to 4RUB indicate channel bit error rates in respective blocks.

The example of embodiment shown in FIG. 18 is an example in which the fine classification is performed for each of the space lengths 2Ts, 3Ts, . . . , 11Ts, and 12Ts, and the pattern shift detection and the recording pulse condition setting are performed for each classification. In the example, a good result was obtained in which the average value of the channel bit error rates of 4 RUBs of a groove track in the land and groove recording state was $5.6 \times 10^{-4}$, and the average value of the channel bit error rates of 4 RUBs of a land track in the same recording state was $4.9 \times 10^{-4}$. In contrast, the comparative example shown in FIG. 19 is an example in which the classification is performed for each of the space lengths 2Ts, 3Ts, 4Ts, 5Ts and 6Ts or more, and the pattern shift detection and the recording pulse condition setting are performed for each classification. In the comparative example, there is a case where appropriate recording compensation cannot be performed as described with reference to FIG. 17, and thus the error rate of a groove track in the land and groove recording state was $9.2 \times 10^{-4}$ and the error rate of a land track in the same recording state was $7.2 \times 10^{-4}$. In the example, the error rate in the land and groove recording state was 0.60 to 0.68 times that of the comparative example, and could be reduced to about ⅔. In the case of recording only grooves and only lands, the error rate can be reduced in an almost error-free state.

In addition to the extended L-SEAT operation of the embodiment, it is also possible to use d-MLSE, which is an extended MLSE (Maximum Likelihood Sequence Error), as an evaluation index of the jitter of decoded data, and appropriately set the recording pulse condition such as the correction amount of a recording pulse according to the calculation result of d-MLSE.

As described above, the embodiment relates to the optical disk recording method and the optical disk device in which a plurality of marks are formed on a medium by irradiating the optical disk 101 with an optical beam and information is recorded using the edge positions of each mark and a space between two adjacent marks. In the optical disk recording method, by the recording pattern generation unit 111, the binary encoded data corresponding to the mark and the space is generated by encoding the recording data according to the modulation codes, and by the recording pulse condition operation unit 110, regarding the run lengths of the mark and the space in the encoded data, if a mark of interest is target mark, the encoded data is classified according to a combination of at least two run lengths of a mark length of the target mark, a space length of a preceding space on a preceding side of the target mark, a mark length of a preceding mark on the preceding side of the target mark, and a space length of a succeeding space on a succeeding side of the target mark. By the PRML processing unit 108, the reproduction signal obtained by reproducing the mark and space corresponding to the encoded data is decoded by the maximum likelihood decoding of the PRML scheme, and by the shift detection unit 109, the evaluation index indicating the shift degrees of the start edge and end edge of the recording pulse for forming the mark is calculated based on the decoding result of the PRML scheme. By the recording pulse condition operation unit 110, for each classification of the run length of the encoded data, the individual correction amounts for adjusting the positions of the start edge and the end edge of the recording pulse are set based on the calculated evaluation index of the decoding result. By the recording compensation unit 112, the recording pulse according to the encoded data of the recording data is generated using the correction amount according to the classification of the run length of the encoded data. By the laser driving unit 113, a power of the optical beam is changed in the plurality of stages with the recording pulse, and by the light irradiation unit 102, a mark according to the recording data is formed on the medium of the optical disk 101 by irradiating the optical disk 101 with the optical beam. In this case, the encoded data is generated by the modulation codes having the maximum code length of 11T or more and includes the code array having the minimum run length of 2T and the maximum run length of 11T or more, and the constraint length, which is the class of the maximum likelihood decoding of the PRML scheme, is 11 or more. The evaluation index of the decoding result is the evaluation index by the extended L-SEAT operation in which the L-SEAT value representing a shift amount in the preceding or succeeding direction of a pattern in the predetermined range of the recording mark of interest is calculated using the binary bit array of the decoding result of the reproduction signal by the maximum likelihood decoding with the constraint length of 11 or more and at least one of the right-shift bit array and the left-shift bit array obtained by shifting the binary bit array by a single bit to right and left respectively. In the classification of the encoded data, the classification is performed for each of the run lengths 2T, 3T, 4T, 5T, 6T, 7T, and 8T or more according to the mark length of the target mark, and the correction amount is set for each classification.

In order to further increase the density of the optical disk by the above configuration, the fine classification is performed for the mark length and space length of 2T to 8T, and the correction amounts of the start position and end position of a recording pulse when forming a recording mark are set, whereby the intersymbol interference and the thermal interference can be reduced and the error rate during reproduction can be sufficiently reduced. Further, encoded data is generated using a modulation code having the maximum code length of 11T or more, and the encoded data includes a code string having the minimum run length of 2T and the maximum run length of 11T or more, so that the SNR of the reproduction signal of a recording mark can be improved. Further, the constraint length of the maximum likelihood decoding of the PRML scheme is increased to 11 or more and, for example, in the reproduction signal, the maximum likelihood decoding of the PRML method and the calculation of the evaluation index are performed using a bit array with the preceding 5T and the succeeding 5T including a bit of interest, whereby it is possible to read data from a reproduction signal containing the short mark and space of 2T, 3T that cannot be separated optically and reduce the read error rate.

In the classification of the coded data, the classification may be performed for each of the run lengths 2T, 3T, 4T, 5T, 6T, 7T, 8T, 9T, 10T and 11T or more according to a mark length of the target mark to set the correction amount for each classification. Thus, the error rate can be further reduced by individually performing the classification on the long mark length or space length.

As an evaluation index of the decoding result by the maximum likelihood decoding of the PRML scheme, for example, an evaluation index by the extended L-SEAT operation described below is used. In the extended L-SEAT operation, the waveform equalization unit 105 and the A-D conversion unit 106 obtain the input waveform of a reproduction signal, and the PRML processing unit 108 obtains the decoding result of a binary bit array by decoding the reproduction signal by the PRML scheme. The shift detection unit 109 obtains the ideal waveform of the reproduction signal based on the decoding result, obtains at least one of a right-shift bit array and a left-shift bit array respectively acquired by shifting the binary bit array of the decoding result left and right by a single bit, and obtains at least one of a preceding-shift ideal waveform corresponding to the right-shift bit array and a succeeding-shift ideal waveform corresponding to the left-shift bit array. When the preceding-shift ideal waveform is acquired, the shift detection unit 109 integrates the preceding shift amounts at individual time points using the difference between the ideal waveform and the input waveform and the difference between the ideal waveform and the preceding-shift ideal waveform, to obtain the preceding-shift integrated value. When the succeeding-shift ideal waveform is acquired, the shift detection unit integrates the succeeding shift amounts at individual time points using the difference between the ideal waveform and the input waveform and the difference between the ideal waveform and the succeeding-shift ideal waveform, to obtain the succeeding-shift integrated value. The shift detection unit 109 calculates an L-SEAT value proportional to the difference between the preceding-shift integrated value and the succeeding-shift integrated value. As described above, by calculating the pattern shift amounts of the start edge and the end edge of a recording pulse using the evaluation index based on the extended L-SEAT operation, the shift amount due to the intersymbol interference and the thermal interference can be appropriately detected. For each classification of the mark length and the space length, the correction amount of a recording pulse for setting the L-SEAT value to the predetermined value or less is obtained and set according to the detected pattern shift amount, and the adaptive recording compensation is performed. As a result, even for a bit pattern having a high probability of a decoding error, the error rate at the time of reproduction can be sufficiently reduced.

In the encoded data, the continuous number of the shortest run length 2T is supposed to be 2 or less. In this way, by limiting the continuous number of the shortest run length, the appearance frequency of 2T in the bit pattern of encoded data can be reduced, so that a decrease in the amplitude of a reproduction signal can be suppressed. Therefore, it is possible to reduce the read error rate of a signal including a mark and a space each having a short run length, and improve the read performance.

Each functional block used in the description of the embodiment is typically realized as an LSI which is an integrated circuit. These functional blocks may be individually made into one chip, or may be made into one chip so as to include a part or all of the functional blocks. Although the integrated circuit is an LSI in this case, the integrated circuit may be called an IC, a system LSI, a super LSI, or an ultra LSI depending on the degree of integration.

The method of circuit integration is not limited to an LSI, and the circuit integration may be realized by a dedicated circuit or a general-purpose processor. A field programmable gate array (FPGA) that can be programmed after manufacturing an LSI or a reconfigurable processor that can reconfigure the connection and setting of circuit cells inside an LSI may be used.

If integrated circuit technology that replaces an LSI emerges as a result of advances in the semiconductor technology or other technology derived from the semiconductor technology, it is naturally also possible to integrate the functional blocks using the emerged integrated circuit technology. As such an integrated circuit technology, a technology using biotechnology, or the like may be possible.

Information about the classification of the run length of the encoded data, such as the number of classifications of the mark length and the space length in the adaptive recording compensation in the embodiment, may be recorded in a predetermined area of the optical disk in advance. The recording pulse condition such as the correction amount of a recording pulse set for each classification may be recorded in a predetermined area of the optical disk in advance. The predetermined area may be the initial value recording area 1003 (see FIG. 2) of the lead-in area on the inner circumference of the optical disk or the memory in the optical disk device. This makes it possible to correct the recording pulse condition according to the characteristics of the optical disk without performing unnecessary adjustment steps. When the classification of the adaptive recording compensation and the correction amount of the recording pulse for each classification are known in advance, the adjustment time can be reduced, and the signal quality of the recording mark can be efficiently improved.

In the optical disk device, after the recording pulse condition such as the correction amount of a recording pulse is obtained and learned for each classification for a specific optical disk, the recording pulse condition thus set may be recorded in a predetermined area. The predetermined area may be the initial value recording area 1003 of the lead-in area on the inner circumference of the optical disk or may be an area that is stored in a nonvolatile memory such as an EEPROM in the optical disk device in the form of firmware in a driver for a PC. This makes it possible to correct the recording pulse condition according to the characteristics of the optical disk device or the optical disk without performing an unnecessary adjustment step at the next start-up. When the classification of the adaptive recording compensation and the correction amount of the recording pulse for each classification are known in advance in this manner, the adjustment time can be reduced and the signal quality of the recording mark can be efficiently improved.

The optical disk device of the embodiment includes a reproducing unit and a reproducing step (optical disk reproducing method) that irradiate an optical beam onto the optical disk to reproduce information. The optical disk device may further include a reading unit and a reading step for reading the recording pulse condition recorded in a predetermined area (for example, the initial value recording area 1003 or the BCA) of the optical disk. The recording parameters such as a write strategy or power may be linked to a code called a BCA media type ID. This makes it possible, also in the reproducing processing, to correct the recording pulse condition according to the characteristics of the optical disk without performing an unnecessary adjustment step at the next start-up. When the classification of the adaptive recording compensation and the correction amount of the recording pulse for each classification are known in advance in this manner, the adjustment time can be reduced and the signal quality of the recording mark can be efficiently improved.

In the embodiment, PR (3, 6, 9, 13, 16, 17, 16, 13, 9, 6, 3) has been described as an example of the PR class in the maximum likelihood decoding of the PRML scheme, but is not limited thereto. The PR class may be a selection of combinations of the PRML scheme that can implement the present invention.

In the embodiment, the optical disk recording method is implemented, but a method including a recording/reproducing operation may be implemented as an optical recording/reproducing method.

Although various embodiments have been described with reference to the drawings, it is needless to say that the present disclosure is not limited to such embodiments. It is obvious that those skilled in the art can conceive various changes or modifications within the scope of the claims, and it is understood that such various changes and the like naturally belong to the technical scope of the present disclosure. Individual constituent elements in the above-described embodiment may be arbitrarily combined without departing from the spirit of the invention.

The present application is based on Japanese Patent Application (No. 2018-043235) filed on Mar. 9, 2018, the contents of which are incorporated herein by reference.

INDUSTRIAL APPLICABILITY

The present disclosure is useful as an optical disk recording method, an optical disk device, and an integrated circuit that can reduce optical intersymbol interference and thermal interference in response to further increase in the density of an optical disk.

REFERENCE SIGNS LIST 102 light irradiation unit
103 preamplifier unit
104 AGC unit
105 waveform equalization unit
106 A-D conversion unit
107 PLL unit
108 PRML processing unit
109 shift detection unit
110 recording pulse condition calculation unit
111 recording pattern generation unit
112 recording compensation unit
113 laser driving unit

The invention claimed is:

1. An optical disk recording method for irradiating an optical disk with an optical beam to form a plurality of marks on a medium, and recording information using edge positions of each mark and a space between two adjacent marks, comprising:
encoding recording data according to modulation codes to generate binary encoded data corresponding to the mark and the space;
regarding run lengths of the mark and the space in the encoded data, if a mark of interest is target mark, classifying the encoded data according to a combination of at least two run lengths of a mark length of the target mark, a space length of a preceding space on a preceding side of the target mark, a mark length of a preceding mark on the preceding side of the target mark, and a space length of a succeeding space on a succeeding side of the target mark;
for each classification of the run length of the encoded data, setting individual correction amounts for adjusting positions of a start edge and an end edge of a recording pulse for forming the mark, based on an evaluation index of a decoding result which is obtained when a reproduction signal obtained by reproducing the mark and space corresponding to the encoded data is decoded by maximum likelihood decoding of a PRML scheme;
generating a recording pulse according to the encoded data using the correction amount according to the classification of the run length of the encoded data; and
forming a mark according to the recording data on the medium of the optical disk by changing a power of the optical beam in a plurality of stages with the recording pulse and irradiating the optical disk with the optical beam, wherein
the encoded data is generated by modulation codes having a maximum code length of 11T or more, and includes a code array having a minimum run length of 2T and a maximum run length of 11T or more,
a constraint length, which is a class of the maximum likelihood decoding of the PRML scheme, is 11 or more,
the evaluation index of the decoding result is an evaluation index by an extended L-SEAT operation in which an L-SEAT value representing a shift amount in a preceding or succeeding direction of a pattern in a predetermined range of a recording mark of interest is calculated using a binary bit array of the decoding result of the reproduction signal by the maximum likelihood decoding with the constraint length of 11 or more and at least one of a right-shift bit array and a left-shift bit array obtained by shifting the binary bit array by a single bit to right and left respectively, and
in the classification of the encoded data, the classification is performed for each of run lengths 2T, 3T, 4T, 5T, 6T, 7T, and 8T or more according to the mark length of the target mark, and the correction amount is set for each classification.

2. The optical disk recording method according to claim 1, wherein in the classification of the encoded data, the classification is performed for each of run lengths 2T, 3T, 4T, 5T, 6T, 7T, 8T, 9T, 10T, and 11T or more according to the mark length of the target mark, and the correction amount is set for each classification.

3. The optical disk recording method according to claim 1, wherein in the classification of the encoded data, according to a combination of the mark length of the target mark and the space length of the preceding space, the classification is performed for each of space lengths 2T, 3T, 4T, 5T, 6T, 7T, 8T, 9T, 10T, and 11T or more of the preceding space in each of mark lengths 2T, 3T, 4T, 5T, 6T, 7T, 8T, 9T, 10T, and 11T or more of the target mark, and a correction amount of a start edge of the recording pulse is set for each classification.

4. The optical disk recording method according to claim 3, wherein in the classification of the encoded data, according to the combination of the space length of the preceding space and the mark length of the preceding mark, the classification is performed for each of mark lengths 2T and 3T or more of the preceding mark in each of space length 2T or 3T of the preceding space, and a correction amount of the start edge of the recording pulse is set for each classification.

5. The optical disk recording method according to claim 3, wherein in the classification of the encoded data, according to the combination of the mark length of the target mark and the space length of the succeeding space, the classification is performed for each of space lengths 2T and 3T or more of the succeeding space in each of mark length 2T or 3T of the target mark, and a correction amount of the start edge of the recording pulse is set for each classification.

6. The optical disk recording method according to claim 1, wherein in the classification of the encoded data, according to a combination of the mark length of the target mark and the space length of the succeeding space, the classification is performed for each of space lengths 2T, 3T, and 4T or more of the succeeding space in a case of mark length 2T of the target mark, the classification is performed for each of space lengths 2T, and 3T or more of the succeeding space in each of mark lengths 3T, 4T, 5T, 6T, 7T, 8T, 9T, and 10T or more of the target mark, and a correction amount of an end edge of the recording pulse is set for each classification.

7. The optical disk recording method according to claim 6, wherein in the classification of the encoded data, according to the combination of the mark length of the target mark and the space length of the preceding space, the classification is performed for each of space lengths 2T, 3T, 4T, 5T, 6T, 7T, and 8T or more of the preceding space in each of mark lengths 2T, 3T, 4T, and 5T of the target mark, and a correction amount of the end edge of the recording pulse is set for each classification.

8. The optical disk recording method according to claim 6, wherein in the classification of the encoded data, according to the combination of the space length of the preceding space and the mark length of the preceding mark, the classification is performed for each of mark lengths 2T and 3T or more of the preceding mark in each of space length 2T or 3T of the preceding space, and a correction amount of the end edge of the recording pulse is set for each classification.

9. The optical disk recording method according to claim 1, wherein in the classification of the encoded data, according to a combination of the mark length of the target mark and the space length of the preceding space, the classification is performed for each of space lengths 2T, 3T, 4T, 5T, and 6T or more of the preceding space in each of mark lengths 2T, 3T, 4T, 5T, 6T, 7T, 8T, 9T, 10T, 11T, and 12T of the target mark, and a correction amount of a start edge of the recording pulse is set for each classification.

10. The optical disk recording method according to claim 9, wherein in the classification of the encoded data, according to the combination of the mark length of the target mark and the space length of the succeeding space, the classification is performed for each of space lengths 2T, 3T, 4T, 5T, and 6T or more of the succeeding space in each of mark lengths 2T, 3T, and 4T of the target mark, and a correction amount of the start edge of the recording pulse is set for each classification.

11. The optical disk recording method according to claim 1, wherein in the classification of the encoded data, according to a combination of the mark length of the target mark and the space length of the succeeding space, the classification is performed for each of space lengths 2T, 3T, 4T, 5T, and 6T or more of the succeeding space in each of mark lengths 2T, 3T, 4T, 5T, 6T, 7T, 8T, 9T, 10T, 11T, and 12T of the target mark, and a correction amount of an end edge of the recording pulse is set for each classification.

12. The optical disk recording method according to claim 11, wherein in the classification of the encoded data, according to the combination of the mark length of the target mark and the space length of the preceding space, the classification is performed for each of space lengths 2T, 3T, 4T, 5T, and 6T or more of the preceding space in each of mark lengths 2T, 3T, and 4T of the target mark, and a correction amount of the end edge of the recording pulse is set for each classification.

13. The optical disk recording method according to claim 1, wherein
the evaluation index of the decoding result by the maximum likelihood decoding of the PRML scheme is an evaluation index by the extended L-SEAT operation, in which the extended L-SEAT operation comprising:
obtaining an input waveform of the reproduction signal;
obtaining the decoding result of the binary bit array by decoding the reproduction signal by the PRML scheme;
obtaining an ideal waveform of the reproduction signal based on the decoding result;
obtaining at least one of the right-shift bit array and the left-shift bit array by respectively shifting the binary bit array of the decoding result left and right by a single bit;
obtaining at least one of a preceding-shift ideal waveform corresponding to the right-shift bit array and a succeeding-shift ideal waveform corresponding to the left-shift bit array;
when the preceding-shift ideal waveform is acquired, calculating a preceding-shift integrated value by integrating the preceding shift amounts at individual time points using a difference between the ideal waveform and the input waveform and a difference between the ideal waveform and the preceding-shift ideal waveform;
when the succeeding-shift ideal waveform is acquired, calculating a succeeding-shift integrated value by integrating the succeeding shift amounts at individual time points using the difference between the ideal waveform and the input waveform and a difference between the ideal waveform and the succeeding-shift ideal waveform; and
calculating an L-SEAT value proportional to a difference between the preceding-shift integrated value and the succeeding-shift integrated value.

14. The optical disk recording method according to claim 13, wherein in the setting of the correction amount, the correction amount of a recording pulse for setting the L-SEAT value to a predetermined value or less is obtained and set for each classification of the coded data.

15. The optical disk recording method according to claim 1, wherein a continuous number of a shortest run length 2T in the encoded data is 2 or less.

16. An optical disk device which irradiates an optical disk with an optical beam to form a plurality of marks on a medium, and records information using edge positions of each mark and a space between two adjacent marks, comprising:
an encoding unit configured to encode recording data according to modulation codes to generate binary encoded data corresponding to the mark and the space;
a classification unit configured to, regarding run lengths of the mark and the space in the encoded data, if a mark of interest is target mark, classify the encoded data according to a combination of at least two run lengths of a mark length of the target mark, a space length of a preceding space on a preceding side of the target mark, a mark length of a preceding mark on the preceding side of the target mark, and a space length of a succeeding space on a succeeding side of the target mark;
a correction amount setting unit configured to for each classification of the run length of the encoded data, set individual correction amounts for adjusting positions of a start edge and an end edge of a recording pulse for forming the mark, based on an evaluation index of a decoding result which is obtained when a reproduction signal obtained by reproducing the mark and space corresponding to the encoded data is decoded by maximum likelihood decoding of a PRML scheme;
a recording waveform generating unit configured to generate a recording pulse according to the encoded data using the correction amount according to the classification of the run length of the encoded data; and a recording light output unit configured to form a mark according to the recording data on the medium of the optical disk by changing a power of the optical beam in a plurality of stages with the recording pulse and irradiating the optical disk with the optical beam, wherein the encoded data is generated by modulation codes having a maximum code length of 11T or more, and includes a code array having a minimum run length of 2T and a maximum run length of 11T or more, a constraint length, which is a class of the maximum likelihood decoding of the PRML scheme, is 11 or more, the evaluation index of the decoding result is an evaluation index by an extended L-SEAT operation in which an L-SEAT value representing a shift amount in a preceding or succeeding direction of a pattern in a predetermined range of a recording mark of interest is calculated using a binary bit array of the decoding result of the reproduction signal by the maximum likelihood decoding with the constraint length of 11 or more and at least one of a right-shift bit array and a left-shift bit array obtained by shifting the binary bit array by a single bit to right and left respectively, the classification unit performs, in the classification of the encoded data, the classification for each of run lengths 2T, 3T, 4T, 5T, 6T, 7T, and 8T or more according to the mark length of the target mark, and the correction amount setting unit sets the correction amount for each classification.

17. An integrated circuit which executes individual processes in an optical disk recording method for irradiating an optical disk with an optical beam to form a plurality of marks on a medium, and recording information using edge positions of each mark and a space between two adjacent marks, the processes comprising:

encoding recording data according to modulation codes to generate binary encoded data corresponding to the mark and the space;

regarding run lengths of the mark and the space in the encoded data, if a mark of interest is target mark, classifying the encoded data according to a combination of at least two run lengths of a mark length of the target mark, a space length of a preceding space on a preceding side of the target mark, a mark length of a preceding mark on the preceding side of the target mark, and a space length of a succeeding space on a succeeding side of the target mark;

for each classification of the run length of the encoded data, setting individual correction amounts for adjusting positions of a start edge and an end edge of a recording pulse for forming the mark, based on an evaluation index of a decoding result which is obtained when a reproduction signal obtained by reproducing the mark and space corresponding to the encoded data is decoded by maximum likelihood decoding of a PRML scheme;

generating a recording pulse according to the encoded data using the correction amount according to the classification of the run length of the encoded data; and forming a mark according to the recording data on the medium of the optical disk by changing a power of the optical beam in a plurality of stages with the recording pulse and irradiating the optical disk with the optical beam, wherein the encoded data is generated by modulation codes having a maximum code length of 11T or more, and includes a code array having a minimum run length of 2T and a maximum run length of 11T or more, a constraint length, which is a class of the maximum likelihood decoding of the PRML scheme, is 11 or more, the evaluation index of the decoding result is an evaluation index by an extended L-SEAT operation in which an L-SEAT value representing a shift amount in a preceding or succeeding direction of a pattern in a predetermined range of a recording mark of interest is calculated using a binary bit array of the decoding result of the reproduction signal by the maximum likelihood decoding with the constraint length of 11 or more and at least one of a right-shift bit array and a left-shift bit array obtained by shifting the binary bit array by a single bit to right and left respectively, and in the classification of the encoded data, the classification is performed for each of run lengths 2T, 3T, 4T, 5T, 6T, 7T, and 8T or more according to the mark length of the target mark, and the correction amount is set for each classification.

* * * * *